United States Patent
Ueno et al.

(10) Patent No.: US 10,803,738 B2
(45) Date of Patent: Oct. 13, 2020

(54) ELECTRONIC DEVICE

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 89 days.

(21) Appl. No.: 16/328,264

(22) PCT Filed: Aug. 25, 2017

(86) PCT No.: PCT/JP2017/030437
§ 371 (c)(1),
(2) Date: Feb. 25, 2019

(87) PCT Pub. No.: WO2018/038236
PCT Pub. Date: Mar. 1, 2018

(65) Prior Publication Data
US 2020/0273327 A1   Aug. 27, 2020

(30) Foreign Application Priority Data

Aug. 26, 2016  (JP) ................................. 2016-166179
Oct. 27, 2016  (JP) ................................. 2016-210451

(51) Int. Cl.
*G08G 1/01*    (2006.01)
*G01S 19/26*   (2010.01)
(Continued)

(52) U.S. Cl.
CPC .............. *G08G 1/012* (2013.01); *G01S 19/01* (2013.01); *G01S 19/26* (2013.01); *G08G 1/01* (2013.01); *H04W 4/025* (2013.01); *H04W 4/027* (2013.01)

(58) Field of Classification Search
CPC .......... G01S 19/01; G01S 19/02; G01S 19/03; G01S 19/07; G01S 19/26; H04W 4/025; H04W 4/027; H04W 4/029
See application file for complete search history.

(56) References Cited

U.S. PATENT DOCUMENTS

| 9,389,316 B2 * | 7/2016 | MacGougan ........... G01S 19/26 |
| 2015/0120178 A1 * | 4/2015 | Kleve ................ B60G 17/0165 701/408 |

FOREIGN PATENT DOCUMENTS

| JP | 2007-075428 A | 3/2007 |
| JP | 2009-229204 A | 10/2009 |

(Continued)

*Primary Examiner* — Van T Trieu
(74) *Attorney, Agent, or Firm* — Studebaker & Brackett PC

(57) ABSTRACT

Provided is an electronic device including a communication unit, an acquisition unit, and a controller. The communication unit communicates a roadside unit associated with a pedestrian overpass to acquire height information of the pedestrian overpass from the roadside unit. The acquisition unit acquires height calculation information for calculating the height information of the electronic device. The controller determines whether a user of the electronic device is crossing the pedestrian overpass based on the height information of the electronic device calculated based on the height calculation information and the height information of the pedestrian overpass.

20 Claims, 29 Drawing Sheets

(51) Int. Cl.
    *H04W 4/02*     (2018.01)
    *G01S 19/01*     (2010.01)

(56) References Cited

FOREIGN PATENT DOCUMENTS

| | | |
|---|---|---|
| JP | 2009-267770 A | 11/2009 |
| JP | 2012-191488 A | 10/2012 |
| JP | 2012-215409 A | 11/2012 |
| JP | 2013-044651 A | 3/2013 |
| JP | 2016-004003 A | 1/2016 |
| JP | 2016-103665 A | 6/2016 |

\* cited by examiner

F I G . 1 8
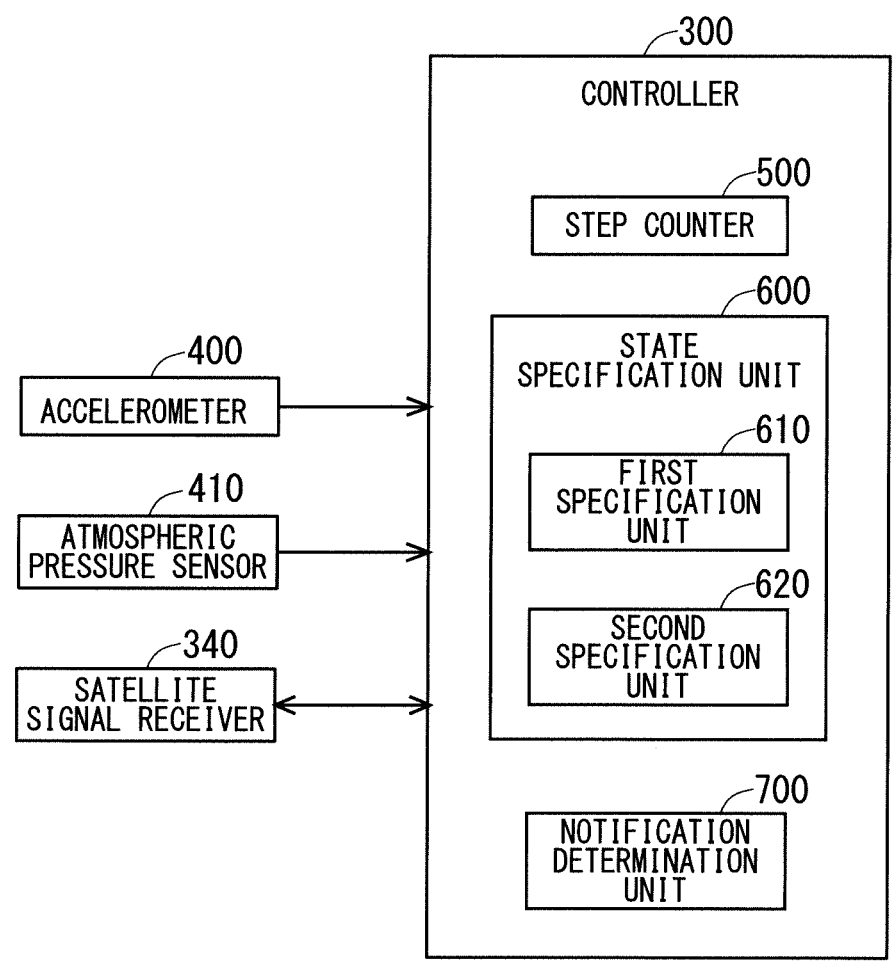

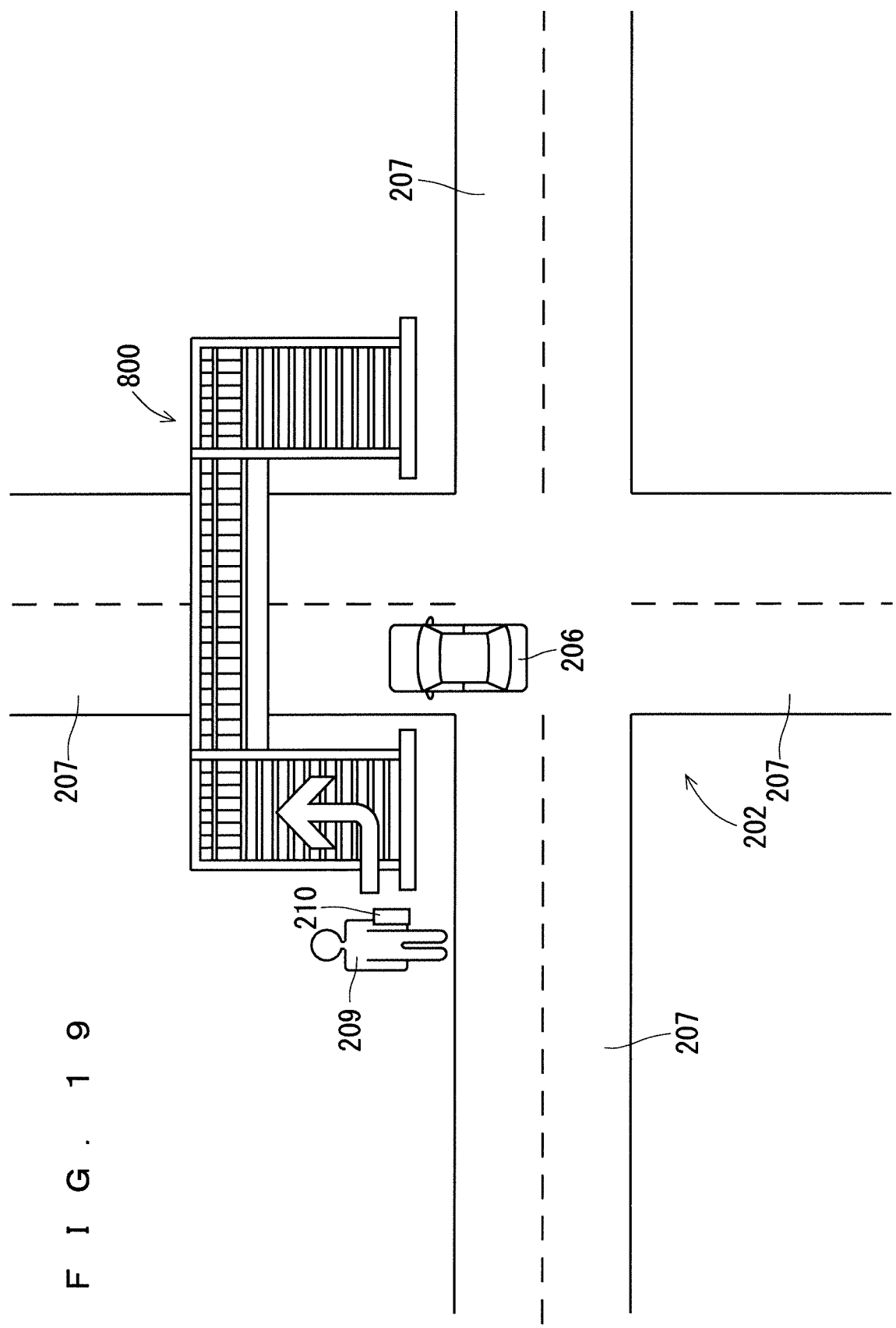

ELECTRONIC DEVICE

CROSS-REFERENCE TO RELATED APPLICATION

The present application is a National Phase entry based on PCT Application No. PCT/JP2017/030437 filed on Aug. 25, 2017, entitled "ELECTRONIC DEVICE, CONTROL PROGRAM, AND METHOD FOR OPERATING ELECTRONIC DEVICE" which claims the benefit of Japanese Patent Application No. 2016-166179 (filed on Aug. 26, 2016) entitled "MOBILE ELECTRONIC DEVICE, ROADSIDE UNIT, SYSTEM, MOBILE ELECTRONIC DEVICE CONTROL PROGRAM, AND ROADSIDE UNIT CONTROL PROGRAM" and Japanese Patent Application No. 2016-210451 (filed on Oct. 27, 2016) entitled "ELECTRONIC DEVICE, CONTROL PROGRAM, AND METHOD FOR OPERATING ELECTRONIC DEVICE". The contents of which are incorporated by reference herein in their entirety.

FIELD

The present disclosure relates to an electronic device.

BACKGROUND

Various techniques for electronic devices have been proposed.

SUMMARY

One aspect of an electronic device is to comprise a communication unit, an acquisition unit, and a controller. The communication unit communicates a roadside unit associated with a pedestrian overpass to acquire height information of the pedestrian overpass from the roadside unit. The acquisition unit acquires height calculation information for calculating the height information of the electronic device. The controller determines whether a user of the electronic device is crossing the pedestrian overpass based on the height information of the electronic device calculated based on the height calculation information and the height information of the pedestrian overpass.

One aspect of a roadside unit is to comprise a communication unit and a controller. The communication unit communicates with the electronic device and acquires height calculation information for calculating height information of the electronic device. The controller determines whether a user of the electronic device is crossing the pedestrian overpass based on the height information of the electronic device calculated based on the height calculation information and the height information of the pedestrian overpass associated with the roadside unit.

One aspect of a system is to comprise the above electronic device and a roadside unit associated with pedestrian overpass and transmits the height information of the pedestrian overpass to the electronic device.

One aspect of the system is to comprise the above roadside unit and an electronic device. The electronic device transmits the height calculation information for calculating the height information of the electronic device to the roadside unit.

One aspect of a control program is a control program for controlling an electronic device. The control program controls the electronic device to execute steps of communicating with the roadside unit associated with the pedestrian overpass and acquiring height information of the pedestrian overpass from the roadside unit, acquiring height calculation information for calculating the height information of the electronic device, determining whether a user of the electronic device is crossing the pedestrian overpass based on the height information of the electronic device calculated based on the height calculation information and the height information of the pedestrian overpass.

One aspect of a control program is a control program for controlling a roadside unit. The control program controls the roadside unit to execute steps of communicating with the electronic device and acquiring height calculation information for calculating height information of the electronic device, determining whether a user of the electronic device is crossing the pedestrian overpass based on the height information of the electronic device calculated based on the height calculation information and the height information of the pedestrian overpass associated with the roadside unit.

One aspect of an electronic device is to comprise a receiver, a generator, and a specification unit. The receiver receives a satellite signal transmitted by a positioning satellite and generates first information indicating a receiving state of the satellite signal. The generator generates second information that changes according to the height of a position of the electronic device. The specification unit executes a specification process in which state specification, for specifying that a user of the electronic device is on a pedestrian overpass, is performed based on the first information and the second information.

One aspect of an electronic device is to comprise a receiver, a generator, and a specification unit. The receiver receives a satellite signal transmitted by a positioning satellite and generates first information indicating a receiving state of the satellite signal. The generator generates second information that changes according to the height of the position of the electronic device. The specification unit executes a specification process in which state specification, for specifying a movement of a user of the electronic device from the basement to the ground, is performed based on the first information and the second information.

One aspect of the electronic device is to comprise a receiver, a generator, and a specification unit. The receiver receives the satellite signal transmitted by the positioning satellite and generates first information indicating the receiving state of the satellite signal. The generator generates second information that changes according to the height of the position of the electronic device. The specification unit executes a specification process in which state specification, for specifying a movement of a user of the electronic device descends from a pedestrian overpass, is performed based on the first information and the second information.

One aspect of an electronic device is to comprise a receiver, a generator, and a specification unit. The receiver receives the satellite signal transmitted by the positioning satellite and generates first information indicating the receiving state of the satellite signal. The generator generates second information that changes according to the height of the position of the electronic device. The specification unit executes a specification process in which state specification, for specifying a movement of the user of the electronic device from the ground to the basement, is performed based on the first information and the second information.

One aspect of a control program is a control program for controlling the electronic device. The electronic device comprises a receiver configured to receive a satellite signal transmitted by a positioning satellite and generate first information indicating a receiving state of the satellite signal, and a generator configured to generate second information that changes according to a height of a position of the electronic device. The control program controls the electronic device to execute a specification process in which state specification, for specifying that a user of the electronic device is on a pedestrian overpass, is performed based on the first information and the second information.

One aspect of a control program is a control program for controlling the electronic device. The electronic device comprises a receiver configured to receive a satellite signal transmitted by a positioning satellite and generate first information indicating a receiving state of the satellite signal, and a generator configured to generate second information that changes according to a height of a position of the electronic device. The control program controls the electronic device to execute a specification process in which state specification, for specifying a movement of a user from the basement to the ground, is performed based on the first information and the second information.

One aspect of a control program is a control program for controlling the electronic device. The electronic device comprises a receiver configured to receive a satellite signal transmitted by a positioning satellite and generate first information indicating a receiving state of the satellite signal, and a generator configured to generate second information that changes according to a height of a position of the electronic device. The control program controls the electronic device to execute a specification process in which state specification, for specifying that a user of the electronic device descends from a pedestrian overpass, is performed based on the first information and the second information.

One aspect of a control program is a control program for controlling the electronic device. The electronic device comprises a receiver configured to receive a satellite signal transmitted by a positioning satellite and generate first information indicating a receiving state of the satellite signal, and a generator configured to generate second information that changes according to a height of a position of the electronic device. The control program controls the electronic device to execute a specification process in which state specification, for specifying a movement of a user from the ground to the basement, is performed based on the first information and the second information.

One aspect of an operating method of an electronic device is an operating method of an electronic device comprising a receiver and a generator. The receiver receives the satellite signal transmitted by the positioning satellite and generates first information indicating the receiving state of the satellite signal. The generator generates second information that changes according to the height of the position of the electronic device. The operating method of the electronic device comprises a step of executing a specification process in which state specification, for specifying that a user of the electronic device is on a pedestrian overpass, is performed based on the first information and the second information.

One aspect of an operating method of an electronic device is an operating method of an electronic device comprising a receiver and a generator. The receiver receives the satellite signal transmitted by the positioning satellite and generates first information indicating the receiving state of the satellite signal. The generator generates second information that changes according to the height of the position of the electronic device. The operating method of the electronic device comprises a step of executing a specification process in which state specification, for specifying a movement of the user of the electronic device from the basement to the ground, is performed based on the first information and the second information.

One aspect of an operating method of an electronic device is an operating method of an electronic device comprising a receiver and a generator. The receiver receives the satellite signal transmitted by the positioning satellite and generates first information indicating the receiving state of the satellite signal. The generator generates second information that changes according to the height of the position of the electronic device. The operating method of the electronic device comprises a step of executing a specification process in which state specification, for specifying that a user of the electronic device descends from a pedestrian overpass, is performed based on the first information and the second information.

One aspect of an operating method of an electronic device is an operating method of an electronic device comprising a receiver and a generator. The receiver receives the satellite signal transmitted by the positioning satellite and generates first information indicating the receiving state of the satellite signal. The generator generates second information that changes according to the height of the position of the electronic device. The operating method of the electronic device comprises a step of executing a specification process in which state specification, for specifying a movement of the user of the electronic device from the ground to the basement, is performed based on the first information and the second information.

BRIEF DESCRIPTION OF DRAWINGS

FIG. 18 illustrates a block diagram showing an example of a configuration of the controller.

FIG. 19 illustrates a diagram showing an example of a user crossing a pedestrian overpass.

DETAILED DESCRIPTION

A plurality of embodiments for executing the present disclosure will be described in detail with reference to the drawings. Hereinafter, as an example of the electronic device, a smartphone which is a pedestrian terminal will be described.

First Embodiment

Figure 1:
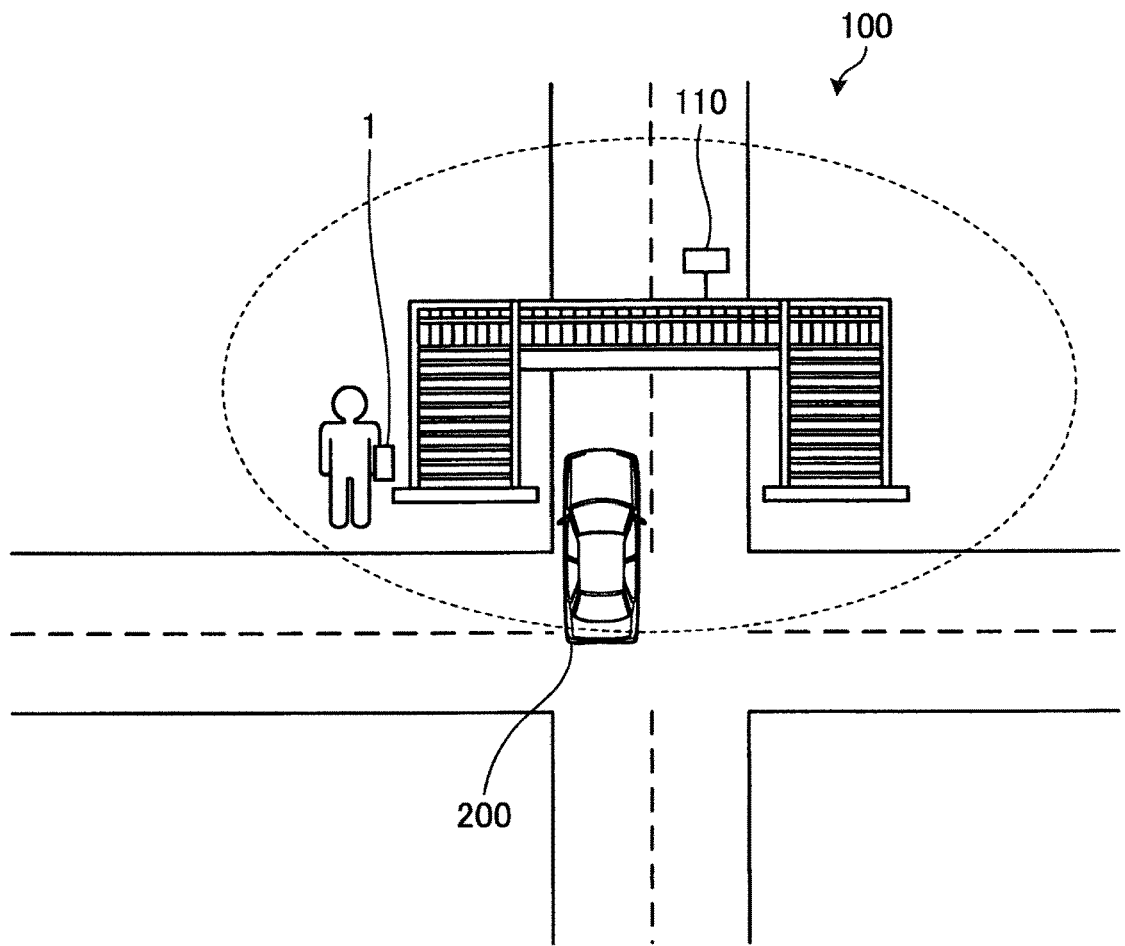
FIG. 1 illustrates a schematic diagram showing a schematic configuration of an example of a control system.

Referring to FIG. 1, the overall configuration of a control system 100 including a smartphone 1 as an electronic device according to the first embodiment will be described. FIG. 1 illustrates a schematic diagram showing a schematic configuration of the control system 100. The control system 100 includes a roadside unit 110 and a smartphone 1 which is a type of a portable electronic device. In FIG. 1, one roadside unit 110 and one smartphone 1 are illustrated, however, in the control system 100, it is only necessary to include one or more roadside units 110 and one or more smartphones 1 and therefore, the numbers of the roadside units 110 and the smartphones 1 are not limited. The control system 100 may further include a vehicle 200.

In FIG. 1, a pedestrian overpass is provided across the road.

The vehicle 200 comprises a communication unit. The vehicle 200 can communicate with the roadside unit 110, traffic lights, other vehicles 200, and the smartphone 1 via the communication unit. The communication unit communicates, for example with a communication device presenting within a predetermined distance and transmits and receives data with the communication device via the short-range wireless communication. The communication unit communicates, for example with the roadside unit 110 and the smartphone 1 via the short-range wireless communication. The vehicle 200 outputs information on pedestrians around the vehicle 200 to a driver based on information received from the roadside unit 110 and the smartphone 1.

Figure 2:
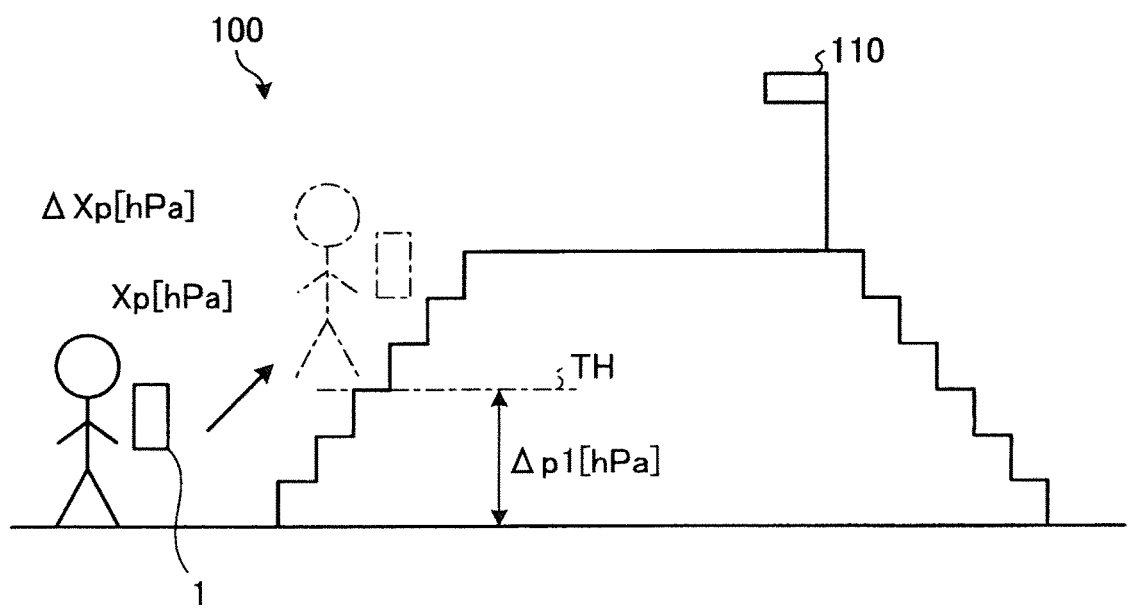
FIG. 2 illustrates a schematic diagram showing a schematic configuration of an example of the control system.
Figure 3:
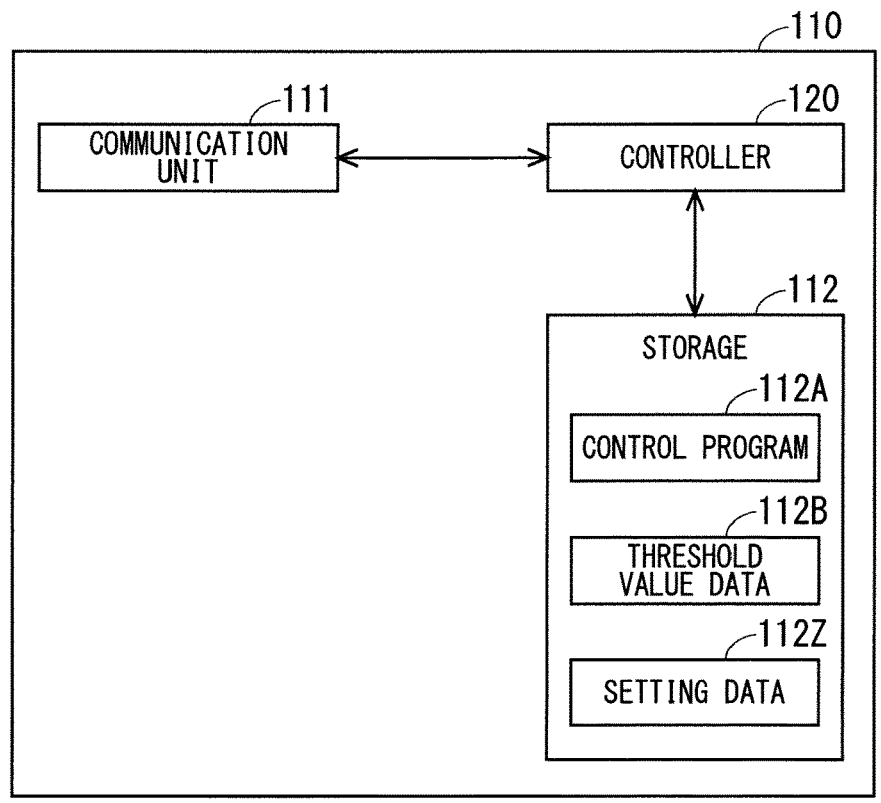
FIG. 3 illustrates a block diagram showing an example of a roadside unit.

Referring to FIGS. 1, 2 and 3, the overall configuration of the roadside unit 110 will be described. FIG. 2 illustrates a schematic diagram showing a schematic configuration of the control system 100. FIG. 3 illustrates a block diagram showing the roadside unit 110 included in the control system 100. The roadside unit 110 is associated with the pedestrian overpass. The roadside unit 110 is provided on the pedestrian overpass. The roadside unit 110 may be able to control a traffic light provided by the intersection. The roadside unit 110 can wirelessly output identification information of a subject unit. The identification information is information for identifying the respective roadside units and is represented by, for example, an identification number. The roadside unit 110 can wirelessly output, for example, a threshold value data 112B in FIG. 3 together with the identification information of the subject unit. As illustrated in FIG. 3, the roadside unit 110 includes a communication unit 111, storage 112, and a controller 120.

The communication unit 111 can wirelessly communicate. The communication unit 111 supports wireless communication standards such as Worldwide Interoperability for Microwave Access (WiMAX), IEEE802.11 (including a,b,n,p), Bluetooth (registered trademark), Infrared Data Association (IrDA), and Near Field Communication (NFC). Also, the communication unit 111 may support communication standards such as 2G, 3G, and 4G. The cellular phone communication standards include such as Long Term Evolution (LTE), Wideband Code Division Multiple Access (W-CDMA), CDMA 2000, Personal Digital Cellular (PDC), Global System for Mobile Communications (GSM) (registered trademark), and Personal Handy-phone System (PHS). The communication unit 111 supports one or more of communication standards described above. The communication unit 111 may support wired communication standards such as Ethernet and Fiber Channel.

The communication unit 111 can communicate with other roadside unit 110 and traffic lights. The communication unit 111 communicates with a communication device presenting within the predetermined distance and transmits and receives data with the communication device via the short-range wireless communication. The communication unit 111 communicates with the roadside unit 110 and the smartphone 1 via the short-range wireless communication. In the first embodiment, the communication unit 111 communicates with the smartphone 1, in which the communication unit 111 transfers data including the identification information of the subject device and the threshold value data 112B to the smartphone 1.

The storage 112 can store programs and data therein. The storage 112 is also used as a work area for temporarily storing processing results of the controller 120. The storage 112 may include any non-transitory storage medium such as a semiconductor storage medium and a magnetic storage medium. The non-transitory storage medium includes, but not limited to, optical disks such as CD (registered trademark), DVD (registered trademark), and Blu-ray (registered trademark), a magnetic storage medium, a memory card, and a solid-state storage medium. The storage 112 may include multiple types of storage medium. The storage 112 may include a combination of a portable storage medium such as a memory card, an optical disk, or a magneto-optical disk and a reading device of the storage medium. The storage 112 may include a storage device used as a temporary storage area such as a Random Access Memory (RAM).

The program stored in the storage 112 includes a program in which establishment of the communication with a communication device presenting within the predetermined distance and control of data transmission and reception are executed. The data stored in the storage 112 includes, for example, data to be transmitted to other communication device. The data to be transmitted to the other communication device includes the identification information of the subject device.

The storage 112 stores, for example a control program 112A, the threshold value data 112B indicating information on the height of the pedestrian overpass, and a setting data 112Z.

The threshold value data 112B is an altitude determination threshold value $\Delta p1$ [hPa] for determining whether the user of the smartphone 1 is crossing the pedestrian overpass. The altitude determination threshold value is, for example, a change of atmospheric pressure. The threshold value data 112B may be information for the calculation of the altitude determination threshold value $\Delta p1$. In this case, the altitude determination threshold value $\Delta p1$ is calculated based on the threshold value data 11B in a controller 10.

In the first embodiment, it is determined that the user is crossing the pedestrian overpass if the height of the smartphone 1 is a predetermined height TH or higher from the road. The predetermined height TH may be, for example, the mid-height of the height of the pedestrian overpass or a height of several [m] from the road. The predetermined height TH may be set, for example, for each pedestrian overpass, or may be uniformly set.

In the first embodiment, the change amount of the atmospheric pressure corresponding to the altitude difference between the height of the road and the predetermined height TH from the road is stored in the storage 112 as the threshold data 112B, that is, the altitude determination threshold value $\Delta p1$. For example, if the altitude difference between the height of the road and the predetermined height TH from the road is 2 [m], the changing amount of the atmospheric pressure corresponding to the 2 [m] altitude difference is stored in the storage 112 as the altitude determination threshold value $\Delta p1$.

The setting data 112Z includes various setting information related to the operation of the roadside unit 110.

The control program 112A provides functions related to various control for operating the roadside unit 110.

The controller 120 is an arithmetic processing unit. The arithmetic processing unit includes at least one processor for providing control and processing capability to perform various functions as described in further detail below. In accordance with various embodiments, the at least one processor may be implemented as a single integrated circuit (IC) or as multiple communicatively coupled ICs and/or discrete circuits. It is appreciated that the at least one processor can be implemented in accordance with various know technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of the devices or structures, or other known devices and structures, to perform the functions described herein.

In the present example, the arithmetic processing unit may include, but not limited to, a Central Processing Unit (CPU), a System-on-a-Chip (SoC), a Micro Control Unit (MCU), and a Field-Programmable Gate Array (FPGA), and a processor. The controller 120 comprehensively controls the operation of the roadside unit 110 to realize various functions.

The controller 120 executes an instruction included in the program stored in the storage 112 while referring to the data stored in the storage 112 as necessary. And, the controller 120 controls the functional unit in accordance with the data and the instruction, thereby realizing various functions.

Figure 4:
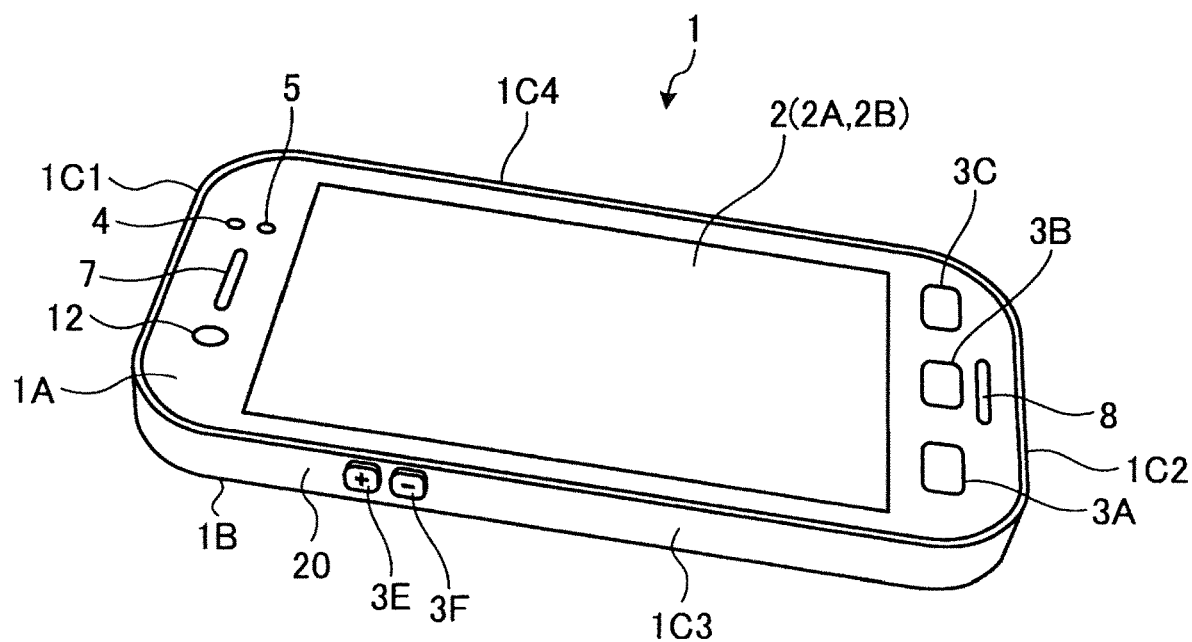
FIG. 4 illustrates a perspective view showing an example of a smartphone.
Figure 5:
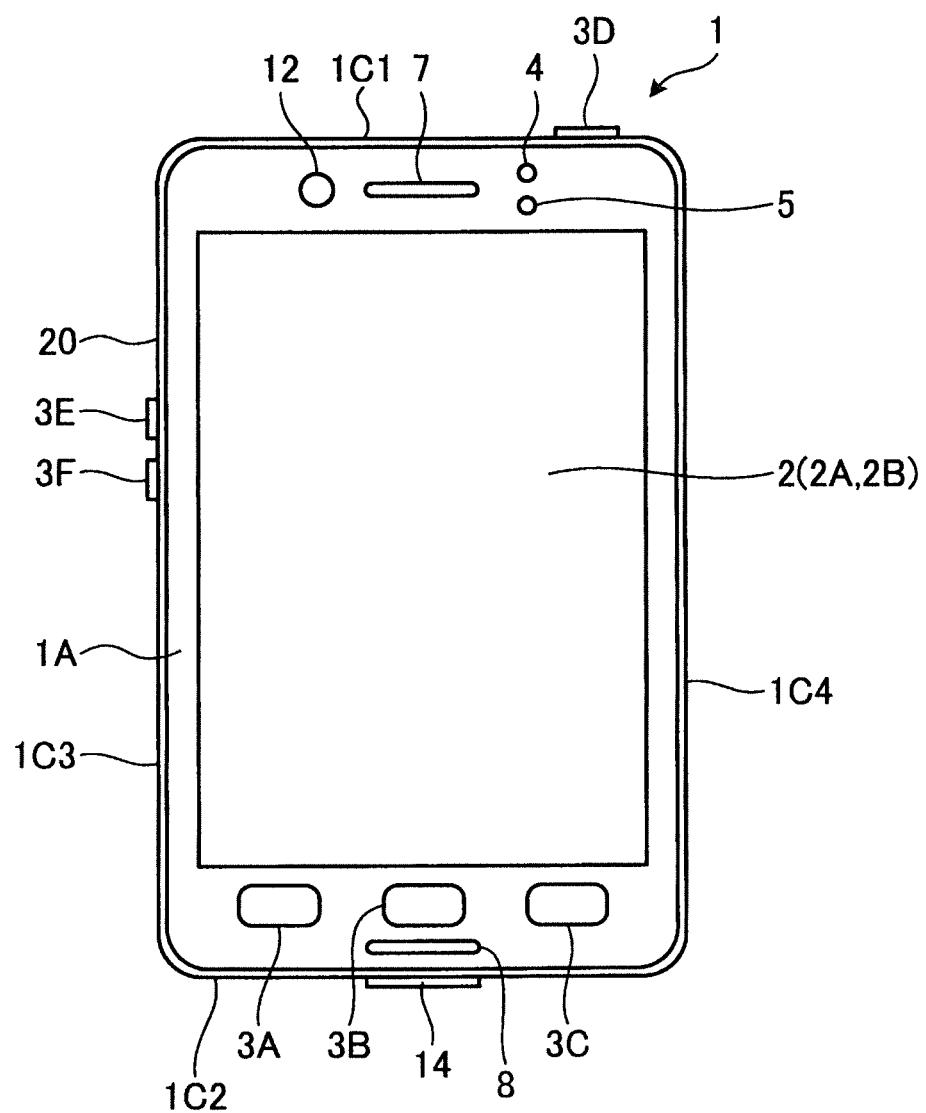
FIG. 5 illustrates a front view showing an example of the smartphone.
Figure 6:
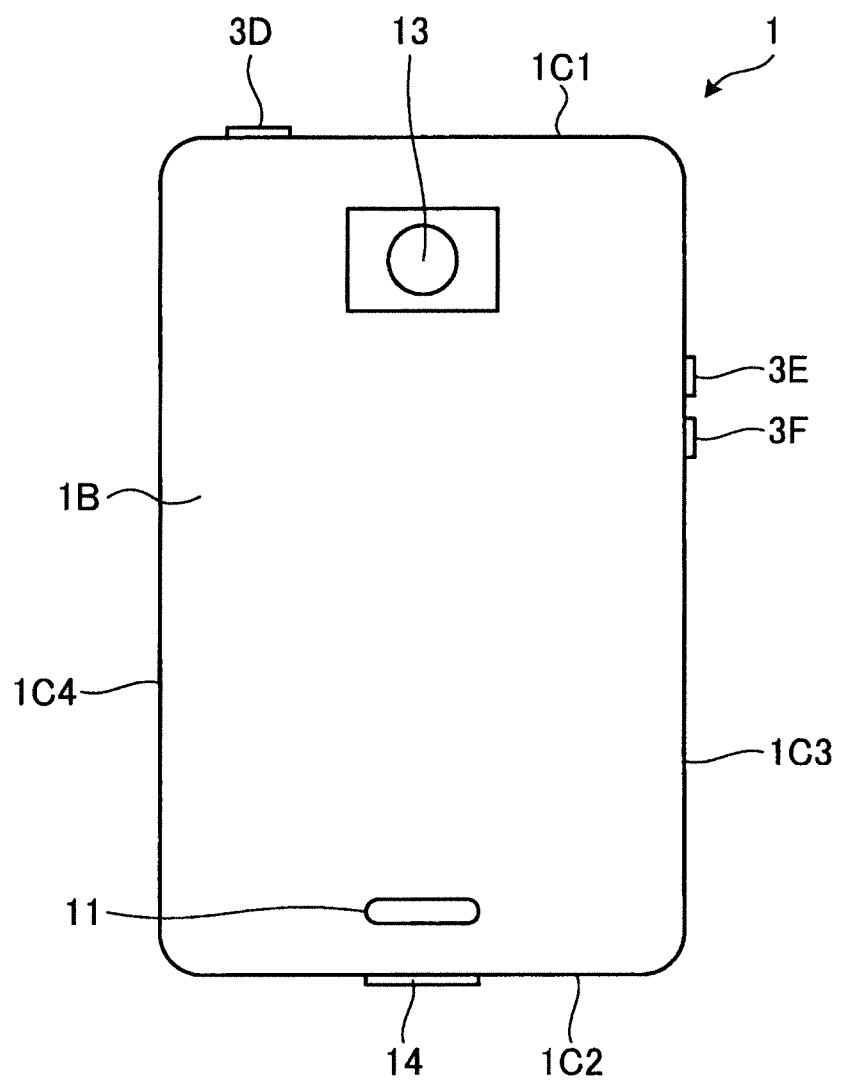
FIG. 6 illustrates a front view showing an example of the smartphone.

The overall configuration of the smartphone 1 according to the first embodiment will be described with reference to FIGS. 4 to 6. FIG. 4 illustrates a perspective view showing an example of a smartphone 1. FIG. 5 illustrates a front view showing an example of the smartphone 1. FIG. 6 illustrates a rear view showing an example of the smartphone. The smartphone 1 has a housing 20. The housing 20 has a front face 1A, a back face 1B, and side faces 1C1 to 1C4. The front face 1A represents the front face of the housing 20. The back face 1B represents the back face of the housing 20. The side faces 1C1 to 1C4 are side faces connecting the front face 1A and the back face 1B. In the following, the side faces 1C1 to 1C4 may be collectively referred to as side face 1C without indicating any particular side face. The configuration of the smartphone 1 shown in FIGS. 3 to 5 is an example, and may be appropriately changed within a scope not to impair the gist of the present disclosure.

The smartphone 1 has a touch screen display 2, buttons 3A to 3C, an illuminance sensor 4, a proximity sensor 5, a receiver 7, a microphone 8, and a camera 12 in the front face 1A. The smartphone 1 has a speaker 11 and a camera 13 in the back face 1B. The smartphone 1 has buttons 3D to 3F and a connector 14 in the side face 1C. In the following, the buttons 3A to 3F may be collectively referred to as button 3 without indicating any particular button.

The touch screen display 2 has a display 2A and a touch screen 2B. In an example of FIG. 4, the display 2A and the touch screen 2B each have a substantially rectangular shape, however, the shapes of the display 2A and the touch screen 2B are not limited thereto. Each of the display 2A and the touch screen 2B may have any shape such as a square shape or a circular shape. In the example of FIG. 4, although the display 2A and the touch screen 2B overlap each other, the positions of the display 2A and the touch screen 2B are not limited thereto. For example, the display 2A and the touch screen 2B may be positioned side by side or separated from each other. Although in the example of FIG. 4, the long side of the display 2A is along the long side of the touch screen 2B and the short side of the display 2A is along the short side of the touch screen 2B, the overlapping manner of the display 2A and the touch screen 2B is not limited thereto. If the display 2A and the touch screen 2B overlap each other, for example, one or a plurality of sides of the display 2A may not be along either side of the touch screen 2B.

The display 2A comprises a display device such as a Liquid Crystal Display (LCD), an Organic Electro-Luminescence Display (OELD), or an Inorganic Electro-Luminescence Display (IELD). The display 2A displays objects such as characters, images, symbols, graphics, and the like.

The touch screen 2B detects contact of an operator, such as a finger, a pen, a stylus pen, or the like, to the touch screen 2B. The touch screen 2B can detect a position where an operator, such as a plurality of fingers, a pen, a stylus pen, or the like touches the touch screen 2B. The detection method of the touch screen 2B may include an arbitrary method such as an electrostatic capacitance method, a resistive film method, a surface acoustic wave method (or an ultrasonic method), an infrared method, an electromagnetic induction method, and a load detection method. In the following description, for simplicity of explanation, it is assumed that a user touches the touch screen 2B using a finger in order to operate the smartphone 1.

The smartphone 1 determines operation (gesture) to be performed on the touch screen 2B based on at least one of a contact detected by the touch screen 2B, a position where a contact is detected, a change in a position where a contact is detected, an interval in which a contact is detected, and a number of times a contact is detected. Operations performed on the touch screen 2B include, but not limited to, touch, long touch, release, swipe, tap, double tap, long tap, drag, flick, pinch in, and pinch out.

Figure 7:
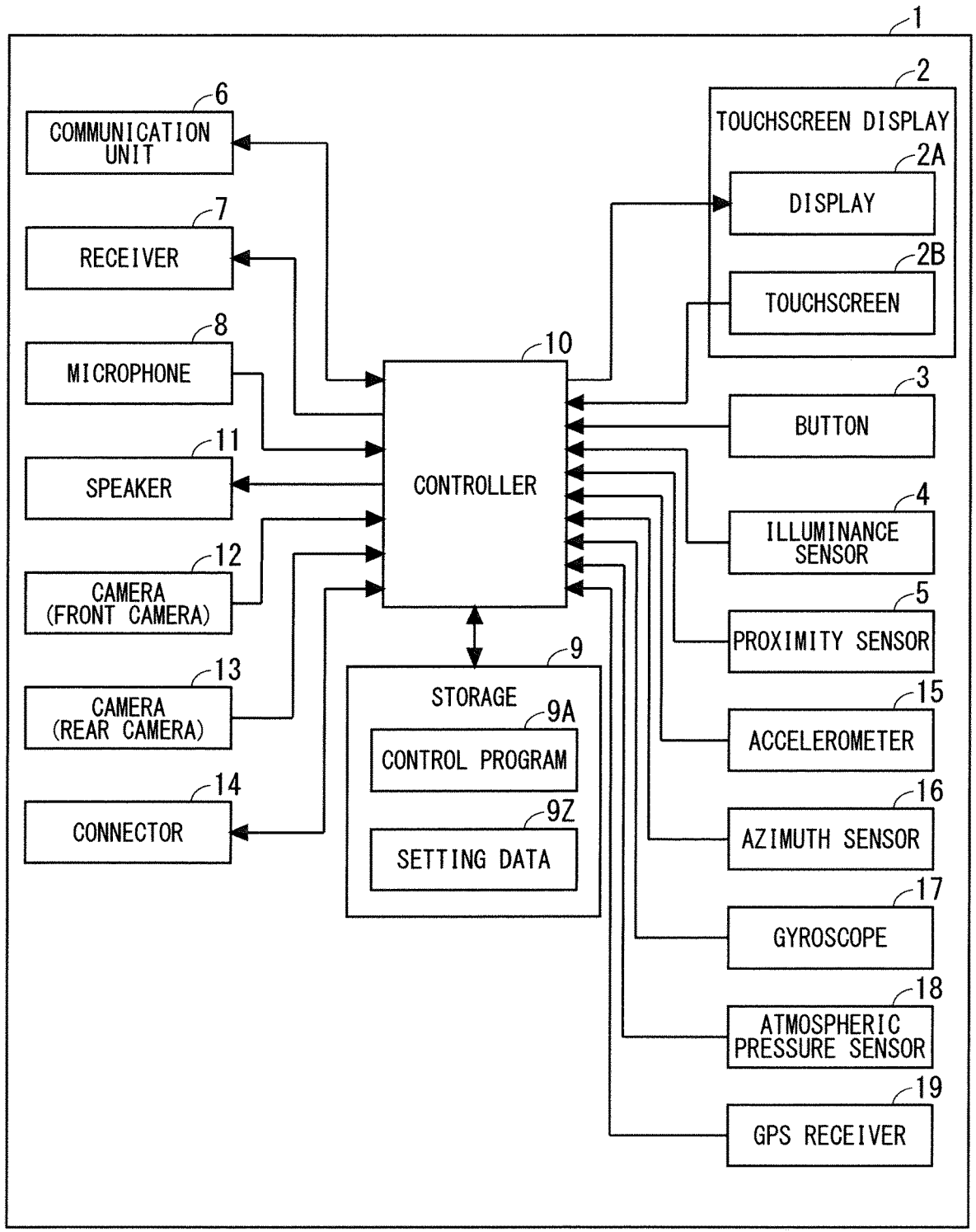
FIG. 7 illustrates a block diagram showing an example of the smartphone.

The functional configuration of the smartphone 1 will be described with reference to FIG. 7. FIG. 7 illustrates a block diagram showing an example of the smartphone. The configuration of the smartphone 1 shown in FIG. 7 is an example, and may be appropriately changed within a scope not to impair the gist of the present disclosure.

The smartphone 1 includes a touch screen display 2, a button 3, an illuminance sensor 4, a proximity sensor 5, a communication unit 6, a receiver 7, a microphone 8, storage 9, a controller 10, a speaker 11, a camera 12 and a camera 13, a connector 14, an accelerometer 15, an azimuth sensor 16, a gyroscope 17, an atmospheric pressure sensor (information acquisition unit) 18, and a Global Positioning System (GPS) receiver 19.

The button 3 is operated by a user. The button 3 includes buttons 3A to 3F. The controller 10 detects an operation on the button 3 by cooperating with the buttons 3. Operations on button 3 include, but not limited to, click, double click, triple click, push, and multi push, for example.

The buttons 3A to 3C represent, for example, a home button, a back button or a menu button. The button 3D represents, for example, a power on-off button of the smartphone 1. The button 3D may also serve as a sleep/sleep-release button. For example, the buttons 3E and 3F are configured as volume buttons.

The illuminance sensor 4 can detect the illuminance of the ambient light of the smartphone 1. Illuminance indicates light intensity, brightness, or luminance. The illuminance sensor 4 is used, for example, for adjusting the luminance of the display 2A. The proximity sensor 5 can detect the presence of a neighboring object in a noncontact manner. The proximity sensor 5 can detect the presence of an object based on a change in a magnetic field, a change in a feedback time of a reflected wave of an ultrasonic wave, or the like. The proximity sensor 5 detects, for example, that the touch screen display 2 has been being approached toward the face. The illuminance sensor 4 and the proximity sensor 5 may be configured as one sensor. The illuminance sensor 4 may be used as a proximity sensor.

The communication unit 6 can communicate wirelessly. In the first embodiment, the communication unit 6 has a function of at least a short-range wireless communication. The communication method to be supported by the communication unit 6 is a wireless communication standard. The communication unit 6 supports communication standards of cellular phones such as 2G, 3G, 4G, and 5G. The cellular phone communication standards include, for example, LTE, W-CDMA, CDMA 2000, PDC, GSM (registered trademark) and PHS. The communication unit 6 may support wireless communication standards including WiMAX, IEEE 802.11, Bluetooth (registered trademark), IrDA, NFC, and the like, for example. The communication unit 6 may support one or more of the communication standards described above.

The communication unit 6 may support wired communication. The wired communication includes, for example, Ethernet (registered trademark), fiber channel, and so forth.

In the first embodiment, the communication unit 6 supports a communication standard for enabling communication with the roadside unit 110. For example, the smartphone 1 acquires information on the roadside unit 110 by communicating with the roadside unit 110 via the communication unit 6. In the first embodiment, the communication unit 6 may support a communication standard for enabling communication with a communication device mounted on a vehicle 200. For example, the smartphone 1 acquires information on the vehicle 200 by communicating with the vehicle 200 via the communication unit 6.

The communication unit 6 acquires the threshold value data 112B indicating height information of the pedestrian overpass from the roadside unit 110 installed on the pedestrian overpass.

The receiver 7 and the speaker 11 are configured as sound output units. The receiver 7 and the speaker 11 can output a sound signal transmitted from the controller 10 as a sound. The receiver 7 is used, for example, to output the sound of the opposite party during a call. The speaker 11 is used, for example, to output the sound of the ringtone and a piece of music. Either the receiver 7 or the speaker 11 may also serve as the function of the other.

The microphone 8 is configured as a sound input unit. The microphone 8 can convert the voice or the like of the user into a sound signal and transmit it to the controller 10.

The storage 9 can store programs and data. The storage 9 is also used as a work area for temporarily storing the processing result of the controller 10. The storage 9 may include any non-transitory storage medium such as a semiconductor storage medium and a magnetic storage medium. The storage 9 may include a plurality of types of storage media. The storage 9 may include a combination of a portable storage medium such as a memory card, an optical disk, or a magneto-optical disk and a reading device of a storage medium. The storage 9 may include a storage device used as a temporary storage area such as a RAM.

Part or all of the programs and data stored in the storage 9 may be downloaded from another device by communication by the communication unit 6. Part or all of the programs and data stored in the storage 9 may be stored in a non-transitory storage medium readable by a reading device included in the storage 9. Part or all of the programs and data stored in the storage 9 may be stored in a non-transitory storage medium readable by a reading device connected to the connector.

The program to be stored in the storage 9 includes an application program executed in the foreground or the background and a control program for supporting the operation of the application. The application instructs the controller 10 to execute, for example, a process of displaying a screen on the display 2A and a process corresponding to a gesture detected via the touch screen 2B.

The control program includes, for example, an OS.

The storage 9 stores, for example, a control program 9A and the setting data 9Z.

The setting data 9Z includes information on various settings related to the operation of the smartphone 1.

The control program 9A provides functions related to various controls for operating the smartphone 1. The control program 9A realizes a call by, for example, controlling the communication unit 6, the receiver 7, the microphone 8, and so forth. The function provided by the control program 9A includes a function of controlling information to be displayed on the display 2A. The functions provided by the control program 9A include a function of performing various controls such as changing information displayed on the display 2A according to an operation detected via the touch screen 2B. The functions provided by the control program 9A may be used in combination with functions provided by other programs such as the mail application.

The control program 9A causes the smartphone 1 to determine whether the user of the subject device is crossing the pedestrian overpass based on height information of the smartphone 1 and the height information of the pedestrian overpass. In the first embodiment, if the communication unit 6 establishes communication with the roadside unit 110, the control program 9A causes the smartphone 1 to acquire, by the atmospheric pressure sensor 18, an atmospheric pressure value Xp [hPa] of the atmospheric pressure around the smartphone 1. Then, the control program 9A causes the smartphone 1 to determine whether the user of the subject device is crossing the pedestrian overpass based on whether the user of the subject device is at the predetermined height TH of the pedestrian overpass which is determined based on a change amount $\Delta Xp$ [hPa] of the atmospheric pressure value Xp of the atmospheric pressure around the smartphone 1 and the altitude determination threshold value $\Delta p1$. The atmospheric pressure value Xp, the change amount $\Delta Xp$, the altitude determination threshold value $\Delta p1$, and the predetermined height TH are illustrated in FIG. 2.

If it is determined that the change amount $\Delta Xp$ of the atmospheric pressure value Xp within a communication area of the roadside unit 110 is equal to or greater than the altitude determination threshold value $\Delta p1$, the control program 9A causes the smartphone 1 to determine that the user of the subject device is crossing the pedestrian overpass. in other words, if the user of the subject device moves an altitude difference causing the change amount $\Delta Xp$ of the atmospheric pressure value Xp equal to or greater than the altitude determination threshold value $\Delta p1$ in the communication area of the roadside unit 110, the control program 9A causes the smartphone 1 to determined that the user of the subject device is crossing the pedestrian overpass. If it is determined that the change amount of the atmospheric pressure value Xp within a communication area of the roadside unit 110 is less than the altitude determination threshold value $\Delta p1$, the control program 9A causes the smartphone 1 to determine that the user of the subject device is not crossing the pedestrian overpass. In other words, if the user of the subject device moves an altitude difference causing the change amount $\Delta Xp$ of the atmospheric pressure value Xp less than the altitude determination threshold value $\Delta p1$ in the communication area of the roadside unit 110, the control program 9A causes the smartphone 1 to determined that the user of the subject unit is not crossing the pedestrian overpass.

The controller 10 is represented by an arithmetic processing unit. The arithmetic processing unit includes at least one processor to provide control and processing capabilities to execute various functions, as described in further detail below. The description of the processor included in the controller 10 is similar to those of the above-described processors included in the controller 120 of the roadside unit 110. In the first embodiment, the arithmetic processing unit includes, but not limited to, CPU, SoC, MCU, and FPGA, for example. The controller 10 comprehensively controls the operation of the smartphone 1 to realize various functions.

The controller 10 executes an instruction included in the program stored in the storage 9 while referring to the data stored in the storage 9 as necessary. And, the controller 10 controls the function unit in accordance with the data and the instruction, thereby realizing various functions The function unit may include, but not limited to, at least one of the display 2A, the communication unit 6, the receiver 7, and the speaker 11, for example. The controller 10 may change the control in accordance with the detection result of the detection unit. The detection unit may include, but not limited to, for example, at least one of the touch screen 2B, the button 3, the illuminance sensor 4, the proximity sensor 5, the microphone 8, the camera 12, the camera 13, the accelerometer 15, the azimuth sensor 16 and the gyroscope 17.

The controller 10 can detect an operation on the smartphone 1. Specifically, the controller 10 cooperates with the touch screen 2B to detect an operation on the touch screen 2B (touch screen display 2).

For example, the controller 10 can execute various controls such as changing information displayed on the display 2A according to an operation detected via the touch screen 2B, by executing the control program 9A.

The camera 12 is a front camera that photographs an object facing the front face 1A.

The camera 13 is a rear camera that photographs an object facing the back face 1B.

The connector 14 is a terminal to which another device is connected. The connector 14 may be a general-purpose terminal such as Universal Serial Bus (USB), High-Definition Multimedia Interface (registered trademark) (HDMI), Light Peak (Thunderbolt (registered trademark)), and earphone microphone connector. The connector 14 may be a dedicated terminal such as a Dock connector. Devices connected to the connector 14 include, but not limited to, an external storage, a speaker, and a communication device, for example.

The accelerometer 15 can detect information indicating the direction and magnitude of the acceleration acting on the smartphone 1. The azimuth sensor 16 can detect information indicating the direction of the terrestrial magnetism. The gyroscope 17 can detect information on the angle and angular velocity of the smartphone 1. The detection results of the accelerometer 15, the azimuth sensor 16 and the gyroscope 17 are used in combination, for example, in order to detect changes in the position and the posture of the smartphone 1.

In an example shown in FIG. 7, the smartphone 1 comprises three types of sensors for detecting the position and the posture thereof, however, the smartphone 1 may not comprise some sensors among the three sensors. Alternatively, the smartphone 1 may comprise other types of sensors for detecting at least one of the position and the posture.

The atmospheric pressure sensor 18 can acquire height calculation information for calculating the height information of the smartphone 1. In the first embodiment, the atmospheric pressure sensor 18 can detect the atmospheric pressure value Xp around the subject device. The atmospheric pressure sensor 18 has a precision capable of detecting the change amount $\Delta Xp$ of the atmospheric pressure value Xp due to the movement of the subject device in the vertical direction of about several tens [m] to several [m]. The atmospheric pressure sensor 18 is disposed in the housing 20. The housing 20 has a hole that allows air to pass through and allows no water to pass through. The atmospheric pressures of inside and outside of the housing 20 are linked to each other through the hole. Therefore, the atmospheric pressure sensor 18 can detect atmospheric pressure value Xp around the subject device while the sensor is located in the housing 20.

The atmospheric pressure sensor 18 is switched between ON and OFF by the controller 10. In the first embodiment, if the controller 10 determines that the subject device is present in the communication area of the roadside unit 110 on the pedestrian overpass, the atmospheric pressure sensor 18 is turned ON and starts to detect the atmospheric pressure value Xp around the subject device. If the controller 10 determines that the subject device is out from the communication area of the roadside unit 110 on the pedestrian overpass, the atmospheric pressure sensor 18 is turned OFF and stops detecting the atmospheric pressure value Xp around the subject device. The detection result of the atmospheric pressure sensor 18 is input into the controller 10. The detection result of the atmospheric pressure sensor 18 may be input into the controller 10 after processes such as Low Pass Filter (LPF) is performed thereon.

The GPS receiver 19 can detect the current position of an electronic device 1. The GPS receiver 19 receives a radio wave signal having a predetermined frequency band from a GPS satellite, demodulates the received radio wave signal and delivers the processed signal to the controller 10. In the first embodiment, the case where the smartphone 1 includes the GPS receiver 18 will be described, but it is not limited thereto. For example, the smartphone 1 may comprise a receiver that receives a radio wave signal from positioning satellites besides the GPS satellite. For example, the electronic device 1 may detect the current position based on a base station with which the communication unit 6 wirelessly communicates. For example, the electronic device 1 may detect the current position by using a plurality of methods in combination.

Figure 8:
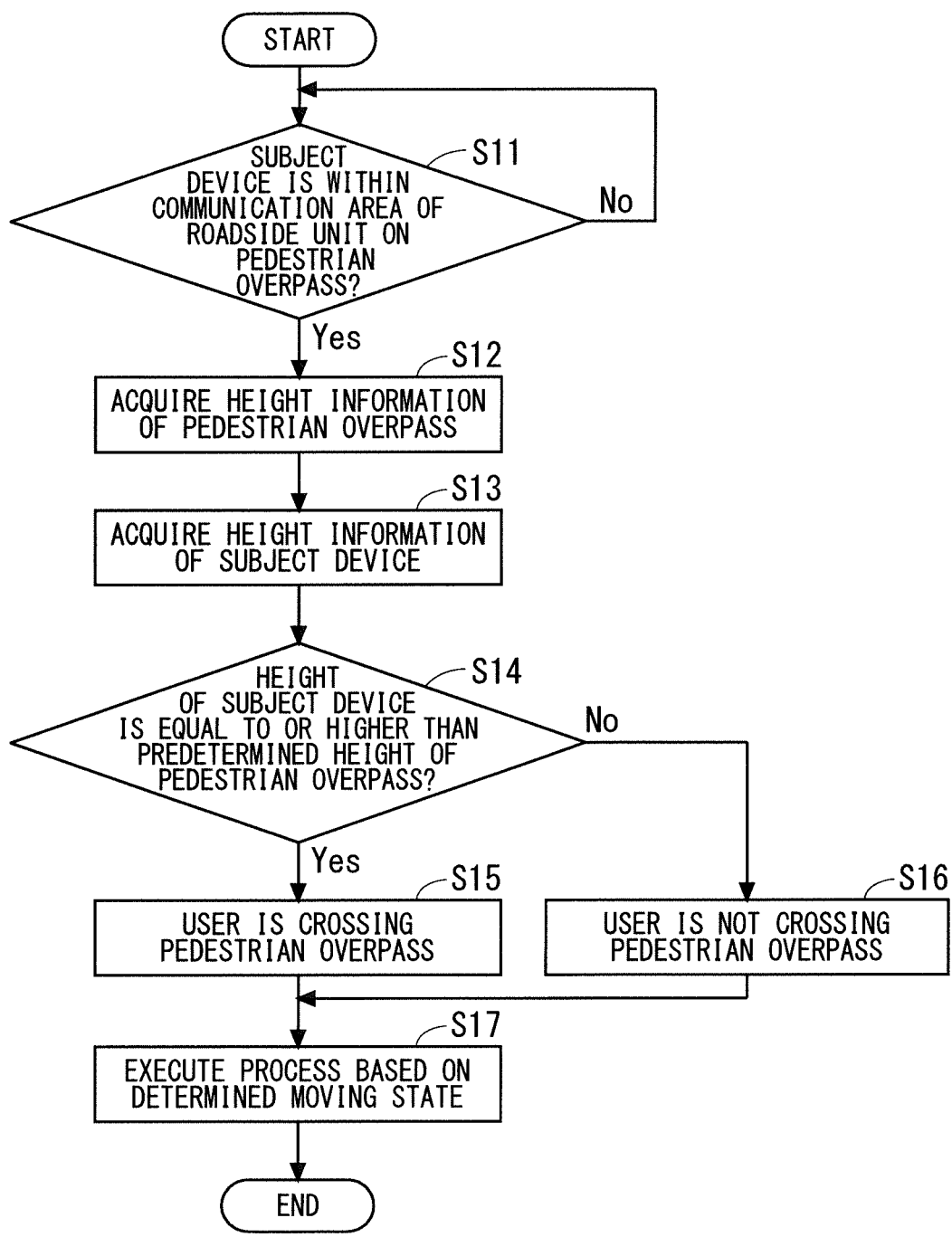
FIG. 8 illustrates a flowchart showing an example of control performed by the smartphone.

Next, with reference to FIG. 8, a control method of the smartphone 1 and the control program 9A and the action thereof will be described. FIG. 8 illustrates a flowchart showing an example of control performed by the smartphone 1.

The smartphone 1 can realize a function illustrated in FIG. 8 by executing the control program 9A stored in the storage 9 by the controller 10. Also, the controller 10 may execute a processing procedure for other function in parallel with the processing procedure illustrated in FIG. 8. The smartphone 1 performs a series of processes illustrated in FIG. 8, for example, in a repeated manner.

The controller 10 determines whether the subject device is present within the communication area of the roadside unit 110 on the pedestrian overpass. Specifically, the controller 10 receives information wirelessly output by the roadside unit 110, if the subject device approaches within the predetermined distance of the roadside unit 110. In other words, if a communicable roadside unit 110 is detected based on the result of the sensor, the roadside unit 110 receives the information wirelessly transmitted by the roadside unit 110. The term "communicable" specifically means that a signal with which data can be transmitted and received has arrived. The controller 10 may determine whether the subject device has approached within the predetermined distance of the roadside unit 110, for example, based on whether a reception signal strength of a wireless signal output from the roadside unit 110 is equal to or greater than a predetermined value. Specifically, if the reception signal strength of the radio output from the roadside unit 110 is equal to or greater than the predetermined value, the controller 10 determines that the subject device is within the communication area of the roadside unit 110 on the pedestrian overpass (Yes in step S11). Specifically, if the reception signal strength of the radio output from the roadside unit 110 is less than the predetermined value, the controller 10 determines that the subject device is not within the communication area of the roadside unit 110 on the pedestrian overpass (Yes in step S11).

If it is determine YES in step S11, the controller 10 acquires the height information of the pedestrian overpass (step S12). In the first embodiment, the controller 10 acquires the threshold value data 112B from the roadside unit 110.

After step S12, the controller 10 acquires the height information of the subject device (step S13). The controller 10 calculates the height information of the subject device based on the atmospheric pressure value Xp around the subject device. In the first embodiment, the controller 10 turns ON the atmospheric pressure sensor 18. And, the controller 10 acquires the change amount ΔXp of the atmospheric pressure value Xp around the subject device during a period the atmospheric pressure sensor 18 is in operation and stores it into the storage 9 as the height information of the subject device. In other works, the controller 10 acquires the change amount ΔXp of the atmospheric pressure value Xp around the subject device within the communication area of the roadside unit 110 and stores it into the storage 9 as the height information of the subject device.

After step S13, the controller 10 determines whether or not the subject device is equal to or higher than the predetermined height TH of the pedestrian overpass based on the height information of the subject device (step S14). More specifically, if the change amount ΔXp of the atmospheric pressure value Xp around the subject device calculated in step S13 is equal to or greater than the altitude determination threshold value Δp1, the controller 10 determines "Yes" in step S14. If the change amount ΔXp of the atmospheric pressure value Xp around the subject device calculated in step S13 is less than the altitude determination threshold value Δp1, the controller 10 determines "No" in step S14.

If the controller 10 determines that the change amount ΔXp of the atmospheric pressure value Xp around the subject device is equal to or greater than the altitude determination threshold value Δp1, it is determined that the user of the subject device is crossing the pedestrian overpass, in other words, the user of the subject device is on the pedestrian overpass (step S15). The controller 10 can exclude the user on the pedestrian overpass from pedestrians who are objects of attention.

If the controller 10 determines that the change amount ΔXp of the atmospheric pressure value Xp around the subject device is less than the altitude determination threshold value Δp1 (No in step S14), it is determined that the user of the subject device is not crossing the pedestrian overpass, in other words, the user of the subject device is under the pedestrian overpass (step S16). In such a case, the user of the subject device is not using the pedestrian overpass and is moving on the road. For example, the controller 10 can include the user into the pedestrians who are objects of attention.

The term "pedestrians who are the objects of attention" indicates pedestrians whom a driver of the vehicle 200 needs to pay attention to so that the vehicle 200 does not collide while the vehicle 200 is travelling. In the first embodiment, a pedestrian who is not crossing the pedestrian overpass may have a chance to collide with the vehicle 200, therefore, the pedestrian is included as pedestrians who are the objects of attention. Meanwhile, a pedestrian who is crossing the pedestrian overpass has less chance to collide with the vehicle 200, therefore, the pedestrian is not included as pedestrians who are the objects of attention.

The controller 10 executes a process based on the determined moving state (step S17). For example, the controller 10 may transmit the determination result in step S14 to the roadside unit 110 together with information on the identification number and the current position of the subject device via the communication unit 6. The controller 10 may transmit the determination result to the roadside unit 110 only when it is determined that the user of the subject device is not crossing the pedestrian overpass. In other words, the controller 10 may not transmit the determination result to the roadside unit 110 only when it is determined that the user of the subject device is crossing the pedestrian overpass.

The controller 10 may output the determination result to the roadside unit 110 as it is. For example, the controller 10 may transmit whether the user of the subject device is crossing the pedestrian overpass to the roadside unit 110 together with the information on the identification number and the current position of the subject device.

The controller 10 may process the determination result and output the result to the roadside unit 110. For example, if it is determined that the user of the subject device is not crossing the pedestrian overpass, the controller 10 may transmit information to the effect that the user of the subject device is a pedestrian who is an object of attention to the roadside unit 110. Alternatively, if it is determined that the user of the subject device is crossing the pedestrian overpass, the controller 10 may transmit information to the effect that the user of the subject device is a pedestrian who is not an object of attention for the vehicle 200 to the roadside unit 110.

The roadside unit 110 may output the determination result to the vehicle 200 as it is based on the received determination result. For example, the roadside unit 110 may transmit whether the user of the subject device is crossing the pedestrian overpass to the vehicle 200 together with the information on the identification number and the current position of the smartphone 1.

Based on the received determination result, the roadside unit 110 may process the determination result and output to the vehicle 200. For example, if it is confirmed that the user of the smartphone 1 is not crossing the pedestrian overpass based on the received determination result, the roadside unit 110 may transmit the information to the effect that the user is the pedestrian who is the object of attention to the vehicle 200. If it is confirmed that the user of the smartphone 1 is crossing the pedestrian overpass based on the received determination result, the roadside unit 110 may transmit the information to the effect that the user is the pedestrian who is the object of attention to the vehicle 200.

The vehicle 200 may cause the display 2A to display the determination result as it is based on the received determination result. Alternatively, the vehicle 200 may process the determination result and cause the display 2A to display the result.

Accordingly, excessive operations are suppressed in the inter-pedestrian vehicle communication and the inter-road vehicle communication.

Alternatively, for example, the controller 10 may transmit the determination result directly to the roadside unit 110 together with the information on the identification number and the current position of the subject device via the communication unit 6. Accordingly, the controller 10 can transmit the information on the subject device to the vehicle 200 without passing through the roadside unit 110.

Alternatively, for example, the controller 10 may cause the display 2A to display the determination result. Therefore, the controller 10 can perform processing making the user pay attention to oneself via the subject device.

According to the first embodiment above, the smartphone 1 can determine whether the user of the subject device is crossing the pedestrian overpass based on the change amount $\Delta Xp$ of the atmospheric pressure value $Xp$ around the subject device within the communication area of the roadside unit 110 and the altitude determination threshold value $\Delta p1$ acquired from the roadside unit. Accordingly, the smartphone 1 can precisely determine the moving state of the subject device.

If it is confirmed that the user of the smartphone 1 is crossing the pedestrian overpass, the roadside unit 110 can exclude the user from the pedestrians who are the objects of attention based on the determination result of whether the user is crossing the pedestrian overpass acquired from the smartphone 1. If the user of the smartphone 1 is not crossing the pedestrian overpass, the roadside unit 110 can include the user as the pedestrians who are the objects of attention. The roadside unit 110 outputs the information on the pedestrian who is an object of attention to the vehicle 200. Therefore, the roadside unit 110 can suppress an excessive operation such as notification of unnecessary pedestrian information to the vehicle 200.

Preferably, the smartphone 1 turns ON the atmospheric pressure sensor 18 and detects the atmospheric pressure value $Xp$ only when the smartphone 1 enters into the communication area of the roadside unit 110 on the pedestrian overpass. Therefore, the smartphone 1 can suppress the power consumption as compared with a case where the atmospheric pressure value $Xp$ is constantly detected by the atmospheric pressure sensor 18.

The smartphone 1 can determine whether the user of the subject device is crossing the pedestrian overpass without the atmospheric pressure value around the roadside unit 110. Therefore, in the first embodiment, installation of the atmospheric pressure sensor in the roadside unit 110 is not necessary. Also, the smartphone 1 can determine whether the user of the subject device is crossing the pedestrian overpass without the atmospheric pressure value on the pedestrian overpass. Therefore, in the first embodiment, installation of the atmospheric pressure sensor on the pedestrian overpass is not necessary. Therefore, the first embodiment can be readily implemented.

In the first embodiment, the controller 10 of the smartphone 1 determines whether the user of the subject device is crossing the pedestrian overpass based on the change amount $\Delta Xp$ of the atmospheric pressure value $Xp$ around the subject device. However, the controller 10 may determine whether the user of the subject device is crossing the pedestrian overpass based on an altitude difference $\Delta Xh$ obtained by converting the change amount $\Delta Xp$ into the altitude difference $\Delta Xh$ [m] corresponding thereto. In this case, as illustrated in FIG. 9, the altitude difference between the height of the road and the predetermined height TH from the road is stored in the storage 112 as the altitude determination threshold value $\Delta h1$ [m] as the threshold value data 112B.

Figure 9:
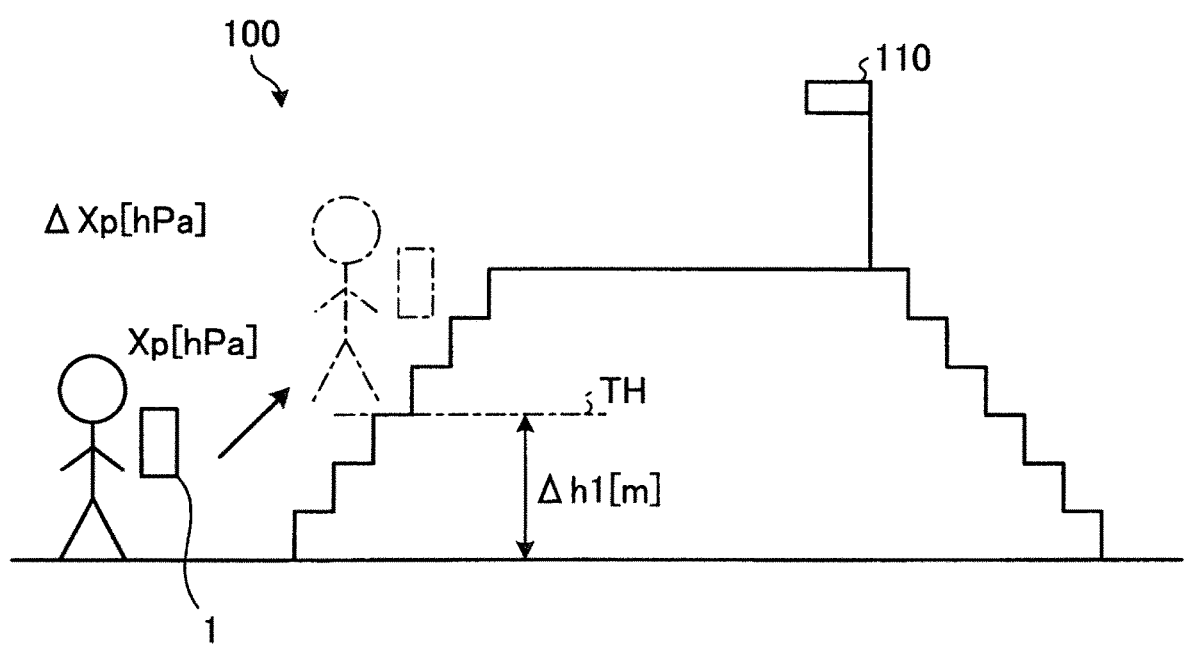
FIG. 9 illustrates a schematic diagram showing a schematic configuration of an example of the control system.

FIG. 9 illustrates a schematic diagram showing another example of the schematic configuration of the control system 100. The control program 9A causes the smartphone 1 to determine whether the user of the subject device is crossing the pedestrian overpass based on the change amount ΔXh of the subject device corresponding to the change amount ΔXp of the atmospheric pressure value Xp around the subject device and the altitude determination threshold value Δh1 included in the threshold value data 112B.

Second Embodiment

Figure 10:
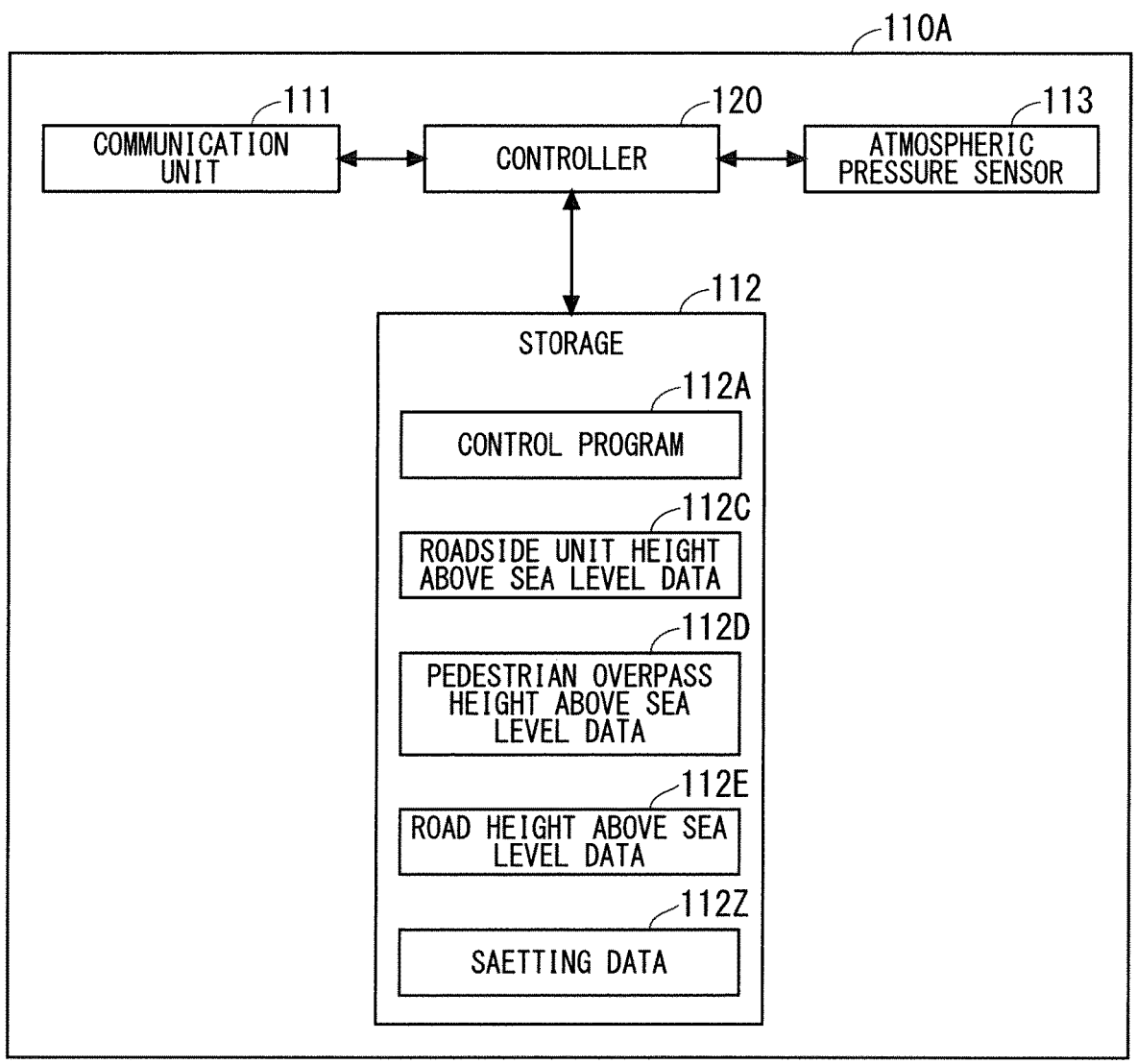
FIG. 10 illustrates a block diagram showing an example of a roadside unit.
Figure 11:
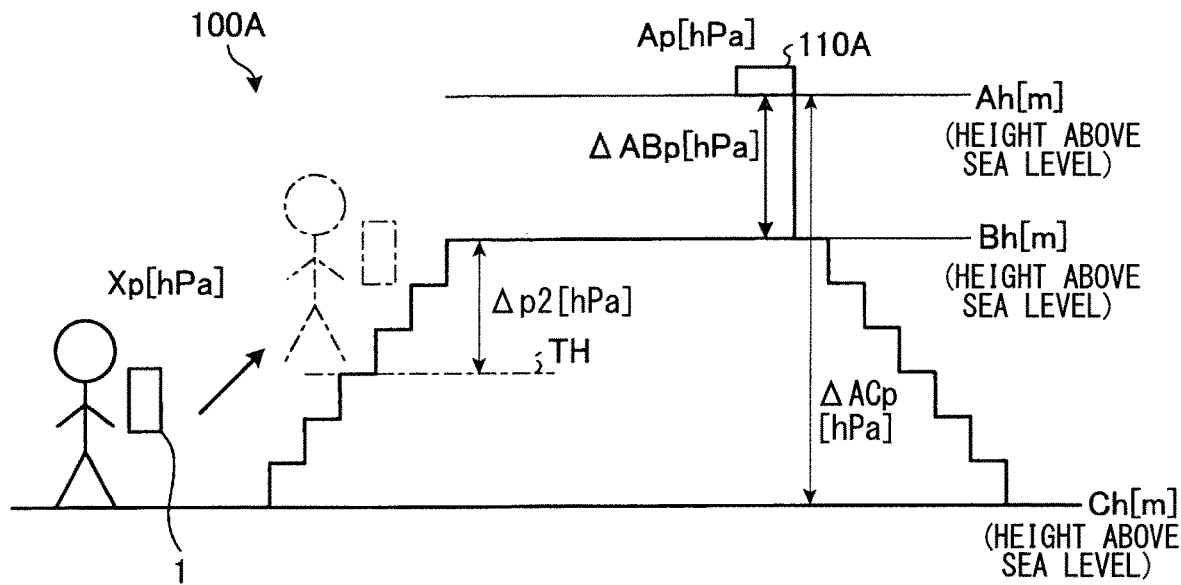
FIG. 11 illustrates a schematic diagram showing a schematic configuration of an example of a control system.

With reference to FIGS. 10 and 11, a control system 100A including a smartphone 1 according to the second embodiment will be described. FIG. 10 illustrates a block diagram showing a roadside unit 110A included in the control system 100A. FIG. 11 illustrates a schematic diagram showing a schematic configuration of the control system 100A. The smartphone 1 according to the second embodiment determines whether the user of the subject device is crossing the pedestrian overpass based on a difference between an atmospheric pressure value Xp around a subject device and an atmospheric pressure value Ap [hPa] around the roadside unit 110A and threshold value information. In the second embodiment, the roadside unit 110A and a control program 9A are different from those of the first embodiment.

The roadside unit 110A includes a communication unit 111, storage 112, an atmospheric pressure sensor 113, and a controller 120.

The storage 112 stores a control program 112A, a roadslide unit height above sea level data 112C, a pedestrian overpass height above sea level data 112D, a road height above sea level data 112E, and a setting data 112Z, for example.

The roadside unit height above sea level data 112C stores identification information of the roadside unit 110A, position information of the roadside unit 110A, and altitude Ah [m] of the roadside unit in association with each other. More specifically, for each piece of identification information of the roadside unit 110A, the roadside unit height above sea level data 112C stores position information indicating the installation position of the roadside unit 110A by latitude and longitude and the altitude Ah of the roadside unit 110A.

The pedestrian overpass height above sea level data 112D stores identification information of the pedestrian overpass, position information of the pedestrian overpass, and the altitude Bh [m] of the pedestrian overpass in association with each other. More specifically, for each piece of identification information of the pedestrian overpass, the pedestrian overpass height above sea level data 112D stores position information indicating the installation position of the pedestrian overpass by latitude and longitude and the altitude Bh of the pedestrian overpass.

The road height above sea level data 112E stores identification information of the road, position information of a point at which the pedestrian overpass locates on the road, and the altitude Ch [m] of the point in association with each other. More specifically, for each piece of identification information of the road, the road height above sea level data 112E stores position information indicating the position of the point at which the pedestrian overpass locates on the road and the altitude Ch of the point.

The roadside unit 110A wirelessly outputs, for example, the atmospheric pressure value Ap around the roadside unit 110A, the roadside unit height above sea level data 112C, the pedestrian overpass height above sea level data 112D, and the road height above sea level data 112E, together with the identification information of the subject unit.

The atmospheric pressure sensor 113 acquires height information of the pedestrian overpass. In the second embodiment, the height information of the pedestrian overpass is the atmospheric pressure value Ap around the roadside unit 110A installed on the pedestrian overpass. The atmospheric pressure sensor 113 is disposed in the housing of the roadside unit 110A. The housing has a hole that allows air to pass through and allows no water to pass through. The atmospheric pressures of inside and outside of the housing are linked to each other through the hole. Therefore, the atmospheric pressure sensor 113 can detect atmospheric pressure value Ap around the roadside unit 110A while the sensor is located in the housing. The detection result of the atmospheric pressure sensor 113 is input into the controller 120. The detection result of the atmospheric pressure sensor 113 may be input into the controller 120 after processes such as LPF.

A communication unit 6 of the smartphone 1 acquires a first atmospheric pressure value which is height information of the pedestrian overpass and threshold value information for determining whether the user of the subject device is crossing the pedestrian overpass from the roadside unit 110A installed on the pedestrian overpass. More specifically, the communication unit 6 acquires the atmospheric pressure value Ap around the roadside unit 110A, the roadside height above sea level data 112C as the threshold value information, pedestrian overpass height above sea level data 112D, and road height above sea level data 112E.

The control program 9A causes the smartphone 1 to calculate a value by subtracting a relative atmospheric pressure between the roadside unit 110A and the pedestrian overpass from a relative atmospheric pressure between the atmospheric pressure value Xp around the subject device and the atmospheric pressure Ap as a difference value. The control program 9A causes the smartphone 1 to determine whether the height of the subject device is equal to or higher than the predetermined height TH of the pedestrian overpass based on the difference value and the threshold value information thereby determining whether the user of the subject device is crossing the pedestrian overpass. If the smartphone 1 determines that the difference value (relative atmospheric pressure ΔAXp-relative atmospheric pressure ΔABp) [hPa] is less than the altitude determination threshold value Δp2 [hPa], the control program 9A causes the smartphone 1 to determine that the user of the subject device is crossing the pedestrian overpass. Here, the relative pressure ΔAXp is a difference between the atmospheric pressure value Xp around the subject device and the atmospheric pressure value Ap around the roadside unit 110A. The relative atmospheric pressure ΔABp is the relative atmospheric pressure corresponding to the altitude difference ΔABh between the roadside unit 110A and the pedestrian overpass. If the smartphone 1 determines that the difference value (relative atmospheric pressure ΔAXp-relative atmospheric pressure ΔABp) is equal to or greater than the altitude determination threshold value Δp2, the control program 9A causes the smartphone 1 to determine that the user of the subject device is not crossing the pedestrian overpass. It should be noted that, the control program 9A may cause the smartphone 1 to determine whether the user of the subject device is crossing the pedestrian overpass simply in accordance with the comparison between the relative atmospheric pressure ΔAXp and the predetermined altitude determination threshold value. The predetermined altitude determination threshold value may be appropriately set in accordance with the height of the pedestrian overpass and the installation height of the roadside unit 110A. For example, the roadside unit 110A may store a predetermined altitude determination threshold value in advance and transmit thereof to the smartphone 1 at a predetermined timing.

For example, if it is assumed that the middle of the height of the pedestrian overpass is the predetermined height TH, the altitude determination threshold value $\Delta p2$ is expressed as $(\Delta ACp-\Delta ABp)/2$. Here, $\Delta ACp$ [hPa] represents an atmospheric pressure difference between the roadside unit 110A and the road, and $\Delta ABp$ [hPa] represents an atmospheric pressure difference between the roadside unit 110A and the pedestrian overpass. An atmospheric pressure value Bp on the pedestrian overpass is calculated based on the atmospheric pressure value Ap around the roadside unit 110A, the roadside height above sea level data 112C, the pedestrian overpass height above sea level data 112D, and road height above sea level data 112E. An atmospheric pressure value Cp on the road is calculated based on the atmospheric pressure value Ap around the roadside unit 110A, the roadside height above sea level data 112C, and road height above sea level data 112E.

Next, a control method of the smartphone 1 and the control program 9A and the action thereof will be described. In the second embodiment, the controller 10 performs processing illustrated in FIG. 8, for example, in a repeated manner.

Steps S11, S15, and S16 in the flowchart illustrated in FIG. 8 are the same as in the first embodiment.

In step S12 in the flowchart illustrated in FIG. 8, the controller 10 acquires a detection result of the atmospheric pressure sensor 113, the roadside unit height above sea level data 112C, the pedestrian overpass height above sea level data 112D, and the road height above sea level data 112E from the roadside unit 110A.

In step S13 in the flowchart illustrated in FIG. 8, the controller 10 acquires the height information of the subject unit. More specifically, the controller 10 turns ON the atmospheric pressure sensor 18. And, the controller 10 acquires the atmospheric pressure value Xp around the subject unit and stored the value into the storage 9.

In step S14 in the flowchart illustrated in FIG. 8, the controller 10 determines whether the subject unit is equal to or higher than the predetermined height TH of the pedestrian overpass. More specifically, if the a difference between the relative atmospheric pressure $\Delta AXp$ between the smartphone 1 and the roadside unit 110A and the relative atmospheric pressure corresponding to the altitude difference $\Delta ABh$ between the roadside unit 110A and the pedestrian overpass is less than the altitude determination threshold value $\Delta p2$ ($\Delta AXp-\Delta ABp<\Delta p2$), the controller 10 makes a Yes determination in step S14. The relative pressure $\Delta AXp$ is a difference between the atmospheric pressure value Xp around the subject unit and the atmospheric pressure value Ap around the roadside unit 110A. If a difference between the relative atmospheric pressure $\Delta AXp$ and the relative atmospheric pressure $\Delta ABp$ is equal to or greater than the altitude determination threshold value $\Delta p2$ ($\Delta AXp-\Delta ABp \geq \Delta p2$), the controller 10 makes a No determination in step S14.

According to above-described embodiments, the smartphone 1 can determine whether the user of the subject unit is crossing the pedestrian overpass based on the relative atmospheric pressure $\Delta AXp$ calculated from the atmospheric pressure value Xp and the atmospheric pressure value Ap around the roadside unit 110A between the smartphone 1 and the roadside unit 110A and the altitude determination threshold value $\Delta p2$. Accordingly, the smartphone 1 can precisely determine the moving state of the subject unit.

The smartphone 1 can determine whether the user of the subject unit is crossing the pedestrian overpass based on the relative atmospheric pressure $\Delta AXp$ between the smartphone 1 and the roadside unit 110A and the altitude determination threshold value $\Delta p2$. Therefore, the smartphone 1 can precisely determine the moving state of the subject unit despite the daily change of atmospheric pressure value measured by the atmospheric pressure sensor 113 of the roadside unit 110A or the smartphone 1, due to external factors such as weather.

Figure 12:
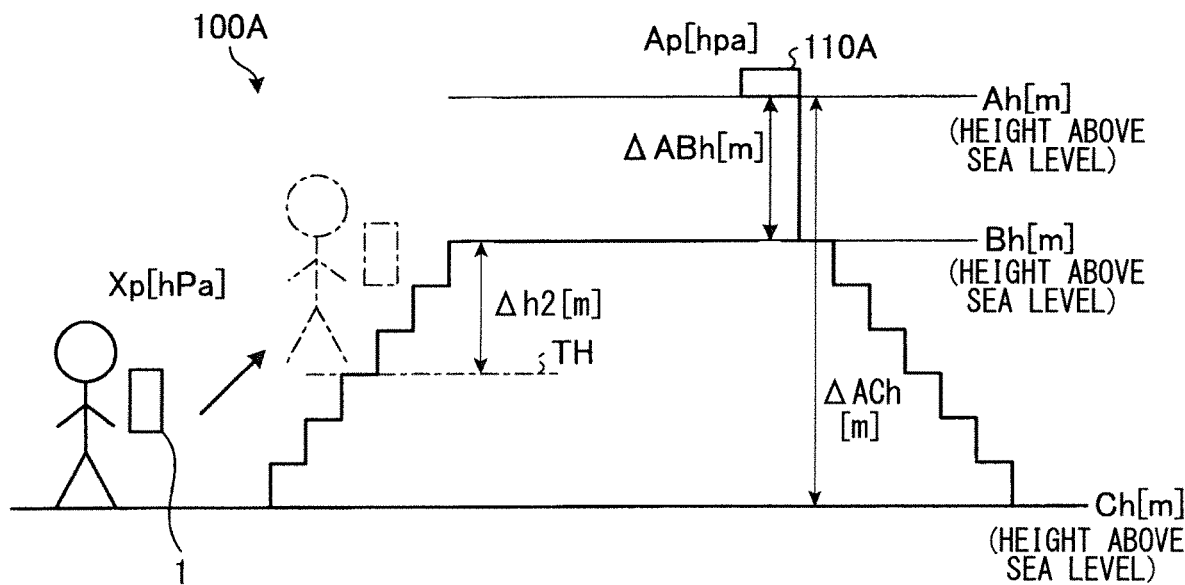
FIG. 12 illustrates a schematic diagram showing a schematic configuration of an example of the control system.

In the second embodiment, whether the user of the subject unit is crossing the pedestrian over pass is determined based on the relative pressure $\Delta AXp$, however, the determination may be made based on a relative altitude $\Delta AXh$ [m] between the smartphone 1 and the roadside unit 110A corresponding to the relative atmospheric pressure $\Delta AXp$ and the altitude determination threshold value $\Delta h2$ [m]. In this case, as illustrated in FIG. 12 for example, the altitude determination threshold value $\Delta h2$ is expressed as $(\Delta ACh-\Delta ABh)/2$ if it is assumed that the middle of the height of the pedestrian overpass is the predetermined height TH. FIG. 12 illustrates another example of the schematic diagram showing a schematic configuration of the control system 100A. $\Delta ACh$ [m] represents an altitude difference between the roadside unit 110A and the road and $\Delta ABh$ represents an altitude difference between the roadside unit 110A and the pedestrian overpass. The control program 9A causes the smartphone 1 to obtain a deference value between the relative altitude $\Delta AXh$ corresponding to the relative atmospheric pressure $\Delta AXp$ and the altitude difference $\Delta ABh$ between the roadside unit 110A and the pedestrian overpass. The control program 9A causes the smartphone 1 to determine whether the user of the subject unit is crossing the pedestrian overpass based on the deference value and the altitude determination threshold value $\Delta h2$. It should be noted that, the control program 9A may cause the smartphone 1 to determine whether the user of the subject unit is crossing the pedestrian overpass simply in response to the comparison between the relative altitude $\Delta AXh$ and the predetermined altitude determination threshold value. The predetermined altitude determination threshold value may be appropriately set in accordance with the height of the pedestrian overpass and the installation height of the roadside unit 110A. For example, the roadside unit 110A may store a predetermined altitude determination threshold value in advance and transmit thereof to the smartphone 1 at a predetermined timing.

Third Embodiment

Figure 13:
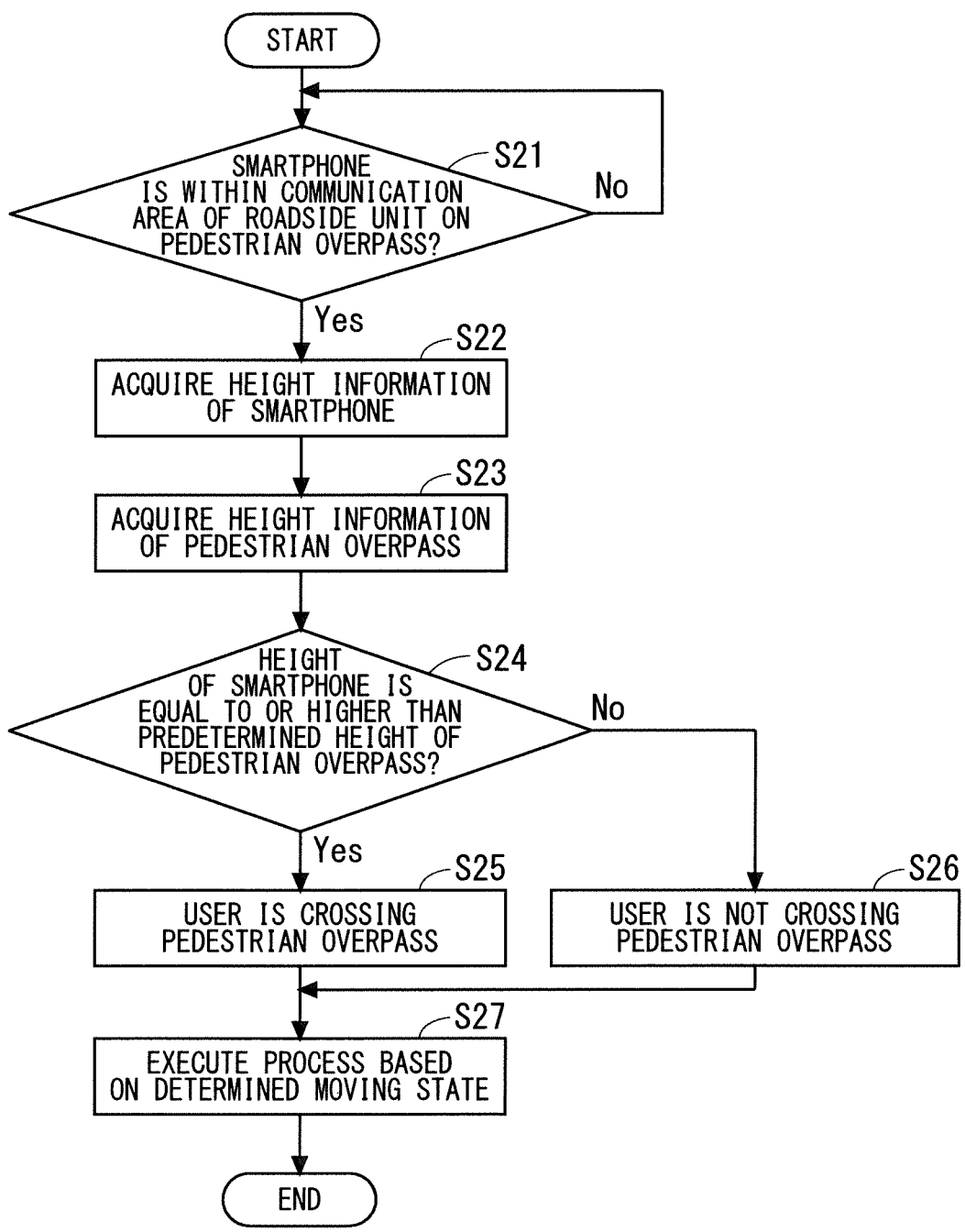
FIG. 13 illustrates a flowchart showing an example of control performed by the roadside unit.

With reference to FIG. 13, a control system 100 including a roadside unit 110 according to the third embodiment will be described. FIG. 13 illustrates a flowchart showing an example of control performed by the roadside unit according to the third embodiment. the third embodiment is different from the first embodiment in that the roadside unit 110 determines whether the user of the smartphone 1 is crossing the pedestrian overpass.

The roadside unit determines whether the user of the smartphone 1 is crossing the pedestrian overpass based on height information of the pedestrian overpass and the height information of the smartphone 1. The roadside unit 110A includes a communication unit 111, storage 112, and a controller 120.

The communication unit 111 communicates with the smartphone 1 and receives data including identification information and height information of the smartphone 1.

The control program 112A causes the roadside unit 110 to determine whether the user of the smartphone 1 is crossing the pedestrian overpass based on height information of the smartphone 1 and the height information of the pedestrian overpass. In the third embodiment, if the communication unit 111 establishes communication with the smartphone 1, the control program 112A causes the roadside unit 110 to acquire, by the communication unit 111, an atmospheric pressure value Xp of the atmospheric pressure around the smartphone 1. Then, the control program 112A causes the roadside unit 110 to determine whether the user of the smartphone 1 is crossing the pedestrian overpass based on a change amount ΔXp of the atmospheric pressure value Xp of the atmospheric pressure around the smartphone 1 and the altitude determination threshold value Δp1.

If it is determined that the change amount ΔXp of the atmospheric pressure value Xp is equal to or greater than the altitude determination threshold value Δp1, the control program 112A causes the roadside unit 110 to determine that the user of the smartphone 1 is crossing the pedestrian overpass. If it is determined that the change amount ΔXp of the atmospheric pressure value Xp is less than the altitude determination threshold value Δp1, the control program 112A causes the roadside unit 110 to determine that the user of the smartphone 1 is not crossing the pedestrian overpass.

The smartphone 1 transmits height calculation information for calculating the height of the subject unit to the roadside unit 110 by communicating with the roadside unit 110 via the communication unit 6. The smartphone 1 transmits the atmospheric pressure value Xp around the smartphone 1 detected by the atmospheric pressure sensor 18 to the roadside unit 110 as the height information.

The control program 9A causes the smartphone 1 to transmit the height calculation information of the smartphone 1 to the roadside unit 110 via the communication unit 6.

Next, with reference to FIG. 13 a control method of the roadside unit 110 and the control program 112A and the action thereof will be described.

The smartphone 1 can realize a function illustrated in FIG. 13 by executing the control program 112A stored in the storage 112 by the controller 120. Also, the controller 120 may execute a processing procedure for other function in parallel with the processing procedure illustrated in FIG. 13. The roadside unit 110 performs a series of processes illustrated in FIG. 13, for example, in a repeated manner.

The controller 120 determines presence or absence of the smartphone 1 presenting within the communication area of the roadside unit 110 on the pedestrian overpass (step S21). More specifically, if the smartphone 1 approaches within the predetermined distance of the roadside unit 110, the smartphone 1 receives information wirelessly output by the roadside unit 110. If the information from the roadside unit 110 is received, the smartphone 1 transmits an answering signal to the roadside unit 110. If the communication unit 111 receives the answering signal in the roadside unit 110, the controller 120 determines that the information wirelessly output by the roadside unit 110 is received by the smartphone 1. If the information wirelessly output by the roadside unit 110 is received by the smartphone 1, the controller 120 determines that the smartphone 1 is present within the communication area of the roadside unit 110 on the pedestrian overpass (Yes in step S21). Meanwhile, if the communication unit 111 does not receive the answering signal, or, the information wirelessly output by the roadside unit 110 is not received by the smartphone 1, the controller 120 determines that the smartphone 1 is not present within the communication area of the roadside unit 110 on the pedestrian overpass (No in step S21).

If it is determined as Yes in step S21, the controller 120 acquires the height information of the smartphone 1 (step S22). More specifically, the controller 120 acquires an atmospheric pressure value Xp around the smartphone 1 detected by the atmospheric pressure sensor 18 of the smartphone 1.

Following the step S22, the controller 120 acquires height information of the pedestrian overpass (step S23). More specifically, the controller 120 acquires a threshold value data 112B.

Following the step S23, the controller 120 determines whether the smartphone 1 is equal to or higher than a predetermined height TH of the pedestrian overpass based on the height information acquired in steps S22 and S23 (step S24). More specifically, the controller 120 obtains a change amount ΔXp of the atmospheric pressure value Xp around the smartphone 1 based on the height information acquired in step S22. And, if the change amount ΔXp is equal to or greater than the altitude determination threshold value Δp1, the controller 120 determines "Yes" in step S24. Meanwhile, if the change amount ΔXp of the atmospheric pressure value Xp around the smartphone 1 is less than the altitude determination threshold value Δp1, the controller 120 determines "No" in step S24.

If the controller 120 determines that the change amount ΔXp of the atmospheric pressure value Xp around the smartphone 1 is equal to or greater than the altitude determination threshold value Δp1 (Yes in step S24), it is determined that the user of the smartphone 1 is crossing the pedestrian overpass, in other words, the user is on the pedestrian overpass (step S25).

If the controller 120 determines that the change amount ΔXp of the atmospheric pressure value Xp around the smartphone 1 is less than the altitude determination threshold value Δp1 (No in step S24), it is determined that the user of the smartphone 1 is not crossing the pedestrian overpass, in other words, the user is under the pedestrian overpass (step S26).

The controller 120 executes a process based on the determined moving state (step S27). For example, the controller 120 may transmit the determination result of step S24 together with the information on the identification number and the current position of the smartphone 1 to the vehicle 200 via the communication unit 111. The controller 120 may transmit the determination result to the vehicle 200 only when it is determined that the user of the smartphone 1 is not crossing the pedestrian overpass. In other words, the controller 120 may not transmit the determination result to the vehicle 200 if it is determined that the user of the smartphone 1 is crossing the pedestrian overpass.

The controller 120 may output the determination result to the roadside unit 200 as it is. For example, the controller 120 may transmit whether the user of the smartphone 1 is crossing the pedestrian overpass to the vehicle 200 together with the information on the identification number and the current position of the smartphone 1.

The controller 120 may process the determination result and output the result to the roadside unit 200. The controller 120 may transmit the determination result to the vehicle 200 only when it is determined that the user of the smartphone 1 is not crossing the pedestrian overpass. Alternatively, if it is determined that the user of the smartphone 1 is crossing the pedestrian overpass, the controller 120 may transmit information to the effect that the user of the smartphone 1 is a pedestrian who is not an object of attention to the vehicle 200.

The vehicle 200 may cause the display 2A to display the determination result as it is based on the received determination result. Alternatively, the vehicle 200 may process the determination result and causes the display 2A to display the result. Accordingly, excessive operations are suppressed in the inter-pedestrian vehicle communication and the inter-road vehicle communication.

Alternatively, for example, the controller 120 may transmit the determination result together with an identification number of the subject unit to the smartphone 1.

According to the third embodiment above, the roadside unit 110 can determine whether the user of the smartphone 1 is crossing the pedestrian overpass based on the change amount $\Delta Xp$ of the atmospheric pressure value $Xp$ around the smartphone 1 and the altitude determination threshold value $\Delta p1$ acquired from the roadside unit 110. Accordingly, the roadside unit 110 can precisely determine the moving state of the smartphone 1.

Fourth Embodiment

A control system 100A including a roadside unit 110 according to the fourth embodiment will be described. The fourth embodiment is different from the second embodiment in that the roadside unit 110A determines whether the user of the smartphone 1 is crossing the pedestrian overpass.

The roadside unit 110A includes a communication unit 111, storage 112, an atmospheric pressure sensor 113, and a controller 120.

The control program 112A causes the roadside unit 110A to determine whether the height of the smartphone 1 is equal to or higher than a predetermined height TH of the pedestrian overpass based on an atmospheric pressure value $Xp$ around the smartphone 1, an atmospheric pressure $Ap$ around the roadside unit 110A, and threshold value information. If it is determined that the relative atmospheric pressure $\Delta AXp$ between the smartphone 1 and the roadside unit 110A is less than the altitude determination threshold value $\Delta p2$, the control program 112A causes the roadside unit 110A to determine that the user of the smartphone 1 is crossing the pedestrian overpass. If it is determined that the relative atmospheric pressure $\Delta AXp$ is equal to or greater than the altitude determination threshold value $\Delta p2$, the control program 112A causes the roadside unit 110A to determine that the user of the smartphone 1 is not crossing the pedestrian overpass.

Next, a control method of the roadside unit 110A and the control program 112A and the action thereof will be described. In the fourth embodiment, the controller 120 performs processing in accordance with the flowchart illustrated in FIG. 13.

The steps S22, S22, S25, and S26 illustrated in the flowchart in FIG. 13 are the same processes as those in the third embodiment.

The controller 120 acquires height information of the pedestrian overpass in step S23 of the flowchart illustrated in FIG. 13. More specifically, the controller 120 acquires the atmospheric pressure value $Ap$ around the roadside unit 110A detected by the atmospheric pressure sensor 113.

The controller 120 determines whether the smartphone 1 is equal to or higher than the predetermined height TH of the pedestrian overpass in step S24 of the flowchart illustrated in FIG. 13. More specifically, if the a difference between the relative atmospheric pressure $\Delta AXp$ between the smartphone 1 and the roadside unit 112A and the relative atmospheric pressure $\Delta ABp$ corresponding to the altitude difference $\Delta ABh$ between the roadside unit 110A and the pedestrian overpass is less than the altitude determination threshold value $\Delta p2$ ($\Delta AXp-\Delta ABp<\Delta p2$), the controller 10 makes a Yes determination in step S24. If a difference between the relative atmospheric pressure $\Delta AXp$ and the relative atmospheric pressure $\Delta ABp$ is equal to or greater than the altitude determination threshold value $\Delta p2$ ($\Delta AXp-\Delta ABp\geq\Delta p2$), the controller 120 makes a No determination in step S24.

If it is determined that the difference between the relative atmospheric pressure $\Delta AXp$ and the relative atmospheric pressure $\Delta ABp$ is less than the altitude determination threshold value $\Delta p2$, the controller 120 determines that the user of the smartphone 1 is crossing the pedestrian overpass (step S25).

If it is determined that the difference between the relative atmospheric pressure $\Delta AXp$ and the relative atmospheric pressure $\Delta ABp$ is equal to or greater than the altitude determination threshold value $\Delta p2$, the controller 120 determines that the user of the smartphone 1 is not crossing the pedestrian overpass (step S26).

According to the fourth embodiment above, the roadside unit 110A can determine whether the user of the smartphone 1 is crossing the pedestrian overpass based on the relative atmospheric pressure $\Delta AXp$ between the atmospheric pressure value $Xp$ around the smartphone 1 and the atmospheric pressure $Ap$ around the roadside unit 110A and the altitude determination threshold value $\Delta p2$. Accordingly, the roadside unit 110A can precisely determine the moving state of the smartphone 1.

Above embodiments can be appropriately changed within a scope not to impair the gist of the present disclosure. Further, the above embodiments and modifications can be appropriately combined among thereof. For example, the above embodiments can be modified as follows.

Description is made on the smartphone as an example of an electronic device; however, an electronic device in the present disclosure is not limited to a smartphone. An electronic device may include any portable electronic device besides a smartphone. The electronic device, for example includes, but not limited to, a mobile phone, a tablet, a portable personal computer, a digital camera, a media player, an electronic book reader, a satellite navigation system, and a game console.

In above embodiments, although the description is made on a pedestrian as an example of a user of the smartphone 1, whether the user of the subject device is crossing the pedestrian overpass can be determined in the case where the user is a cyclist.

In above embodiments, the atmospheric pressure value $Xp$ around the smartphone 1 is described without considering the height of the smartphone 1 from the user's feet. Whether the user of the subject device is crossing the pedestrian overpass may be more precisely determined by taking the height of the smartphone 1 from the user's feet into consideration. For example, when the screen is displayed on the display 2A of the smartphone 1, the height of the smartphone 1 may be the height of the user's chest. Alternatively, for example, if it is determined that the moving state of the smartphone 1 is cycling, the height of the smartphone 1 may be the height of a bicycle basket.

In the second embodiment and the fourth embodiment, by uniformly setting the height of the roadside units 110A with respect to the pedestrian overpass, the altitude $Ah$ of the roadside unit 110A and the altitude difference $\Delta ABh$ between the roadside unit 110A and the pedestrian overpass are eliminated. Therefore, the labor of registering the altitude $Ah$ of the roadside unit 110A and the altitude difference ΔABh between the roadside unit 110A and the pedestrian overpass is reduced. Moreover, erroneous setting at the time of registration can be suppressed.

Further, in the second embodiment and the fourth embodiment, by uniformly setting the height of the roadside units 110A with respect to the road, advance registration of height information is eliminated. Moreover, erroneous setting at the time of registration can be suppressed.

Furthermore, the road information data may be stored in the storage 112 of the roadside unit 110. The road information data includes inclination information on the road on which the pedestrian overpass is installed. Therefore, if the user is walking on the inclined road and the atmospheric pressure Xp around the smartphone 1 is changing, the erroneous determination that the user is crossing the pedestrian overpass can be suppressed from being made. In other words, accuracy of determination of whether the user is crossing the pedestrian overpass can be improved.

Fifth Embodiment

Figure 14:
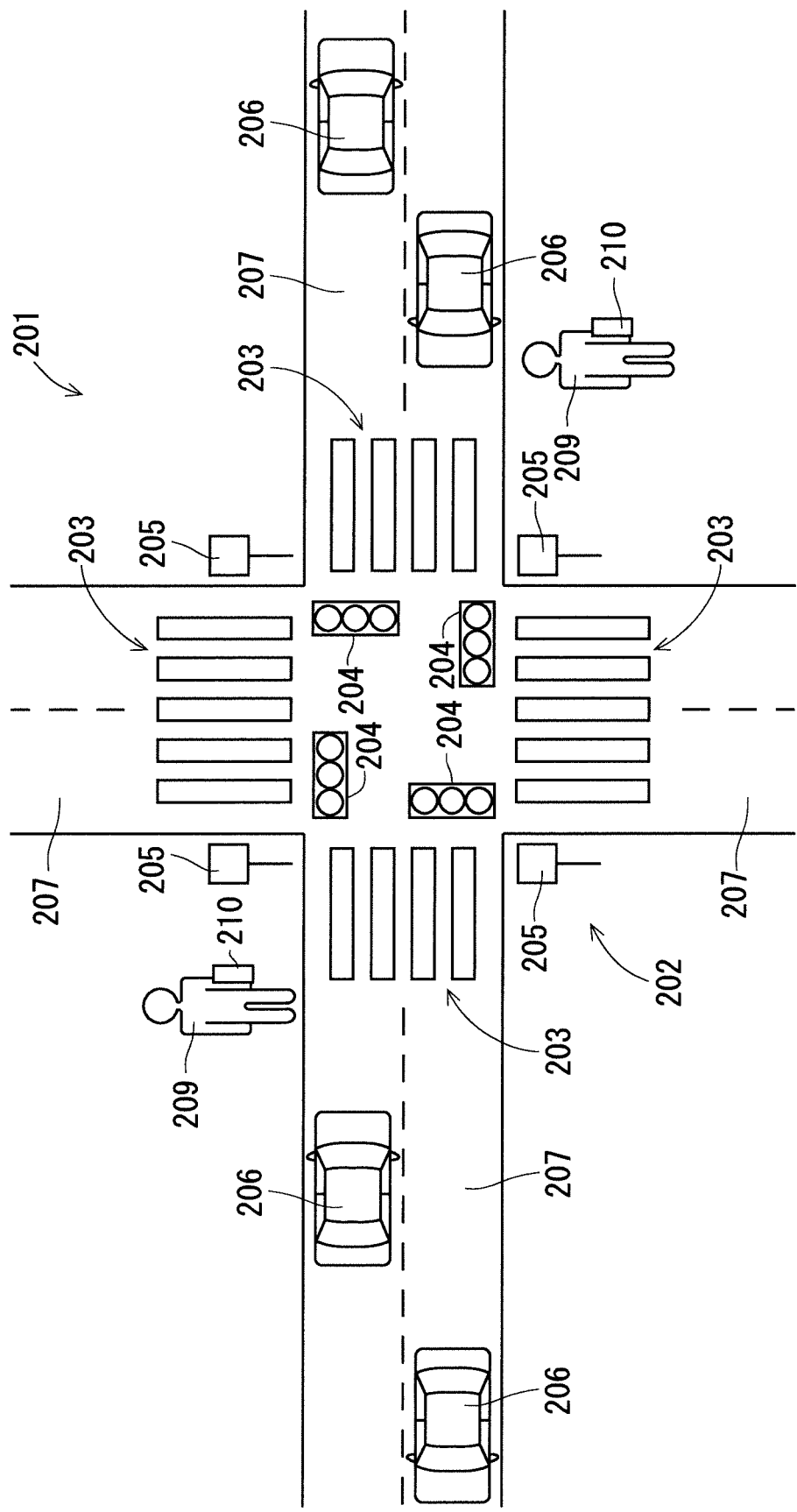
FIG. 14 illustrates an example of a system in which electronic devices are used.

FIG. 14 illustrates an example of a system in which the electronic device according to the fifth embodiment is used. The electronic device 210 includes, for example, a cellular phone such as a smartphone. The electronic device 210 is useable, for example, in the Intelligent Transport Systems (ITS). Specifically, the electronic device 210 is useable in the safe driving assistant communication system 201 in ITS. The safe driving assistant communication system 201 is also referred to as safe driving assistant system or safe driving assistant radio system.

As illustrated in FIG. 14, a roadside unit 205 installed at an intersection 202, a vehicle 206 such as an automobile traveling on a roadway 207, and the electronic device 210 held by a user 209 who is a pedestrian can wirelessly communicate with each other in the safe driving assistant communication system 201. Therefore, the roadside unit 205, the vehicle 206, and the electronic device 210 can exchange information with each other. Also, a plurality of vehicles 206 can wirelessly communicate with each other. Therefore, a plurality of vehicles 206 can exchange information with each other. Communication between the roadside unit 205 and the vehicle 206, communication between the vehicles 206, communication between the roadside unit 205 and the pedestrian's electronic device 210, and communication between the pedestrian's electronic device 210 and the vehicle 206, are referred to as inter-road vehicle communication, inter-vehicle communication, inter-road pedestrian communication, and inter-pedestrian vehicle communication, respectively.

For example, the roadside unit 205 can notify the vehicle 206 and the electronic device 210 of information on lighting of a traffic light 204 and information on road regulation. Also, the roadside unit 205 can detect the vehicle 206 and the pedestrian presenting in the vicinity thereof. The roadside unit 205 installed at the intersection 202 can detect, for example, a pedestrian crossing a crosswalk 203. And, the roadside unit 205 can notify the vehicle 206 and the electronic device 210 of information on the detected vehicle 206 and pedestrian. Also, the roadside unit 205 can notify the other vehicle 206 and the electronic device 210 of information notified from the vehicle 206 and the electronic device 210.

The vehicle 206 can notify other vehicles 206, the roadside unit 205, and the electronic device 210 of information on its position, speed, and turn signals. And the vehicle 206 can assist the safety driving for the driver by notifying the driver of various notification such as warning based on information to be notified. The vehicle 206 can perform various notification for the driver by using a speaker, a display device, and so forth.

The electronic device 210 can specify the state of the user 206 thereof. The electronic device 210 can notify the roadside unit 205 and the like of information and the like on the state of the specified user 209. The operation of the electronic device 210 will be described later in detail.

In this manner, the safety driving for the driver of the vehicle 206 is assisted by executing the inter-road vehicle communication, the inter-vehicle communication, the inter-road pedestrian communication, and the inter-pedestrian vehicle communication in the safe driving assistant communication system 201.

<Appearance of the Electronic Device>

Figure 15:
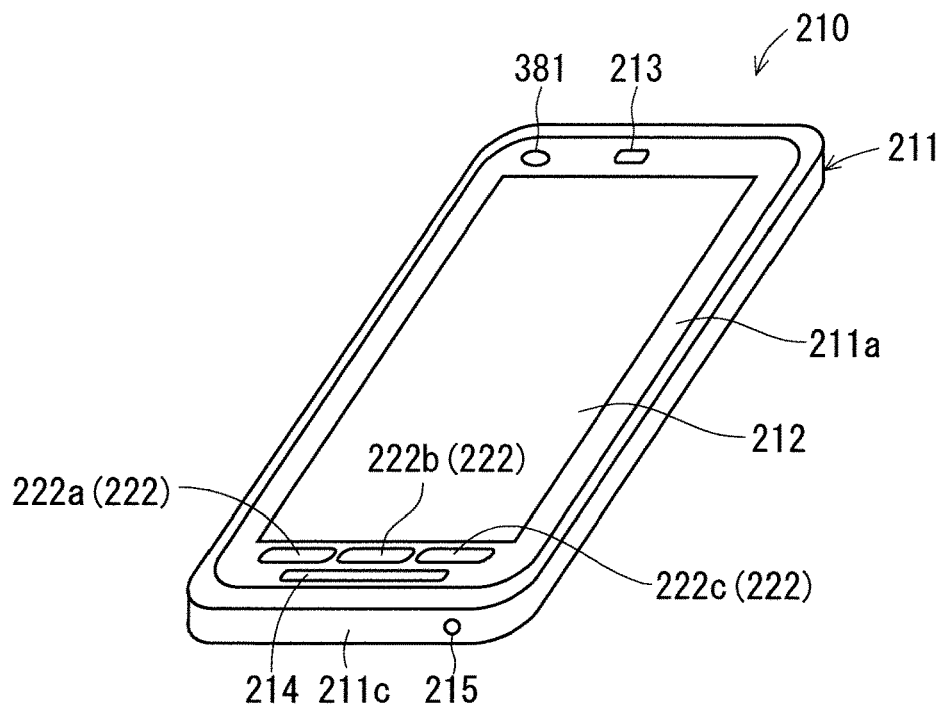
FIG. 15 illustrates a perspective view showing an example of the appearance of an electronic device.
Figure 16:
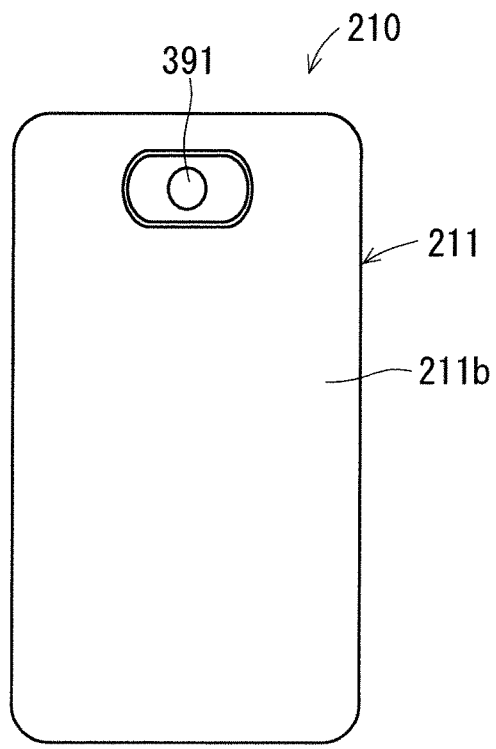
FIG. 16 illustrates a rear view showing an example of the appearance of the electronic device.

FIGS. 15 and 16 are a perspective view and a rear view showing an example of the appearance of the electronic device 210, respectively. As illustrated in FIGS. 15 and 16, the electronic device 210 comprises a plate-like device case 211 having a substantially rectangular shape in plan view. The device case 211 constructs the exterior of the electronic device 210.

On a front surface 211a of the device case 211, a display area 212 on which various types of information such as characters, symbols, and graphics are displayed is positioned. A touch panel 330 described later is positioned on the rear surface side of the display area 212. Therefore, the user 209 can input the various types of information into the electronic device 210 by operating the display area 212 on the front surface of the electronic device 210 by a finger and the like. It should be noted that the user 209 can input the various types of information into the electronic device 210 by operating the display area 212 by an operator including, for example, a pen for touch panel such as a stylus pen, besides a finger.

A receiver hole 213 is positioned on an upper end portion of the front surface 211a of the device case 211. A speaker hole 214 is positioned on a lower end portion of the front surface 211a. A microphone 215 is positioned on a lower side surface 211c of the device case 211.

A lens 381 included in a first camera 380 described later is visible from the upper portion of the front surface 211a of the device case 211. As illustrated in FIG. 16, a lens 391 included in a second camera 390 described later is visible from an upper end portion of a rear surface 211b of the device case 211.

The electronic device 210 comprises an operation button group 420 (see FIG. 17 described later) including a plurality of operation buttons 222. Each operation button 222 is a hardware button. Specifically, each of multiple operation buttons 222 is a push button. It should be noted that, at least one operation button 222 included in the operation button group 420 may be a software button to be displayed on the display area 212.

The operation button group 420 includes operation buttons 222a, 222b, and 222c positioned on the lower end portion of the front surface 211a of the device case 211. Further, the operation button group 420 includes a power button and volume buttons positioned on a surface of the device case 211.

The operation button 222a is a back button, for example. The back button is an operation button for switching a display of the display area 212 to the previous display. The display of the display area 212 is switched to the previous display by operating the operation button 222a by the user 209. The operation button 222b is a home button, for example. The home button is an operation button for causing the display area 212 to display a home screen. The home screen is displayed on the display area 212 by operating the operation button 222b by the user 209. The operation button 222c is a history button, for example. The history button is an operation button for causing the display area 212 to display the history of an application executed in the electronic device 210. The history of an application executed in the electronic device 210 is displayed on the display area 212 by operating the operation button 222c by the user 209.

<Electric Structure of the Electronic Device>

Figure 17:
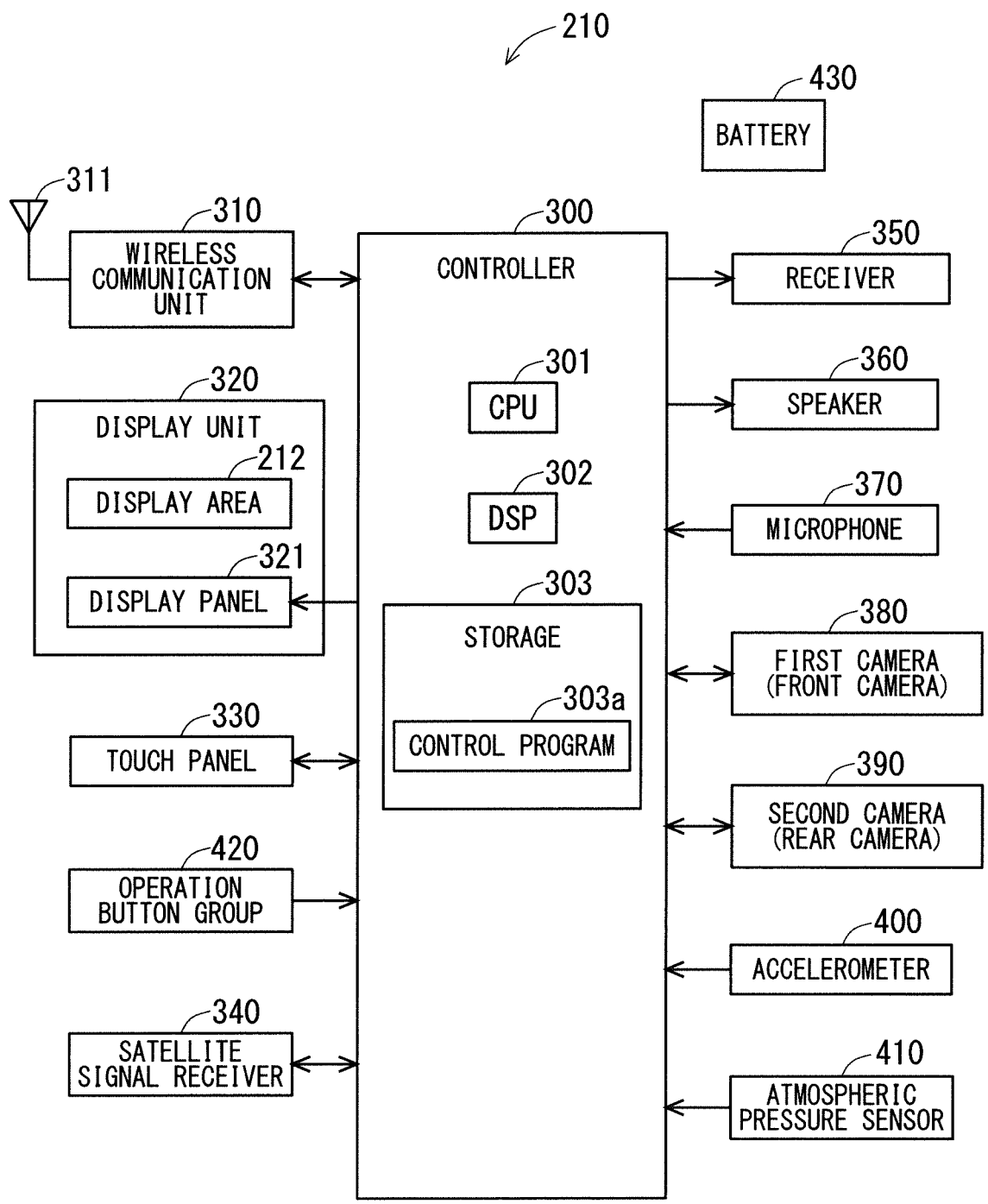
FIG. 17 illustrates a block diagram showing an example of a configuration of the electronic device.

FIG. 17 illustrates a block diagram showing an example of an electric structure of the electronic device 210. As illustrated in FIG. 17, the electronic device 210 comprises a controller 300, a wireless communication unit 310, a display 320, a touch panel 330, a satellite signal receiver 340, and an operation button group 420. The electronic device 210 further comprises a receiver 350, a speaker 360, a microphone 370, a first camera 380, a second camera 390, an accelerometer 400, an atmospheric pressure sensor 410, and a battery 430. The above components included in the electronic device 210 are accommodated in the device case 211.

The controller 300 can integrally manage the operation of the electronic device 210 by controlling other components in the electronic device 210. The controller 300 can also be said to be a control device. The controller 300 includes at least one processor to provide control and processing capabilities to execute various functions, as described in further detail below. The description of the processor included in the controller 300 is similar to those of the above-described processor included in the controller 120 of the roadside unit 110.

In the present example, the controller 300 comprises a CPU 301, a Digital Signal Processor (DSP) 302, and storage 303. The storage 303 includes a CPU 301 such as a Read Only Memory (ROM) and RAM and a non-transitory storage medium capable of reading DPS 302. The ROM included in the storage 303 is a flash ROM (flash memory) which is a nonvolatile memory, for example. The storage 303 stores a plurality of control programs 303a and so forth for controlling the electronic device 210. The various functions of the controller 300 are realized by executing the various control programs 303a in the storage 303 by the CPU 301 and the DSP 302.

Note that all the functions of the controller 300 or a part of the functions of the controller 300 may be realized by a hardware circuit in which software is not required to realize the functions of the hardware circuit. Also, the storage 303 may comprise a non-transitory storage medium that can be read by the computer except for ROM and RAM. The storage 303 may comprise, for example, a small hard disk drive and a Solid State Drive (SSD).

The plurality of control programs 303a in the storage 303 include a variety of applications (application programs). In the storage 303, for example, a calling application for performing a voice call and a video call, a browser for displaying a website, a mail application for creating, browsing, and sending and receiving electronic mails are stored. Also in the storage 303, a camera application for photographing a subject using the first camera 380 and the second camera 390, a recorded image display application for displaying a still image and a moving image recorded in the storage 303, a music reproduction control application for controlling reproduction of music data stored in the storage 303, and so forth are stored. At least one application in the storage 303 may be an application previously stored in the storage 303. Also, at least one application in the storage 303 may be an application downloaded from other device by the electronic device 10 and stored in the storage 303.

The wireless communication unit 310 includes an antenna 311. The wireless communication unit 310 can wirelessly communicate by, for example, a multiple types of communication method by using the antenna 311. The wireless communication unit 310 is controlled by the controller 300.

The wireless communication unit 310 can wirelessly communicate with a base station of a cellular phone system. The wireless communication unit 310 can communicate with a cellular phone other than the electronic device 10 and a web server via a network such as the base station and Internet. The electronic device 10 can perform data communication, a voice call, and a video call with other cellular phone and so forth. Also, the wireless communication unit 310 can wirelessly communicate with the roadside unit 205 and the vehicle 206. The wireless communication unit 310 performs various processes such as amplification processing on a signal received by the antenna 311, and outputs the processed reception signal to the controller 300. The controller 300 performs various processes on the reception signal to be input to acquire information included in the reception signal. Also, the controller 300 outputs a sending signal including the information to the wireless communication unit 310. The wireless communication unit 310 performs various processes such as amplification processing on the sending signal to be input, and wirelessly sends the processed sending signal from the antenna 311.

The display 320 comprises the display area 212 positioned on the front surface of the electronic device 210 and a display panel 321. The display 320 can display various types of information on the display area 212. The display panel 321 includes, for example, a liquid crystal display panel or an organic EL panel. The display panel 321 can display various types of information such as characters, symbols, and graphics by being controlled by the controller 300. The display panel 321 is opposite to the display area 212 in the device case 211. Information displayed on the display panel 321 is displayed in the display area 212.

The touch panel 330 can detect the operation by an operator such as a finger on the display area 212. The touch panel 330 includes, for example, a projection type capacitance touch panel. A touch panel 330 is positioned, for example, on a rear side of the display area 212. When the user 209 performs an operation on the display area 212 with an operator such as a finger, the touch panel 330 can input an electric signal corresponding to the operation to the controller 300. The controller 300 can specify the content of the operation performed on the display area 212 based on the electric signal (output signal) from the touch panel 330. Then, the controller 300 can perform processing according to the specified operation content.

If the user 209 operates each of the operation buttons 222 of the operation button group 420, an operation signal indicating that the any operation button 222 has been operated can be output to the controller 300. Therefore, the controller 300 can determine whether any of the operation buttons 222 has been operated regarding each operation button 222. When the controller 300 to which the operation signal is input controls other components, the function assigned to the operated operation button 222 is executed in the electronic device 210.

The satellite signal receiver 340 can receive a satellite signal transmitted by a positioning satellite. The satellite signal receiver 340 can acquire position information of the electronic device 210 based on the received satellite signal. Specifically, the satellite signal receiver 340 captures the positioning satellite. That is, the satellite signal receiver 340 obtains information necessary for calculating the position information of the electronic device 210 from the satellite signal received from the positioning satellite. The satellite signal receiver 340 obtains the position information of the electronic device 210 based on the acquired information. Also, the satellite signal receiver 340 outputs to the controller 300 the number of positioning satellites from which the information necessary for calculating the position information can be obtained from the satellite signals, that is the number of captured positioning satellites. In the position information the electronic device 210 acquires, latitude and longitude indicating the position of the electronic device 210 is included, for example. The controller 300 can controls the satellite signal receiver 340 to operate and stop the operation. Thereafter, the number of positioning satellites captured by the satellite signal receiver 340 may be referred to as "number of captured satellites" in some cases. Also, the satellite signal receiver 340 may be simply referred to as "receiver 340".

The receiver 340 is, for example, a GPS receiver, and is capable of receiving a radio signal from a GPS positioning satellite. The receiver 340 calculates the current position of the electronic device 210, for example, in latitude and longitude based on the received wireless signal, and outputs position information including the calculated latitude and longitude to the controller 300. The position information of the electronic device 210 can also represent the location information of the user 209 holding the electronic device 210.

The receiver 340 may obtain the position information of the electronic device 210 based on a signal from a positioning satellite of a Global Navigation Satellite System (GNSS) other than the GPS. For example, the receiver 340 may obtain the position information of the electronic device 210 based on a signal from a positioning satellite of a Global Navigation Satellite System (GLONASS), an Indian Regional Navigational Satellite System (IRNSS), a COMPASS, a Galileo, or a positioning satellite of a quasi-zenith satellite system (QZSS).

The microphone 370 can convert a sound input from the outside of the electronic device 210 into an electric sound signal and output the signal to the controller 300. The sound from the outside of the electronic device 210 is taken into the inside of the electronic device 210 through the microphone hole 215 and input to the microphone 370.

The speaker 360 is, for example, a dynamic speaker. The speaker 360 can convert an electrical sound signal from the controller 300 into a sound and output the sound. The sound output from the speaker 360 is output to the outside from the speaker hole 214. The user 209 can hear the sound output from the speaker hole 214 even at a place away from the electronic device 210.

The receiver 350 can output the received sound. The receiver 350 is, for example, a dynamic speaker. The receiver 350 can convert an electrical sound signal from the controller 300 into a sound and output the sound. The sound output from the receiver 350 is output to the outside from the receiver hole 213. The volume of the sound output from the receiver hole 213 is smaller than the volume of the sound output from the speaker hole 215. The user 209 can hear the sound output from the receiver hole 213 by bringing an ear of the user 209 close to the receiver hole 213. Instead of the receiver 350, a vibrating element such as a piezoelectric vibrating element for vibrating the front surface part of the device case 211 may be provided. In this case, the sound is transmitted to the user by vibration of the front surface part.

The first camera 380 comprises a lens 381, an image sensor, and so forth. The second camera 390 comprises a lens 391, an image sensor, and so forth. Each of the first camera 380 and the second camera 390 can photograph a subject under the control of the controller 300, generate a still image or a moving image of the photographed subject, and output the images to the controller 300. The first camera 380 is referred to as a front camera.

The lens 381 of the first camera 380 is visible from the front surface 311*a* of the device case 311. Therefore, the first camera 380 is capable of photographing a subject present on the front surface side (display area 212 side) of the electronic device 210. The lens 391 of the second camera 390 is visible from the rear surface 311*b* of the device case 311. Therefore, the second camera 390 is capable of photographing a subject present on the rear surface side of the electronic device 210. The second camera 390 is referred to as a rear camera.

The accelerometer 400 can detect the acceleration of the electronic device 210. The accelerometer 400 is, for example, a triaxial accelerometer. The accelerometer 400 can detect the acceleration of the electronic device 210 in the x-axis direction, the y-axis direction, and the z-axis direction. The x-axis direction, the y-axis direction, and the z-axis direction are set in, for example, the longitudinal direction, the lateral direction, and the thickness direction of the electronic device 210, respectively.

The atmospheric pressure sensor 410 can detect the atmospheric pressure around the electronic device 210. It can be said that the atmospheric pressure around the electronic device 210 is information changing according to the height of the position of the electronic device 210. Therefore, it can be said that the electronic device 210 is a generator for generating information changing according to the height of the position of the electronic device 210. It can be said that the atmospheric pressure around the electronic device 210 is a smaller value as the height of the position of the electronic device 210 is greater. Hereafter, simply, an atmospheric pressure means the atmospheric pressure around the electronic device 210.

The battery 430 can output the power of the electronic device 210. The battery 430 is, for example, a rechargeable battery. The power output from the battery 430 is supplied to the controller 300 and respective components such as the wireless communication unit 310 included in the electronic device 210.

Note that the electronic device 210 may comprise sensors besides the accelerometer 400 and the atmospheric pressure sensor 410. For example, the electronic device 210 may comprise at least one of an azimuth sensor, a proximity sensor, an illuminance sensor, and a gyro sensor.

<Function Blocks in the Controller>

FIG. 18 is a diagram indicating pat of function blocks formed by executing the control program 303*a* in the storage 303 by the CPU 301 and the DSP 302. As illustrated in FIG. 18, the controller 300 comprises a step counter 500, a state specification unit 600, and a notification determination unit 700 as functional blocks. Note that at least one of the step counter 500, the state specification unit 600, and the notification determination unit 700 may be implemented by a hardware circuit in which software is not required to execute the function of the hardware circuit.

The state specification unit 600 can specify various states of the user 209. The state specification unit 600 comprises, for example, a first specification unit 610 and a second specification unit 620. The first specification unit 610 can primarily specify a moving means of the user 209. In other words, the first specification unit 610 can primarily specify a moving state of the user 209. The second specification unit 620 can determined that the user 209 is on the pedestrian overpass. The type of the state of the user 209 specified by the state specification unit 600 is not limited thereto.

Based on the acceleration detected by the accelerometer 400, the first specification unit 610 can specify, for example, whether the user 209 is moving by oneself or whether the user 209 is moving by riding a vehicle. Here that the user 209 moves by oneself means that the user 209 moves by one's own foot without riding on the vehicle. If the user 209 moving by oneself is referred to as "self-movement", it can be said that the first specification unit 610 can specify the self-movement of the user 209. If the user 209 moving by riding the vehicle is referred to as "vehicle-movement", it can be said that the first specification unit 610 can specify the vehicle-movement of the user 209.

The self-movement that can be specified by the first specification unit 610 includes a walking movement of the user 209 and a running movement of the user 209. If the user 209 moving by running is referred to as "running", the self-movement includes walking and running. In addition, the vehicle-movement that can be specified by the first specification unit 610 includes a bicycle-movement of the user 209 and a movement of the user 209 in which the user 209 moves on a vehicle capable of moving faster than a bicycle, such as an automobile or a train.

Hereafter, in order to distinguish between a bicycle and a vehicle that can move faster than that, simply stating "a vehicle" means a vehicle that can move faster than a bicycle. Further, the following terms are used for the respective moving means: "self-power" for the case where the user 209 moves by oneself, "walk" for the case where the user 209 walks, and "run" for the case where the user 209 runs.

Here, it is known that the acceleration of the electronic device 210 shows a unique pattern of time variation according to the moving means of the user 209 holding the electronic device 210. If the time variation pattern of the acceleration detected by the accelerometer 400 shows a pattern corresponding to "walk", the first specification unit 610 specifies that the moving means of the user 209 is "walk". If the time variation pattern of the acceleration detected by the accelerometer 400 shows a pattern corresponding to "run", the first specification unit 610 specifies that the moving means of the user 209 is "run". If the time variation pattern of the acceleration detected by the accelerometer 400 shows a pattern corresponding to "bicycle", the first specification unit 610 specifies that the moving means of the user 209 is "bicycle". If the time variation pattern of the acceleration detected by the accelerometer 400 shows a pattern corresponding to "vehicle", the first specification unit 610 specifies that the moving means of the user 209 is "vehicle".

In this manner, the first specification unit 610 can specify whether the moving means of the user 209 is walking, running, bicycle or vehicle. For example, the controller 300 can cause the display 320 to display the moving means specified by the first specification unit 610 and the moving distance of the user 209 (the moving distance of the electronic device 210). Therefore, the user 209 can distinguish and confirm the walking distance, the running distance, the travel distance on the bicycle, and the travel distance on the vehicle. The controller 300 can obtain the moving distance of the user 209, for example, based on the position information acquired by the receiver 340.

Further, the first specification unit 610 can specify whether the user 209 stops. The first specification unit 610 can specify, for example, whether the user 209 stops based on the position information acquired by the receiver 340.

The second specification unit 620 can execute the specification processing in which state specification for specifying that the user 209 is on the pedestrian overpass is performed based on receiving state information indicating the receiving state of the receiver 340 and information changing according to the height of the position of the electronic device 210. As the information changing according to the height of the position of the electronic device 210, an atmospheric pressure detected by the atmospheric pressure sensor 410 is used. The specification processing in the second specification unit 620 will be described later in detail.

The step counter 500 can count the steps of the user 209 moving by oneself. The step counter 500 counts the steps of the user 209 moving by oneself based on the acceleration detected by the accelerometer 400, for example. The step counter 500 counts the number of steps of the user 209 when the first specification unit 610 specifies that the user 209 is walking or running. The controller 300 can cause the display 320 to display the number of steps counted by the step counter 500. Thereafter, the number of steps to be counted by the step counter 500 may be simply referred to as "number of counted steps".

The notification determination unit 700 can determine, based on the state of the user 209 specified by the state specification unit 600 or the like, whether the electronic device 210 notifies outside the electronic device 210.

For example, consider the case where the state specification unit 600 specifies that the user 209 is present near the intersection 202. The state specification unit 600 can specify that the user 209 is present near the intersection 202 based on the map information stored in the storage 303 and the position information acquired by the receiver 340. Alternatively, if the wireless communication unit 310 receives a signal from the roadside unit 205 installed at the intersection 202, the state specification unit 600 specifies that the user 209 is present near the intersection 202.

If the state specification unit 600 specifies that the user 209 is present near the intersection 202 and the first specification unit 610 specifies that the moving means of the user 209 is "self-power", the notification determination unit 700 determines that the electronic device 210 transmits notification information notifying that the user 209 is present near the intersection 202 to the outside of the electronic device 210. Also, if the state specification unit 600 specifies that the user 209 is present near the intersection 202 and the first specification unit 610 specifies that the moving means of the user 209 is "bicycle", the notification determination unit 700 determines that the electronic device 210 transmits notification information notifying that the user 209 is present near the intersection 202 to the outside of the electronic device 210. Further, if the state specification unit 600 specifies that the user 209 is present near the intersection 202 and the first specification unit 610 specifies that the user 209 stops, the notification determination unit 700 determines that the electronic device 210 transmits notification information notifying that the user 209 is present near the intersection 202 to the outside of the electronic device 210. The notification information may include information indicating the moving means of the user 209 specified by the first specification unit 610.

If the transmission of the notification information is determined in the notification determination unit 700, the controller 300 causes the wireless communication unit 310 to transmit the notification information. The notification information transmitted from the electronic device 210 is received by the roadside unit 205 installed at the intersection 202, for example. The roadside unit 205 transmits the received notification information to the vehicle 206 near the intersection 202. For example, in the vehicle 206, the notification information is displayed on the display device.

Accordingly, the driver of the vehicle 206 near the intersection 202 can drive while recognizing that a person is present near the intersection 202. As a result, the safety of driving the vehicle 206 is improved.

Note that the notification information notifying that the user 209 is present near the intersection 202 is an example of information that the electronic device 210 notifies to the outside, and the electronic device 210 can perform various notifications to the outside. In addition, the electronic device 210 can directly notify the vehicle 206.

<Specification Processing in the Second Specification Unit>

As illustrated in FIG. 14, when the user 209 is moving on a sidewalk which is almost at the same height as the roadway 207, the user 209 goes into the roadway 207 and the like, and the user 209 and the vehicle 206 possibly collide with each other. Therefore, such a user 209 cannot be said to be safe for the vehicle 206.

Meanwhile, as illustrated in FIG. 19, when the user 209 crosses the pedestrian overpass 800 provided near the intersection 202, for example, the probability that the user 209 collides with the vehicle 206 is low. Therefore, it can be said that the safety of the user 209 present on the pedestrian overpass 800 is high for the vehicle 206.

Accordingly, the safety for the vehicle 206 differs depending on whether the user 209 is on the pedestrian overpass 800. Therefore, from the viewpoint of supporting safe driving of the driver of the vehicle 206, it is desirable to change the operation of the electronic device 210 between if the user 209 is on the pedestrian overpass 800 and if the user 209 is not on the pedestrian overpass 800.

For example, if the user 209 is present near the intersection 202 and the user 209 is not present on the pedestrian overpass 800, the electronic device 210 notifies the roadside unit 205 that the user 209 is present near the intersection 202. Whereas, if the user 209 is present near the intersection 202 and the user 209 is present on the pedestrian overpass 800, the electronic device 210 does not notify the roadside unit 205 that the user 209 is present near the intersection 202.

For example, if the user 209 is not on the pedestrian overpass 800, the electronic device 210 notifies the roadside unit 205 that the probability that the user 209 steps into the roadway is high. Whereas, if the user 209 is on the pedestrian overpass 800, the electronic device 210 notifies the roadside unit 205 that the probability that the user 209 steps into the roadway is low.

As described above, in order for the electronic device 210 to operate properly depending on whether the user 209 is on the pedestrian overpass 800, the electronic device 210 is required to properly specify that the user 209 is on the pedestrian overpass.

Therefore, in the present example, the second specification unit 620 performs the state specification in which that the user 209 is on the pedestrian overpass is specified based on the atmospheric pressure detected by the atmospheric pressure sensor 410 and the receiving state information indicating the receiving state of the receiver 340. As a result, the electronic device 210 can more properly specify that the user 209 is on a pedestrian overpass. For the receiving state information, the number of captured satellites obtained by the receiver 340 is used for example. It can be said that the number of captured satellites is greater as the receiving state of the receiver 340 is better. Hereinafter the specification processing in the second specification unit 620 will be described in detail. Thereafter, the state specification for specifying that the user 209 is on the pedestrian overpass may be referred to as "pedestrian overpass specification". In the specification processing according to the present example, the pedestrian overpass specification is executed based on the atmospheric pressure and the number of captured satellites.

Figure 20:
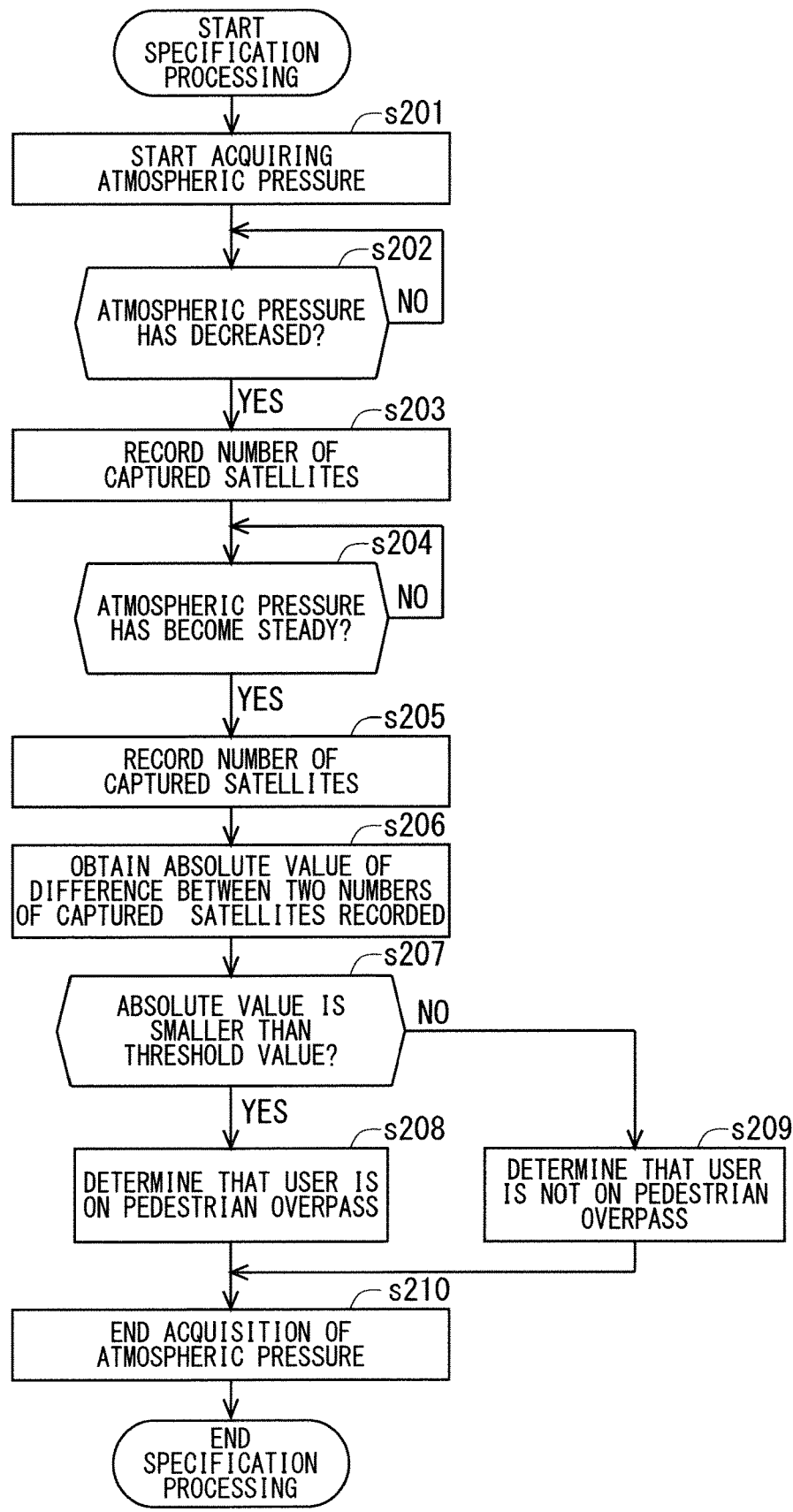
FIG. 20 illustrates a flowchart showing an example of an operation of the electronic device.

FIG. 20 illustrates a flowchart showing an example of the specification processing in the second specification unit 620. As illustrated in FIG. 20, in step s201, the second specification unit 620 starts acquiring the atmospheric pressure detected by the atmospheric pressure sensor 410. When the acquisition of the atmospheric pressure detected by the atmospheric pressure sensor 410 is started, the second specification unit 620 acquires the atmospheric pressure detected by the atmospheric pressure sensor 410 for every increment in N in the number of steps (number of counted steps) counted by the step counter 500. In other words, the second specification unit 620 acquires the latest atmospheric pressure detected by the atmospheric pressure sensor 410 every time the user 209 moving by oneself moves N steps. N is, for example, one or more and set to several or less. N is, for example, one or more and set to five or less.

Next, in step s202, the second specification unit 620 determines whether the atmospheric pressure has decreased. The atmospheric pressure decreases as the height of the position of the electronic device 210 increases, therefore, it can be said that the second specification unit 620 determines whether the height of the position of the electronic device 210 has increased or not.

In step s202, the second specification unit 620 obtains the change amount in atmospheric pressure while the user 209 moves N steps based on the atmospheric pressure acquired from the atmospheric pressure sensor 410. For example, the atmospheric pressure detected by the atmospheric pressure sensor 410 before the number of counted steps increases by N is denoted by P1, and the atmospheric pressure detected by the atmospheric pressure sensor 410 when the number of counted steps increases by N is denoted by P2. The second specification unit 620 sets (P2-P1) as the change amount in atmospheric pressure while the user 209 moves N steps. Thereafter, the change amount in atmospheric pressure while the user 209 moves N steps may be simply referred to as "atmospheric pressure change amount".

Next, in step s202, the second specification unit 620 determines that the atmospheric pressure has decreased if the atmospheric pressure change amount is equal to or smaller than a first threshold value. The step s202 is repeated until a decrease in atmospheric pressure is determined. Until a decrease in atmospheric pressure is determined, the second specification unit 620 obtains the atmospheric pressure change amount for every increment in N in the number of counted steps.

Here, when the user 209 starts to ascend the stairs such as the pedestrian overpass 800, the atmospheric pressure decreases. Therefore, in step s202, it can be said that the second specification unit 620 determines whether the user 209 has started to ascend the stairs or not. For example, the first threshold value is set to a value slightly smaller than the general atmospheric pressure decrease amount while the user 209 is ascending the stairs of the pedestrian overpass 800 by N steps. Note that the second specification unit 620 may determine that the atmospheric pressure has decreased when the atmospheric pressure change amount is smaller than the first threshold value.

If the decrease in atmospheric pressure is determined in step s202, in other words, if it is determined that the user 209 has started to ascend the stairs, the second specification unit 620 records the latest number of captured satellites output from the receiver 340 in the storage 303 in step s203.

Here, the receiver 340 could not possibly capture the positioning satellite immediately after starting the operation. Therefore, if the operation of the receiver 340 starts at the timing when step s203 is executed, the second specification unit 620 could not possibly record the number of captured satellites immediately in step s203.

Therefore, in the present example, when the user 209 starts self-movement, the receiver 340 starts an operation. When the content specified by the first specification unit 610 changes from the content that the user 209 is stopped to the content that the user 209 is moving by oneself (walking or running), the controller 300 determines that the user 209 starts self-movement. Then, the controller 300 causes the receiver 340 to start the operation. The operation of the receiver 340 is stopped in the initial state, and the operation is started when necessary by control by the controller 300. When the first specification unit 610 specifies that the user 209 has stopped, the controller 300 stops the operation of the receiver 340, for example, after a while has elapsed.

Upon starting the operation, the receiver 340 performs an intermittent operation of repeating the sleep mode and the positioning mode. That is, the receiver 340 in a positioning mode captures the positioning satellite and obtains information necessary for calculating the position information of the electronic device 210 from the satellite signal from the positioning satellite. Then the receiver 340 in the positioning mode obtains the position information of the electronic device 210 based on the acquired information. Also, the receiver 340 in the positioning mode outputs to the controller 300 the number of positioning satellites from which the information necessary for calculating the position information can be obtained from the satellite signals, that is the number of captured positioning satellites. In the sleep mode, the capture of the positioning satellite and calculation of position information of the electronic device 210 are not performed.

In step s203, the second specification unit 620 first releases the intermittent operation of the receiver 340 and continues to operate the receiver 340 in the positioning mode. Then, the second specification unit 620 records the latest number of captured satellites output from the receiver 340 in the storage 303.

Accordingly, in the case where the receiver 340 starts an operation when the user 209 starts self-movement, the operation of the receiver 340 has already started at the timing when step s203 is executed. Therefore, the second specification unit 620 can immediately record the number of captured satellites in step s203. It should be noted that, when the user 209 starts vehicle-movement, the receiver 340 may start an operation. Further, the operation of the receiver 340 may start at the timing when step s203 is executed.

After step s203, the second specification unit 620 determines whether the atmospheric pressure has become steady in step s204. In other words, the second specification unit 620 determines whether the height of the position of the electronic device 210 has become steady.

In step s204, the second specification 620 obtains an absolute value of the atmospheric pressure change amount for every increment in N in the number of counted steps based on the atmospheric pressure acquired from the atmospheric pressure sensor 410. The absolute value shows a large value when the user 209 is ascending the stairs. Then, the second specification unit 620 determines that the atmospheric pressure has become steady when the absolute value obtained for every increment in N in the number of counted steps becomes smaller than a second threshold value. The second threshold value is set to a value smaller than the first threshold value. Step s204 is performed continuously until the atmospheric pressure is determined to have become steady. After the user 209 has gone up the stairs, the atmospheric pressure becomes steady, therefore, in step s204, it can be said that the second specification unit 620 determines whether the user 209 has gone up the stairs or not.

Note that in step s204, the second specification unit 620 may determine that the atmospheric pressure has become steady when the absolute value of the atmospheric pressure change amount becomes equal to or smaller than the second threshold value. Also, when the absolute values of the atmospheric pressure change amount continuously obtained are consecutively smaller than the second threshold value for a multiple times or are consecutively equal to or smaller than the second threshold value for a multiple times, the second specification unit 620 may determine that the atmospheric pressure has become steady.

If the atmospheric pressure is determined to have become steady in step s204, the second specification unit 620 records the latest number of captured satellites output from the receiver 340 in the storage 303 in step s205. In other words, if it is determined that the user 209 have gone up the pedestrian overpass 800 in step s204, the second specification unit 620 records the latest number of captured satellites output from the receiver 340 in the storage 303 in step s205.

Next, in step s206, the second specification unit 620 obtains an absolute value of the difference between the number of captured satellites recorded in step s203 and the number of captured satellites recorded in step s205. In step s207, the second specification unit 620 determines whether the absolute value obtained in step s206 is smaller than a third threshold value. The third threshold value is an integer of one or more, and is set to two, for example.

Thereafter, the absolute value obtained in step s206 may be referred to as "satellite number difference absolute value" in some cases. Further, of the two numbers of captured satellites used to obtain the satellite number difference absolute value, the number of captured satellites acquired earlier may be referred to as "first number of captured satellites" while the number of captured satellites acquired later may be referred to as "second number of captured satellites". It can be said that, in step s203, the first number of captured satellites is recorded, and in step s205, the second number of captured satellites is recorded.

When the second specification unit 620 determines that the satellite number difference absolute value is smaller than the third threshold value in step s207, the second specification unit 620 determines that the user 209 is on the pedestrian overpass 800 in step s208. In other words, the second specification unit 620 determines that the user 209 is on the pedestrian overpass 800 if there is almost no difference between the number of captured satellites at the timing when the atmospheric pressure becomes smaller and the number of captured satellites at the timing when the atmospheric pressure has become steady thereafter. In other words, the second specification unit 620 determines that the user 209 is on the pedestrian overpass 800 if there is almost no difference between the number of captured satellites at the timing when the user 209 has started to ascend the stairs and the number of captured satellites at the timing when after the user 209 has gone up the stairs. In other words, the second specification unit 620 determines that the user 209 is on the pedestrian overpass 800 if there is almost no difference between the number of captured satellites at the timing, which is specified based on the atmospheric pressure, when height of the position of the electronic device 210 is increased and the number of captured satellites at the timing, which is specified based on the atmospheric pressure, when the height of the position of the electronic device 210 becomes stable.

Here, the determination in step s202 that the atmospheric pressure has decreased can be viewed that the height of the position of the electronic device 210 has increased. Also, the satellite number difference absolute value obtained in step s206 being smaller than the third threshold value indicates that the receiving state of the receiver 340 is stable. Therefore, it can be said that the second specification unit 620 determines that the user 209 is on the pedestrian overpass 800 if the second specification unit 620 determines that the height of the position of the electronic device 210 increases and the receiving state of the receiver 340 is stable based on the atmospheric pressure and the number of captured satellites.

Meanwhile, when the second specification unit 620 determines that the satellite number difference absolute value is equal to or greater than the third threshold value in step s207, the second specification unit 620 determines that the user 209 is not on the pedestrian overpass 800 in step s209. In other words, the second specification unit 620 determines that the user 209 is not on the pedestrian overpass 800 if there is a large difference between the number of captured satellites at the timing when the atmospheric pressure becomes smaller and the number of captured satellites at the timing when the atmospheric pressure has become steady thereafter. In other words, the second specification unit 620 determines that the user 209 is not on the pedestrian overpass 800 if there is a large difference between the number of captured satellites at the timing when the user 209 has started to ascend the stairs and the number of captured satellites at the timing when after the user 209 has gone up the stairs. In other words, the second specification unit 620 determines that the user 209 is not on the pedestrian overpass 800 if there is a large difference between the number of captured satellites at the timing when the position of the electronic device 210 which is specified based on the atmospheric pressure is increased and the number of captured satellites at the timing when the position of the electronic device 210 which is specified based on the atmospheric pressure becomes stable.

Here, the satellite number difference absolute value being equal to or greater than the third threshold value indicates that the receiving state of the receiver 340 is unstable. Therefore, if it is determined that the height of the position of the electronic device 210 increases and the receiving state of the receiver 340 is unstable based on the atmospheric pressure and the number of captured satellites, it can be said that the second specification unit 620 determines that the user 209 is not on the pedestrian overpass 800.

It should be noted that in the present specification, a description in which if a value is smaller than a threshold value, a process is executed, and if the value is equal to or greater than the threshold value, another process is executed can be replaced with a description in which if the value is equal to or smaller than the threshold value, the process is executed, and if the value is greater than the threshold value, the other process is executed. Therefore, the second specification unit 620 may determine that the user 209 is on the pedestrian overpass 800 if the satellite number difference absolute value is equal to or smaller than the third threshold value and may determine the user 209 is not on the pedestrian overpass 800 if the satellite number difference absolute value is greater than the third threshold value.

Similarly, a description in which if a value is equal to or smaller than a threshold value, a process is executed, and if the value is greater than the threshold value, another process is executed can be replaced with a description in which if the value is smaller than the threshold value, the process is executed, and if the value is equal to or greater than the threshold value, the other process is executed.

If step s208 is executed, the second specification 620 executes step s210. If step s209 is executed, the second specification 620 executes step s210. In step s210, the second specification unit 620 ends acquisition of the atmospheric pressure detected by the atmospheric pressure sensor 410. Also, the second specification unit 620 causes the receiver 340 to perform intermittent operation. If step s210 is executed, the specification processing is ended.

The second specification unit 620 repeatedly executes such above specification processing. If the specification processing is executed in the second specification unit 620, the notification determination unit 700 determines whether the electronic device 210 notifies outside the electronic device 210 based on the result of the specification processing.

For example, if the user 209 is determined to be on the pedestrian overpass in the specification processing, the notification determining unit 700 determines that the electronic device 210 does not notify the outside of the electronic device 210. Alternatively, the notification determination unit 700 determines that the electronic device 210 make notification outside the electronic device 210 that the probability that the user 209 goes into the roadway 207 is low. In this case, the wireless communication unit 310 notifies, for example, the roadside unit 205 that the probability that the user 209 goes into the roadway is low.

Meanwhile, if the user 209 is determined not to be on the pedestrian overpass, the notification determination unit 700 determines that the electronic device 210 notifies outside the electronic device 210 that the probability that the user 209 goes into the road way 207 is high. In this case, the wireless communication unit 310 notifies, for example, the roadside unit 205 that the probability that the user 209 goes into the roadway is high.

Note that the operation of the notification determination unit 700 is not limited to the example. The notification determining unit 700 may determine whether the electronic device 210 notifies outside the electronic device 210 based on the result of the specification processing by the second specifying unit 620 and other information.

In the above example, the atmospheric pressure is adopted as information changing according to the height of the position of the electronic device 210, but other information may be adopted. For example, height information indicating the height of the position of the electronic device 210 may be adopted instead of atmospheric pressure in the specification processing. In this case, the control unit 300 generates the height information based on the atmospheric pressure detected by the atmospheric pressure sensor 410, for example. As the height information, for example, a numerical value representing the height of the position of the electronic device 210 is adopted.

Also, in the above-described specification processing, the number of captured satellites is adopted as the receiving state information, but other information may be adopted. For example, the C/N value of the reception signal at the reception unit 340 may be adopted. The C/N value represents the ratio between the carrier power and the noise power and indicates the reception quality. The receiver 340 can calculate the C/N value of the reception signal and output the signal to the controller 300. If the C/N value is adopted as the receiving state information, the latest C/N value obtained by the receiver 340 is recorded in steps s203 and s205. And, in step s206, the absolute value of the difference between the two recorded C/N values is obtained. And in step s207, it is determined whether the obtained absolute value is smaller than a fourth threshold value. The fourth threshold value is set to ten, for example. If it is determined that the absolute value is smaller than the fourth threshold value, it is determined that the user 209 is on the pedestrian overpass in step s208, and if it is determined that the absolute value is equal to or greater than the fourth threshold value, in step s209, it is determined that the user 209 is not on the pedestrian overpass.

Figure 21:
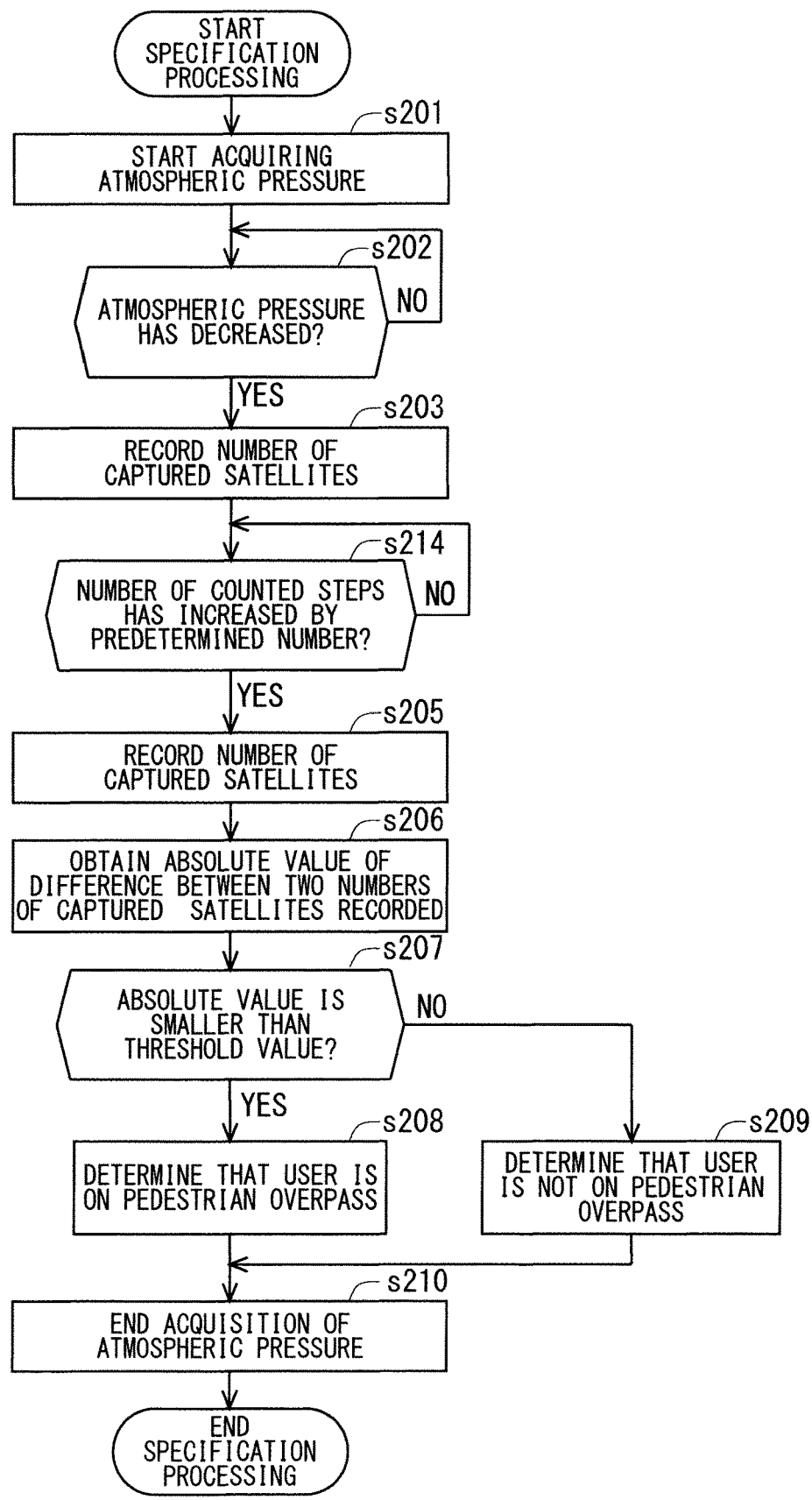
FIG. 21 illustrates a flowchart showing an example of an operation of the electronic device.

Also, in the above example, the number of captured satellites at the timing after the user 209 has gone up the stairs as the second captured number of satellites is adopted, in other words, the number of captured satellites at the timing when the atmospheric pressure is steady is adopted, however the number of captured satellites while the user 209 is ascending the stairs may be adopted. In this case, in step s206, the absolute value of the difference between the two numbers of captured satellites acquired at different timings while the user 209 is ascending the stairs is obtained. In the case where the number of captured satellites while the user 209 is ascending the stairs is adopted as the number of second captured satellites, for example, as illustrated in FIG. 21, the second specification unit 620 executes step s 214 instead of step s204.

In step s214, the second specification unit 620 determines whether the number of counted steps has increased by a predetermined number since the execution of step s203. The predetermined number is set to about several steps. Step s214 is repeatedly executed until the number of counted steps increases by the predetermined number since the execution of step s203 is determined. If the second specification unit 620 determines in step s214 that the number of counted steps has increased by the predetermined number since step s203 is executed, the second specification unit 620 records the latest acquired number of captured satellites in step s205. That is, the second specification unit 620 records the number of captured satellites at the timing when the number of counted steps increases by about several steps after executing step s203. It is a rare case that the user 209 would reach to the top of the stairs by taking a few steps after the user starts to ascend the stairs, therefore, in step s205, the number of captured satellites while the user 209 is ascending the stairs is recorded. After step s205, the second specification unit 620 operates in a similar manner.

As described above, the second specification unit 620 determines that the user 209 is on the pedestrian overpass based on the information changing according to the height of the electronic device 210 and the receiving state information that indicates the receiving state of the receiver 340 so that accurate specification that the user 209 is on the pedestrian overpass can be performed. The description in terms of this point will be made below.

When the user 209 ascends the stairs of the pedestrian overpass 800, the height of the position of the electronic device 210 increases. Therefore, the electronic device 210 can specify that the user 209 is on the pedestrian overpass with a certain degree of accuracy by using information that varies according to the height of the position of the electronic device 210, such as atmospheric pressure.

Figure 22:
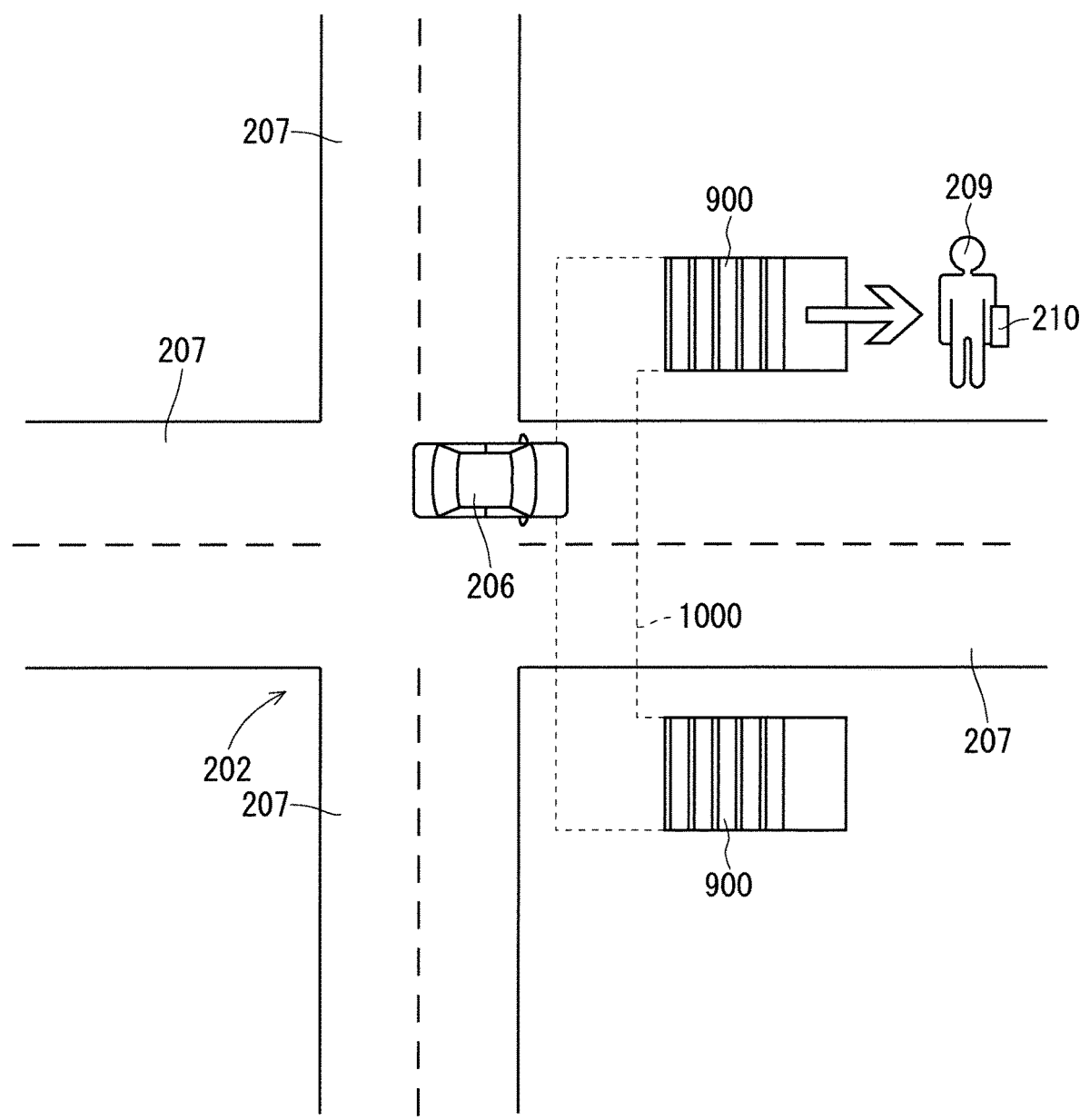
FIG. 22 illustrates a diagram showing an example of a user moving stairs connecting the basement and the ground.

However, as illustrated in FIG. 22, not only when the user 209 is ascending the stairs of the pedestrian overpass 800 but also when the user 209 moves from basement to the ground on a stairway 900 connecting the basement and the ground, the height of the position of the electronic device 210 increases. Therefore, in a case where the electronic device 210 specifies that the user 209 is on the pedestrian overpass using the information changing according to the height of the position of the electronic device 210, the electronic device 210 could erroneously determine the user 209 ascending the stairway 900 connecting the basement and the ground as the user 209 on the pedestrian overpass. Therefore, merely using information that varies depending on the height of the electronic device 210 may not be able to correctly specify that the user 209 is on the pedestrian overpass 800. Similarly, even in the case where the user 209 ascends a slope connecting the basement and the ground, the height of the position of the electronic device 210 increases as well, therefore, merely using information that varies depending on the height of the electronic device 210 may not be able to correctly specify that the user 209 is on the pedestrian overpass 800. In addition, in FIG. 22, the stairway 900 connecting an underpass 1000 passing under the roadway 207 and the ground is shown.

Meanwhile, if the electronic device 210 is present in the basement, it is highly probable that the receiving state of the receiver 340 is poor, while if the electronic device 210 is present on the ground, it is highly probable that the receiving state of the receiver 340 is good. Therefore, it is highly conceivable that the receiving condition of the receiver 340 improves as the user 209 ascends the stairway 900 or the slope connecting the basement and the ground. Therefore, it is highly conceivable that the absolute value obtained in step s207 increases. On the other hand, the pedestrian overpass 800 is on the ground; therefore, if the user 209 ascends the stairs of the pedestrian overpass 800, it is likely that the receiving state of the receiver 340 does not change. In other words, if the user 209 ascends the stairs of the pedestrian overpass 800, it is likely that the receiving state of the receiver 340 is steady. Therefore, it is highly conceivable that the absolute value obtained in step s207 decreases.

In this manner, the receiving state of the receiver 340 is different between the case where the user 209 ascends the stairs of the pedestrian overpass 800 and the case where the user 209 ascends the stairway 900 or the slope connecting the underground and the ground. Therefore, as in the present example, the second specification unit 620 can accurately specify that the user 209 is on the pedestrian overpass by specifying that the user 209 is on the pedestrian overpass based on, not only information that varies according to the height of the position of the electronic device 210, but also the receiving state information indicating the receiving state of the receiver 340. For example, as described above, the absolute value in step s207 obtained if the height of the position of the electronic device 210 increases is smaller than the third threshold value, it is determined that the user 209 is on the pedestrian overpass, while, the absolute value is greater than the third threshold value, it is determined that the user 209 is not on the pedestrian overpass, thereby accurately specifying that the user 209 is on the pedestrian overpass. Accordingly, the electronic device 210 can appropriately specify the state of the user.

Also, while the user 209 is ascending the stairway 900 leading to the ground, the user 209 is not completely on the ground, therefore, it is likely that the receiving state of the receiver 340 does not improve so much. Therefore, as in the example of FIG. 21 described above, in the case where the number of captured satellites acquired while the user 209 is ascending the stairs is recorded in step s205, the absolute value of the difference between the two numbers of captured satellites acquired at two different timings while the user 209 is ascending the stairs is obtained in step s206, despite the fact that the user 209 is ascending the stairway 900 leading to the ground, the satellite number difference absolute value possibly becomes small. As a result, despite the fact that the user 209 is ascending the stairway 900 leading to the ground, it is probable that the user 209 is determined to be on the pedestrian overpass.

On the other hand, after the user 209 has gone up the stairway 900 leading to the ground, the user 209 is present on the ground; therefore, it is highly likely that the receiving state of the receiver 340 is good. Therefore, as in the example of FIG. 20, in the case where the number of captured satellites after the user 209 has gone up the stairs is recorded in step s205, the absolute value of the difference between the number of captured satellites acquired while the user 209 is ascending the stairs and the number of captured satellites acquired after the user 209 has gone up the stairs is obtained in step s206, the probability that the satellite number difference absolute value becomes large is high. As a result, if the user 209 ascends the stairway 900 leading to the ground, it is accurately determined that the user 209 is not on the pedestrian overpass.

Further, when the user 209 has gone up the stairway 900 leading to the ground, there may be a shade above the entranceway of the stairway 900. The receiving state of the receiver 340 could be poor when the user has gone up the stairway 900 because of this shade. Therefore, it is probable that the absolute value obtained in step s206 does not become large even if the user 209 has gone up the stairway 900. As a result, despite the fact that the user 209 is ascending the stairway 900 leading to the ground, it is probable that the user 209 is determined to be on the pedestrian overpass.

Figure 23:
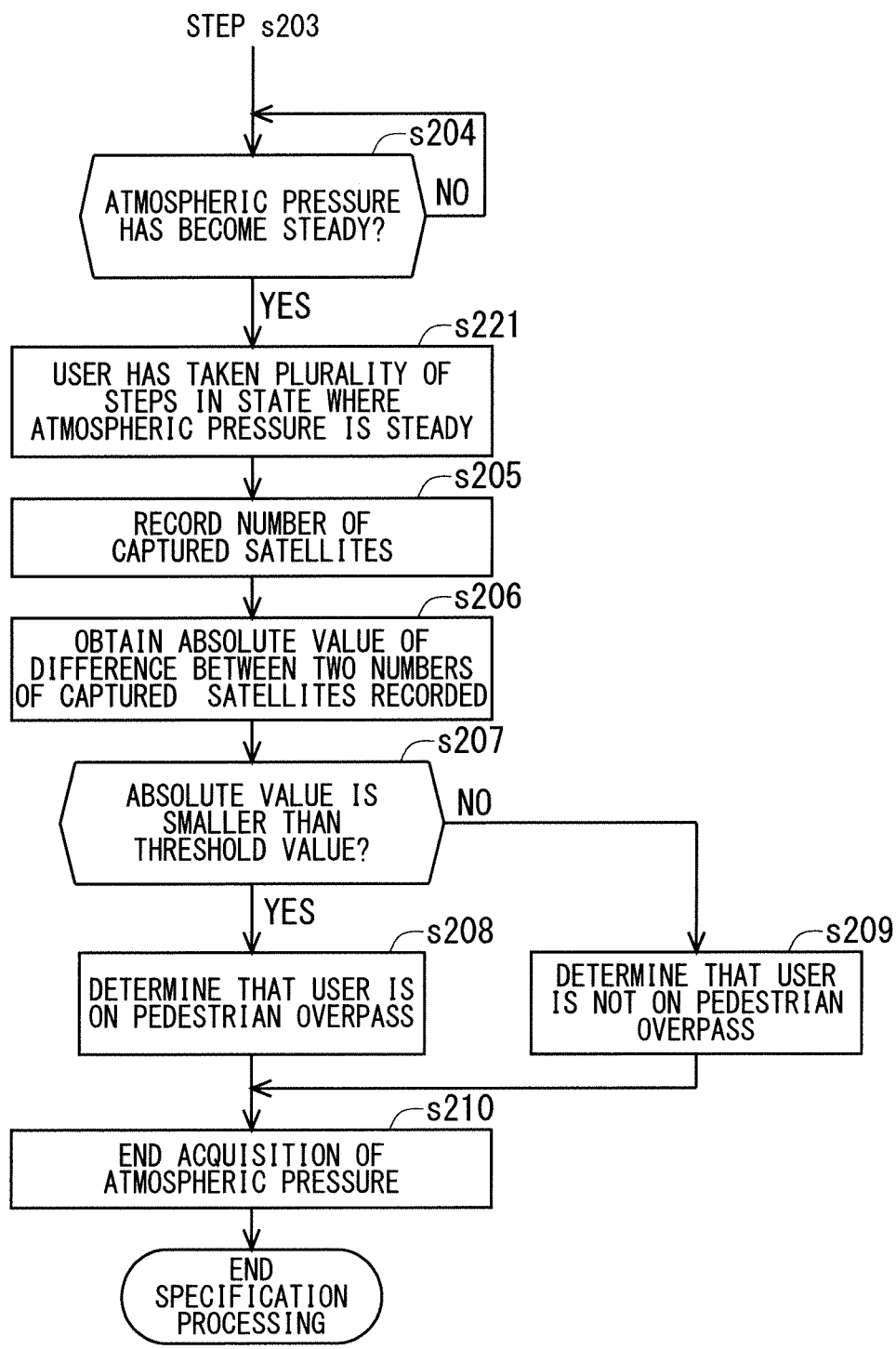
FIG. 23 illustrates a flowchart showing an example of an operation of the electronic device.

Therefore, the second specification unit 620 may record the number of captured satellites when the user 209 takes a plurality of steps in a state where the atmospheric pressure is steady in the storage 303 in step s205. Therefore, the second specification unit 620 may record the number of captured satellites when the user 209 takes a plurality of steps after the user 209 has gone up the stairs in the storage 303 in step s205. In this case, as illustrated in FIG. 23, for example, if it is determined that the user 209 has taken a plurality of steps (e.g. five steps) in the state where the atmospheric pressure is steady in step s221 after the atmospheric pressure is determined to have become steady in step s204, the second specification unit 620 records the latest number of captured satellites acquired by the receiver 340. Thereafter, the second specification unit 620 operates in a similar manner. The second specification unit 620 can specify that the user 209 has taken a plurality of steps based on the number of counted steps. If the user 209 takes a plurality of steps after the user 209 has gone up the stairway 900 leading to the ground, it is highly likely that the shade provided at the entrance way of the stairway 900 is not present above the user 209, therefore, it is unlikely that the receiving state of the receiver 340 is deteriorated by the shade. Accordingly, recording the number of captured satellites acquired while the user 209 takes a plurality of steps in the state where the atmospheric pressure is steady in step s205 lowers the probability that the user 209 is determined to be on the pedestrian overpass if the user 209 ascends the stairway 900 leading to the ground.

Further, unlike the present example, if the operation of the receiver 340 starts at the timing when step s203 is executed, the second specification unit 620 could not possibly record the first number of captured satellites immediately in step s203. For this reason, the second specification unit 620 possibly records the first number of captured satellites acquired after the user 209 has gone up the stairs in step s203. In this case, it is conceivable that it is not accurately determined that the user 209 is on the pedestrian overpass.

Whereas, as in the present example, in the case where when the user 209 starts moving, and if the receiver 340 starts operation, the second specification unit 620 can immediately records the first number of captured satellites in step s203. Therefore, the second specification unit 620 can obtain the satellite number difference absolute value by using the first number of captured satellites acquired while the user 209 is ascending the stairs. Thus, the second specification unit 620 can accurately specify that the user 209 is on the pedestrian overpass.

<Modifications>

The modifications of the electronic device 210 will be described below.

<First Modification>

The second specification unit 620 may specify that the user 209 is at the pedestrian overpass 800 when the second specification unit 620 determines that the electronic device 210 is positioned in a predetermined area. In other words, the second specification unit 620 may perform the pedestrian overpass specification if the second specification unit 620 determines that the user 209 is positioned in the predetermined area.

As a predetermined area, for example, a vicinity of the road is adopted. The concept of the road includes a sidewalk and a roadway. The second specification unit 620 can specify that the electronic device 210 is positioned in the vicinity of the road way based on map information in the storage 303 and position information acquired by the receiver 340, for example. Alternatively, a vicinity of the intersection 202 may be adopted as the predetermined area. The second specification unit 620 can specify that the electronic device 210 is positioned in the vicinity of the intersection 202 based on the map information in the storage 303 and the position information acquired by the receiver 340, for example. Also, the second specification unit 620 may determine that the electronic device 210 is positioned in the vicinity of the intersection 202 when the wireless communication unit 310 receives a signal from the roadside unit 205 provided at the intersection 202.

Figure 24:
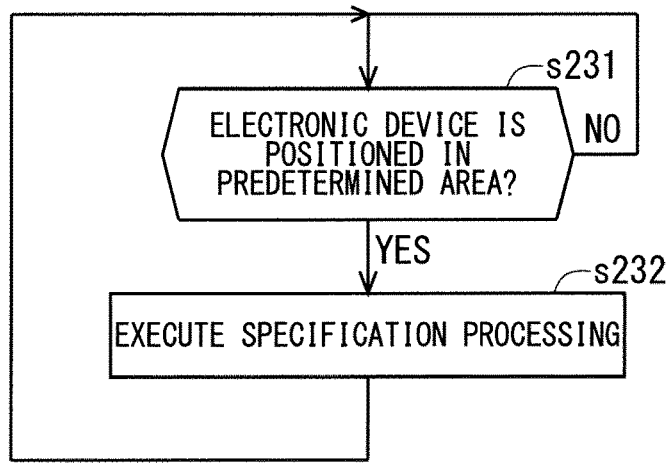
FIG. 24 illustrates a flowchart showing an example of an operation of the electronic device.

In the first modification, as illustrated in FIG. 24, the second specification unit 620 determines whether the electronic device 210 is positioned in the predetermined area, for example, before executing the specification processing (step s231). Then, if determining that the electronic device 210 is located in the predetermined area, the second specification unit 620 executes the specification processing (step s232). Therefore, if the electronic device 210 is positioned in the predetermined area, the pedestrian overpass specification is executed.

Step s231 is repeatedly executed until it is determined that the user 209 is positioned in the predetermined area. And it is determined that the user 209 is not positioned in the predetermined area; the specification processing is not executed. That is, if the electronic device 210 is not positioned in the predetermined area, the pedestrian overpass specification is not executed.

Accordingly, in the first modification, the second specification unit 620 executes the pedestrian overpass specification when determining that the electronic device 210 is positioned in the predetermined area, the second specification unit 620 can specify that the user 209 is on the pedestrian overpass if necessary.

Note that the second specification unit 620 may determine whether the user 209 is positioned in the predetermined area during the specification processing. In this case, the second specification unit 620 determines whether the user 209 is positioned in the predetermined area before executing step s207. In the specification processing, if the second specification unit 620 determines that the user 209 is positioned in the predetermined area, the following processes in the specification processing are executed. Therefore, if the electronic device 210 is positioned in the predetermined area, the pedestrian overpass specification is executed. Meanwhile, if the second specification unit 620 determines that the user 209 is not positioned in the predetermined area, the unit ends the specification processing without executing step s207. Therefore, if the electronic device 210 is not positioned in the predetermined area, the pedestrian overpass specification is not executed.

<Second Modification>

When the receiving state of the receiver 340 is unstable, the number of captured satellites or the C/N values possibly varies even if the user 209 stays at the same place. As a result, it is conceivable that it is not accurately determined that the user 209 is on the pedestrian overpass.

Therefore, the second specification unit 620 may determine whether to execute the pedestrian overpass specification based on the receiving state information. The second specification unit 620 determines whether the receiving state of the receiver 340 is unstable based on the receiving state information, for example. Then the second specification unit 620 determines not to execute the pedestrian overpass specification if it is determined that the receiving state of the receiver 340 is unstable. Meanwhile, the second specification unit 620 determines to execute the pedestrian overpass specification if it is determined that the receiving state of the receiver 340 is not unstable.

Figure 25:
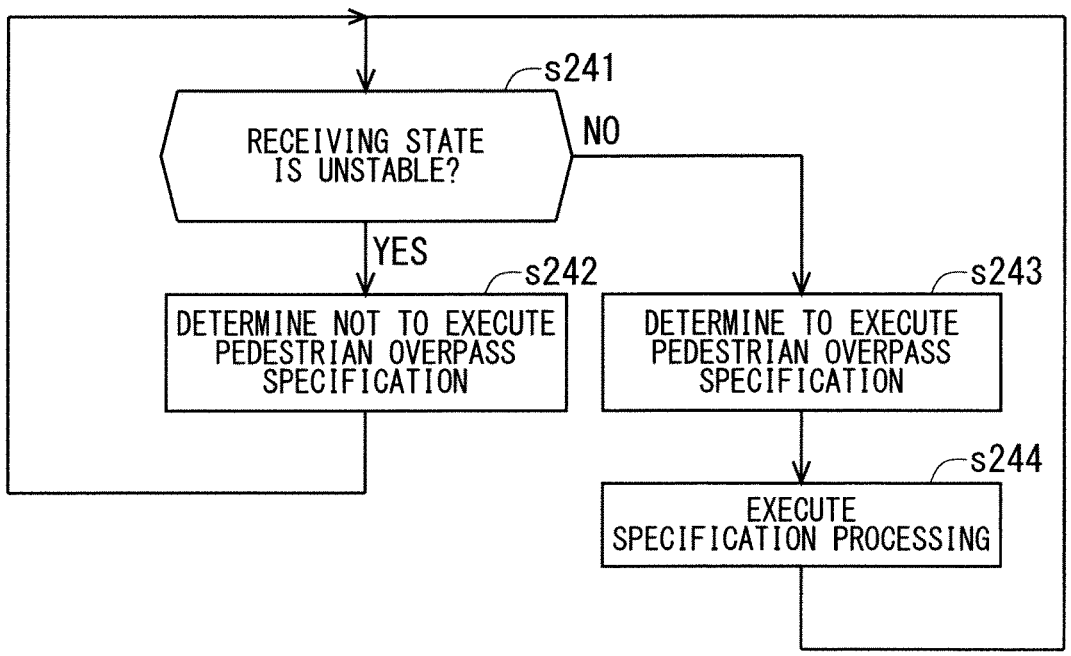
FIG. 25 illustrates a flowchart showing an example of an operation of the electronic device.

For example, as illustrated in FIG. 25, the second specification unit 620 determines whether the receiving state of the receiver 340 is unstable before the specification processing starts (step s241). The second specification unit 620 obtains, for example, a value indicating the degree of variance in the number of captured satellites obtained by the receiver 340 or the C/N value. Then, if the obtained value is greater than a fifth threshold value, the second specification unit 620 determines that the receiving state of the receiver 340 is unstable. Meanwhile, if the obtained value is equal to or smaller than the fifth threshold value, the second specification unit 620 determines that the receiving state of the receiver 340 is not unstable. For example, the standard deviation is adopted as the value indicating the degree of variance in the number of captured satellites.

If the second specification unit 620 determines that the receiving state of the receiver 340 is unstable, the unit determines not to execute pedestrian overpass specification in step s242 (step s242). Accordingly, the specification processing is not executed. Meanwhile, if the second specification unit 620 determines that the receiving state of the receiver 340 is not unstable, the unit determines to execute pedestrian overpass specification (step s243), and executes the specification processing (step s244).

Further, in the case where the receiving state of the receiver 340 after the user 209 has gone up the stairs is poor because the user 209 is present among many buildings in an urban area or the like, it is probable that the absolute value obtained in step s206 is small despite the user 209 is ascending the stairway 900 leading to the ground. As a result, it is conceivable that it is not accurately determined that the user 209 is on the pedestrian overpass in the specification processing.

Therefore, the second specification unit 620 may determine whether to execute the pedestrian overpass specification based on the receiving state information obtained when the atmospheric pressure is determined to have become steady in step s204.

Figure 26:
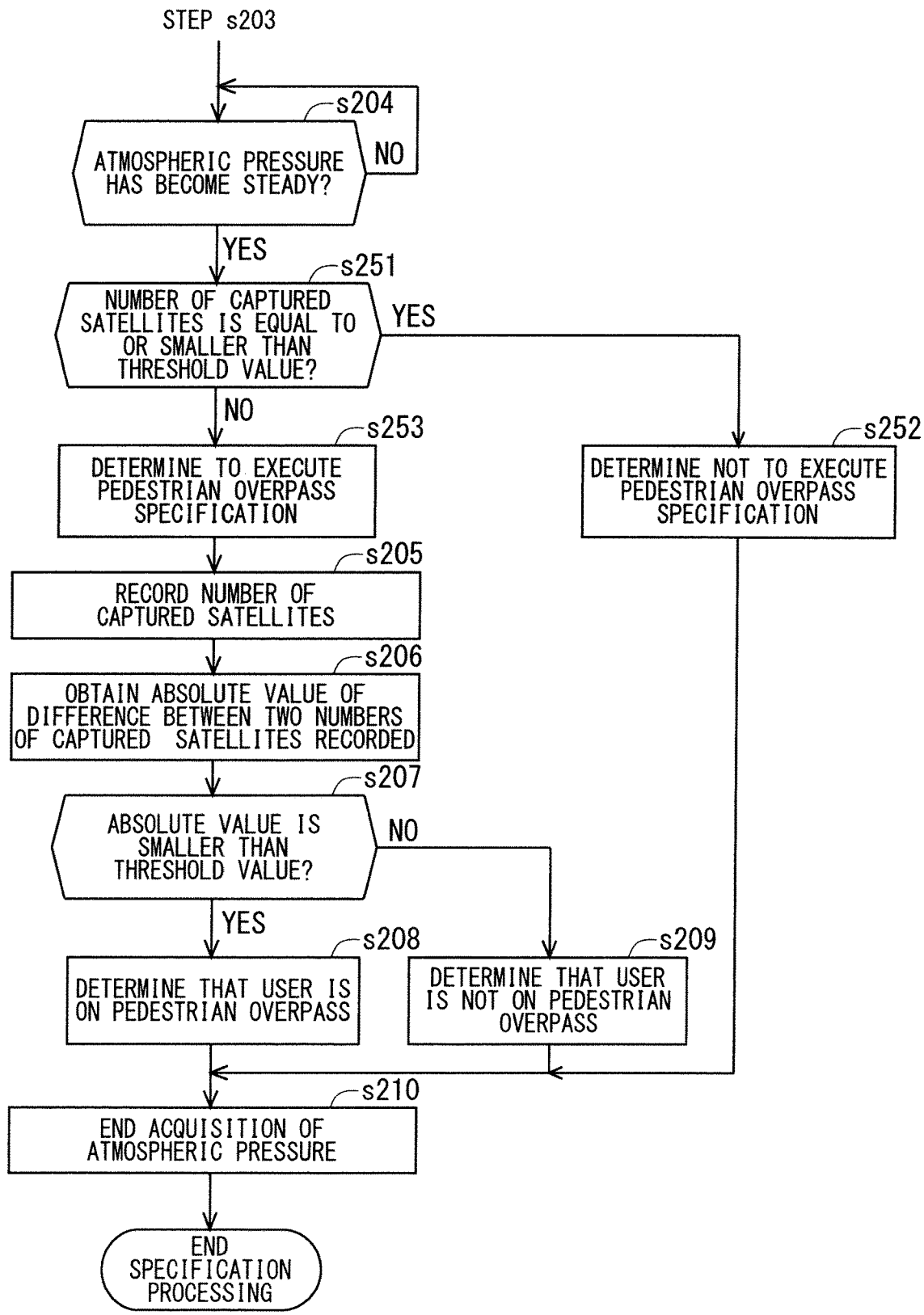
FIG. 26 illustrates a flowchart showing an example of an operation of the electronic device.

For example, as illustrated in FIG. 26, when the second specification unit 620 determines that the atmospheric pressure has become steady in step s204, the unit determines whether the latest number of captured satellites acquired by the receiver 340 is equal to or smaller than a sixth threshold value in step s251. The sixth threshold value is set to one to three, for example. If the number of captured satellites is equal to or smaller than the sixth threshold value, that is, the receiving state of the receiver 340 is poor, the second specification unit 620 determines not to execute the pedestrian overpass specification in step s252. Then the second specification 620 executes step s210 and ends the specification processing. Therefore, if the number of captured satellites while the atmospheric pressure is steady is equal to or smaller than the sixth threshold, the second specification 620 does not determine that the user 209 is on the pedestrian overpass.

Meanwhile, if the number of captured satellites is greater than the sixth threshold value, the second specification unit 620 determines to execute the pedestrian overpass specification in step s253. Then, the second specification unit 620 executes step s205 and operates in a similar manner, thereafter.

In this manner, by determining, by the second specification unit 620, whether to specify that the user 209 is on the pedestrian overpass 800 based on the receiving state information, the probability that the user 209 is on the pedestrian overpass is erroneously determined can be lowered.

Also, by not determining, by the second specification unit 620, that the user 209 is on the pedestrian overpass when the number of captured satellites while the atmospheric pressure is steady is smaller than the sixth threshold, in other words, when the receiving state of the receiver 340 after the user 209 has gone up the stairs is poor, the probability that the user 209 is on the pedestrian overpass is erroneously determined can be lowered.

<Third Modification>

As described above, it is conceivable that it is not accurately determined that the user 209 is on the pedestrian overpass when the receiving state of the receiver 340 is unstable. Therefore, it can be said that the credibility of the pedestrian overpass specification is low when the receiving state of the receiver 340 is unstable. Meanwhile, when the receiving state of the receiver 340 is stable, it can be accurately specified that the user 209 is on the pedestrian overpass because the probability that the number of captured satellites or the C/N value varies is low. Therefore, it can be said that the credibility of the pedestrian overpass specification is high when the receiving state of the receiver 340 is stable.

Therefore, the second specification unit 620 may determine the credibility of the pedestrian overpass specification based on the receiving state information. In the second modification, the second specification unit 620 obtains, for example, a value indicating the degree of variance in the number of captured satellites obtained by the receiver 340 or the C/N value. Then the second specification unit 620 determines the credibility based on the obtained value. For example, if the obtained value is equal to or smaller than a seventh threshold value, the second specification unit 620 determines that the credibility of the pedestrian overpass specification is high, while, if the obtained value is greater than the seventh threshold value, it is determined that the credibility of the pedestrian overpass specification is low. Also, if the obtained value is smaller than an eighth threshold value, the second specification unit 620 may determine that the credibility of the pedestrian overpass specification is high, if the value is greater than the eighth threshold value and smaller than a ninth threshold value (>the eighth threshold value), the unit may determine that the credibility of the pedestrian overpass specification is medium, if the value is greater than the ninth threshold value, the unit may determine that the credibility of the pedestrian overpass specification is low. In this case, if the obtained value is the eighth threshold value, the second specification unit 620 may determine that the credibility of the pedestrian overpass specification is high or may also determine the credibility is medium. Also, if the obtained value is the ninth threshold value, the second specification unit 620 may determine that the credibility of the pedestrian overpass specification is medium or may also determine the credibility is low.

The second specification unit 620 may determine the credibility of the pedestrian overpass specification in the specification processing immediately before execution of the specification processing. Also, the second specification unit 620 may determine the credibility of the pedestrian overpass specification in the specification processing during execution of the specification processing. Also, the second specification unit 620 may determine the credibility of the pedestrian overpass specification in the specification processing immediately after execution of the specification processing.

Further, as described above, when the user 209 is present among many buildings, the receiving state of the receiver 340 after the user 209 has gone up the stairs is possibly poor. In this case, the absolute value obtained in step s206 is possibly small despite the user 209 is on the pedestrian overpass. As a result, it is conceivable that it is not accurately determined that the user 209 is on the pedestrian overpass.

Therefore, the second specification unit 620 may determine the credibility of the pedestrian overpass specification based on the receiving state information obtained when the atmospheric pressure is determined to have become steady in step s204. For example, when the second specification unit 620 determines that the atmospheric pressure has become steady in step s204, if the latest number of captured satellites acquired by the receiver 340 is equal to or greater than a tenth threshold value, the unit determines that the credibility is high, while, if the number is smaller than the tenth threshold value, the unit determines that the credibility is low. The tenth threshold value is set to six, for example. In the case where the C/N value is used instead of the number of captured satellites, the tenth threshold value is set to 25, for example.

Alternatively, if the number of captured satellites is greater than an eleventh threshold value, the second specification unit 620 may determine that the credibility of the pedestrian overpass specification is high, if the number is greater than a twelfth threshold value (<the eleventh threshold value) and smaller than the eleventh threshold value, the unit may determine that the credibility is medium, and if the number is smaller than the twelfth threshold value, the unit may determine that the credibility is low. In this case, if the number of captured satellites is the eleventh threshold value, the second specification unit 620 may determine that the credibility is high or may also determine the credibility is medium. Also, if the number of captured satellites is the twelfth threshold value, the second specification unit 620 may determine that the credibility is medium or may also determine the credibility is low. The eleventh threshold value is set to seven, for example, and the twelfth threshold value is set to four, for example. In the case where the C/N value is used instead of the number of captured satellites, the eleventh threshold value is set to 30, for example, and the twelfth threshold value is set to 20, for example.

The credibility determined by the second specification unit 620 may be notified outside the electronic device 210. For example, when the notification determination unit 700 determines whether the electronic device 210 notifies outside the electronic device 210 of predetermined information based on the result of the specification processing, the credibility determined by the second specification unit 620 may be notified outside together with the predetermined information. In this case, for example, if the notification determination unit 700 determines that the electronic device 210 notifies outside that the electronic device 210 has determined that the user 209 is on the pedestrian overpass, the wireless communication unit 310 may notify the roadside unit 205, for example, that the electronic device 210 has determined that the user 209 is on the pedestrian overpass in the specification processing and of the credibility of the pedestrian overpass specification.

<Fourth Modification>

Figure 27:
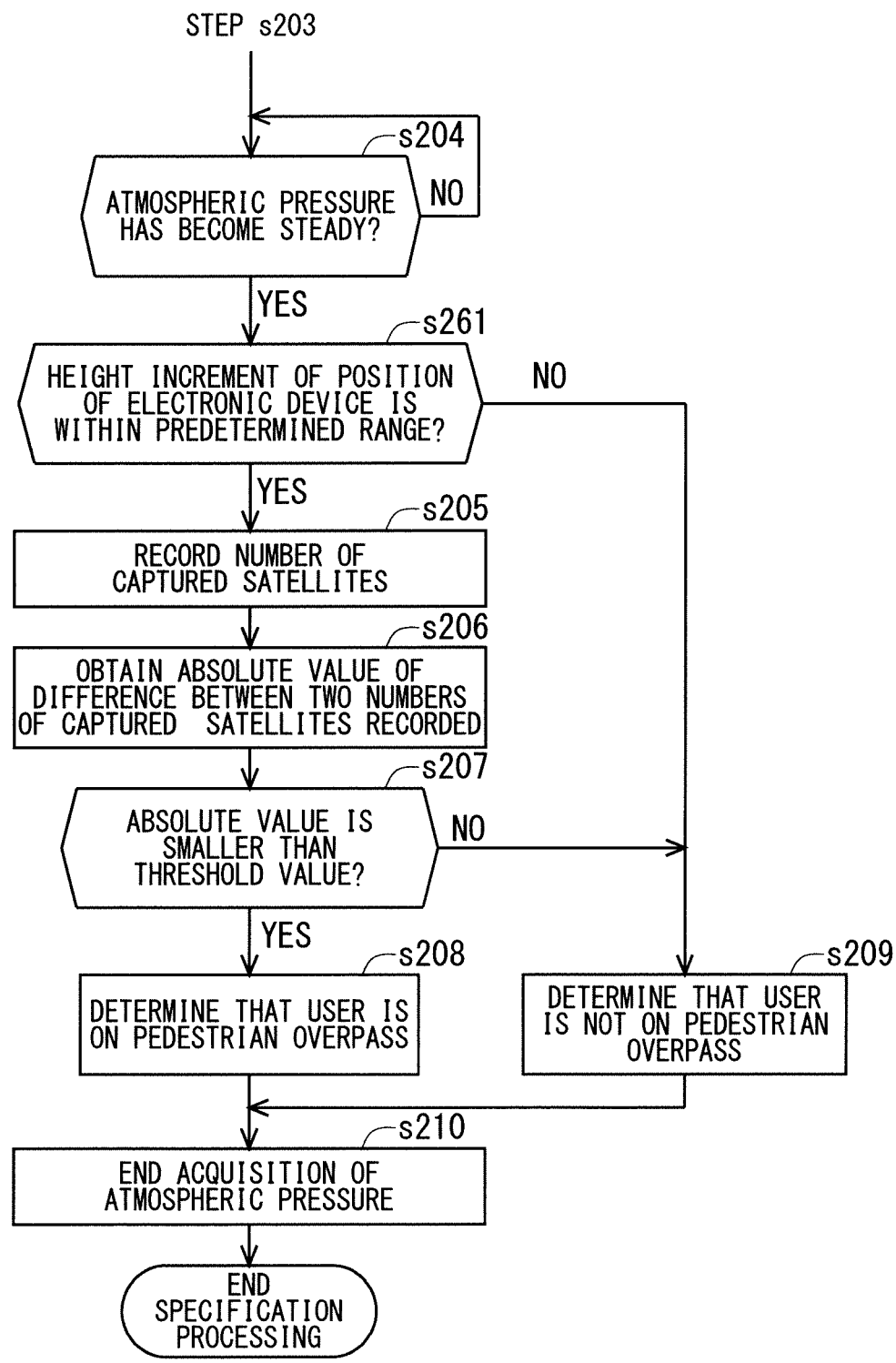
FIG. 27 illustrates a flowchart showing an example of an operation of the electronic device.

As illustrated in FIG. 27, after the second specification unit 620 determines that the atmospheric pressure has become steady in step s204, the unit may execute step s261. In step s261, the second specification unit 620 determines whether a height increment of the position of the electronic device 210 from the point at which the atmospheric pressure is determined to have decreased in step s202 to the point at which the atmospheric pressure is determined to be steady is within the predetermined area. The predetermined area indicates a range of the height of a general pedestrian overpass. Therefore, in step s261, it can be said that the second specification unit 620 determines whether the height increment of the position of the electronic device 210 from the point at which the atmospheric pressure is determined to be decreased to the point at which the atmospheric pressure is determined to be steady corresponds to the height of the pedestrian overpass. In other words, the second specification unit 620 determines whether the height increment of the position of the electronic device 210 from the point at which the user 209 starts to ascend the stairs to the point at which the user has gone up the stairs corresponds to the height of the pedestrian overpass. The predetermined area is set to a range of five to ten meters, for example.

In the fourth modification, in step s203, the second specification unit 620 obtains the height of the position of the electronic device 210 based on the atmospheric pressure detected by the atmospheric pressure sensor 410 as well as records the number of captured satellites. The height is referred to as "first height". Also in step s261, the second specification unit 620 obtains the height of the position of the electronic device 210 based on the atmospheric pressure detected by the atmospheric pressure sensor 410. The height is referred to as "second height". In step s261, the second specification unit 620 determines whether a value obtained by subtracting the first height from the second height is within the predetermined area. It can be said that the value obtained by subtracting the first height from the second height is the height increment of the position of the electronic device 210 from the point at which the atmospheric pressure is determined to have decreased to the point at which the atmospheric pressure is determined to be steady.

In step s261, if the second specification unit 620 determines that the obtained increment is within the predetermined area, the unit executes step s205 and operates in a similar manner, thereafter. Meanwhile, in step s261, if the second specification unit 620 determines that the increment is not within the predetermined range, the unit executes step s209 and determines that the user 209 is not on the pedestrian overpass.

It should be noted that, if the second specification unit 620 determines that the increment is not within the predetermined area in step s261, the unit may determine nothing and execute step s210. Further, step s261 may be executed at any timing between step s204 and step s208.

Accordingly, in the fourth modification, when the height increment of the position of the electronic device 210 from the point at which the atmospheric pressure is determined to be decreased to the point at which the atmospheric pressure is determined to be steady is not within the predetermined area, the second specification unit 620 does not determine that the user 209 is on the pedestrian overpass. In other words, the second specification unit 620 does not determine that the user 209 is on the pedestrian overpass when the height increment of the position of the electronic device 210 from the point at which the user 209 starts to ascend the stairs to the point at which the user has gone up the stairs is not within the predetermined area. Accordingly, if the height the user 209 ascends does not coincide with the height of the pedestrian overpass apparently, the probability that the user 209 is on the pedestrian overpass can be lowered. Therefore, the probability that the user 209 is erroneously determined to be on the pedestrian overpass can be lowered.

<Fifth Modification>

Figure 28:
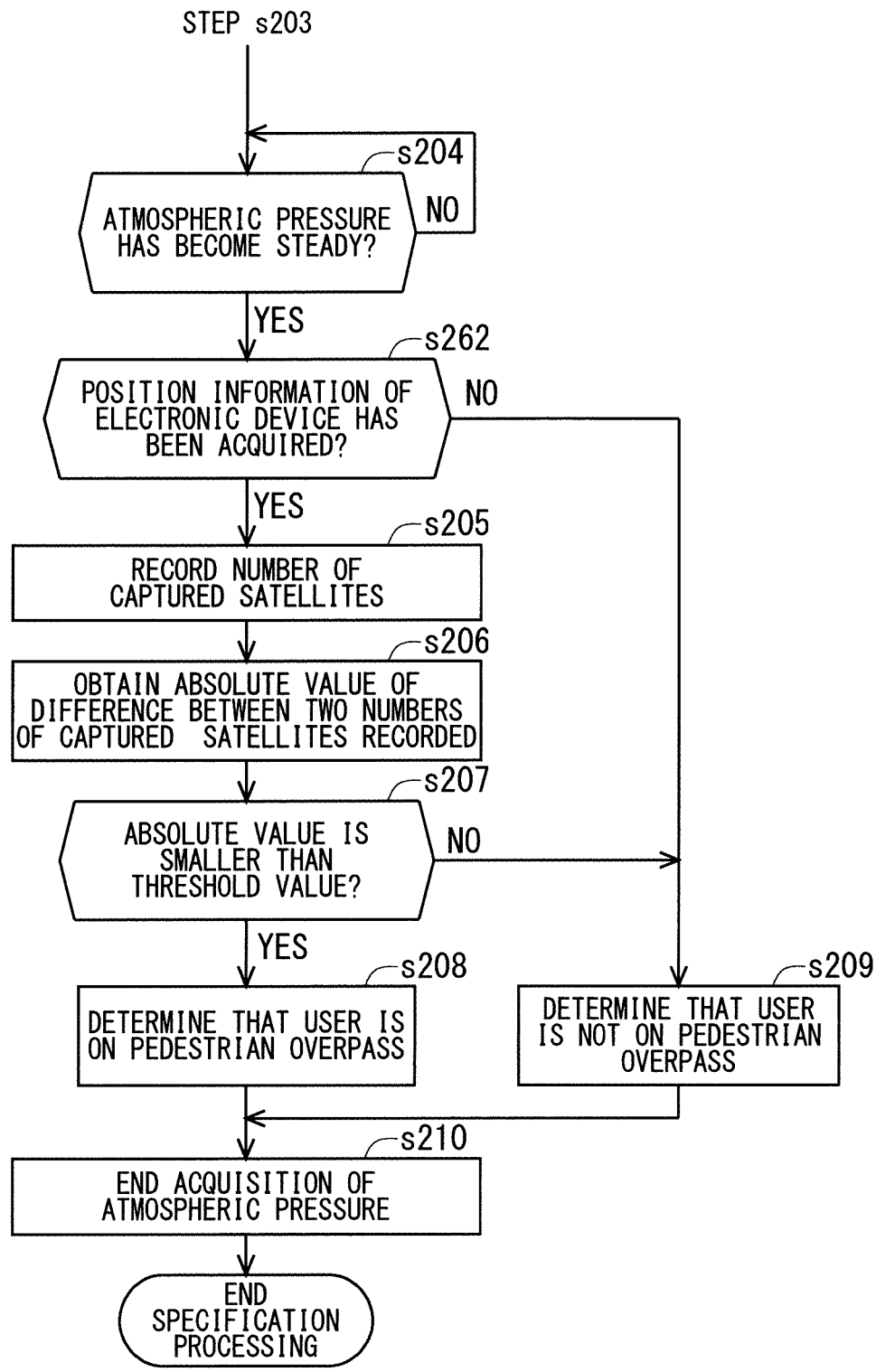
FIG. 28 illustrates a flowchart showing an example of an operation of the electronic device.

As illustrated in FIG. 28, after the second specification unit 620 determines that the atmospheric pressure has become steady in step s204, the unit may execute step s262. In step s262, the second specification unit 620 determines whether the receiver 340 can acquire the position information of the electronic device 210. It can be said that in step s262, the second specification unit 620 determines whether the receiver 340 can acquire the position information of the electronic device 210 while the atmospheric pressure is steady.

In step s262, if the second specification unit 620 determines that the receiver 340 can acquire the position information of the electronic device 210, the unit executes step s205 and operates in a similar manner. Meanwhile, in step s262, if the second specification unit 620 determines that the receiver 340 cannot acquire the position information of the electronic device 210, the unit executes step s209 and determines that the user 209 is not on the pedestrian overpass.

It should be noted that, if the second specification unit 620 determines that the receiver 340 cannot acquire the position information of the electronic device 210 in step s262, the unit may determine nothing and execute step s210. Further, step s262 may be executed at any timing between step s204 and step s208.

Here, in a receiving device such as a GPS receiver, if the number of captured satellites is not three or more, the position information cannot be acquired. Therefore, it can be said that when the receiver 340 cannot acquire the position information, the receiving state is poor. Therefore, in the case where the receiver 340 cannot acquire the position information after the user has gone up the stairs, it is conceivable that it is not accurately determined that the user 209 is on the pedestrian overpass.

As in the fourth modification, when the receiver 340 cannot acquire the position information of the electronic device 210 while the atmospheric pressure is steady, the user 209 is not determined to be on the pedestrian overpass, thereby lowering the probability that the user 209 is erroneously determined to be on the pedestrian overpass.

<Sixth Modification>

If the number of captured satellites when the user 209 starts to ascend the stairs is large, it is highly likely that the user 209 is on the pedestrian overpass 800. In other words, if the receiving state of the receiver 340 is good when the user 209 starts to ascend the stairs, it is highly likely that the user 209 is on the pedestrian overpass 800.

Figure 29:
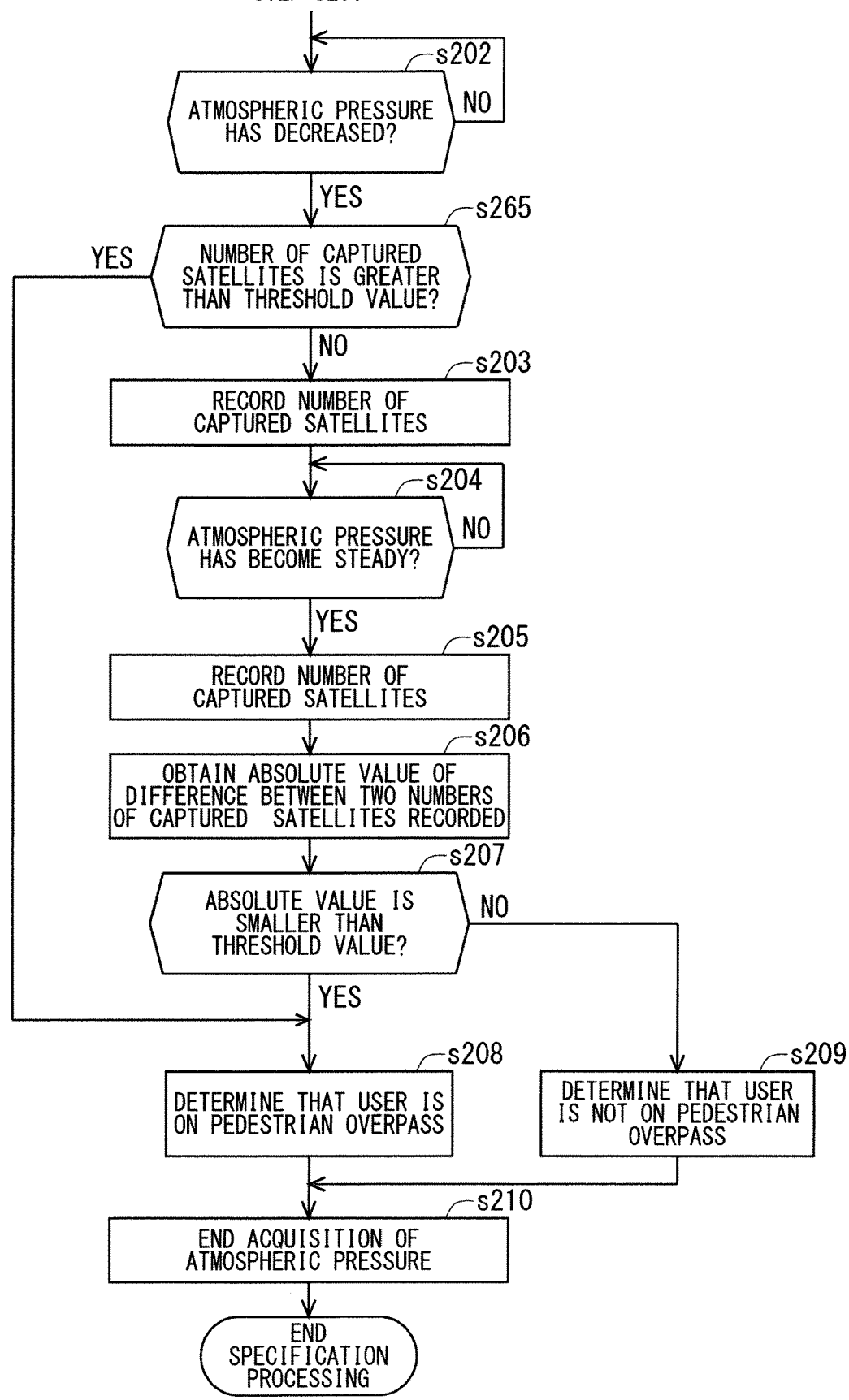
FIG. 29 illustrates a flowchart showing an example of an operation of the electronic device.

Therefore, in the case where the number of captured satellites when it is determined that the atmospheric pressure is decreased in step s202 is large, it may be determined that the user 209 is on the pedestrian overpass 800 regardless of the satellite number difference absolute value. In this case, as illustrated in FIG. 29, if the second specification unit 620 determines that the atmospheric pressure is decreased in step s202, the unit determines whether the latest number of captured satellites is greater than a thirteenth threshold value in step s265. The thirteenth threshold value is set to four to six, for example. In step s265, if the second specification unit 620 determines that the number of captured satellites is greater than the thirteenth threshold value, the unit executes step s208 and determines that the user 209 is on the pedestrian overpass 800. Meanwhile, in step s265, if the second specification unit 620 determines that the number of captured satellites is equal to or smaller than the thirteenth threshold value, the unit executes step s203 and records the number of captured satellites used in step s265 into the storage 303. Thereafter, the second specification unit 620 operates in a similar manner.

Accordingly, when the number of captured satellites at the timing when the atmospheric pressure decreases is large, the second specification unit 620 determines that the user 209 is on the pedestrian overpass 800 regardless of the satellite number difference absolute value, thereby the specification processing can be simplified. In other words, in the case where the receiving state of the receiver 340 when the user 209 starts to ascend the stairs is good, the second specification unit 620 determines that the user 209 is on the pedestrian overpass 800 regardless of the satellite number difference absolute value, thereby the specification processing can be simplified.

<Seventh Modification>

In the case where the receiving state of the receiver 340 after the user 209 has gone up the stairs is poor, it is probable that the absolute value obtained in step s206 does not become large when the user 209 is ascending the stairway 900 leading to the ground. In the case where the receiving state of the receiver 340 after the user 209 has gone up the stairs is good, it is probable that the absolute value obtained in step s206 becomes large when the user 209 is ascending the stairway 900 leading to the ground.

Therefore, the second specification unit 620 may adjust the third threshold value used in the pedestrian overpass specification based on the receiving state of the receiver 340 after the user has gone up the stairs. For example, if the number of captured satellites to be recorded in step s205 is equal to or greater than a fourteenth threshold value, that is the receiving state of the receiver 340 is good, the second specification unit 620 sets the third threshold value to "three". Meanwhile, if the number of captured satellites to be recorded in step s205 is smaller than the fourteenth threshold value, that is the receiving state of the receiver 340 is poor, the second specification unit 620 sets the third threshold value to "two". The thirteenth threshold value is set to four to six, for example.

Therefore, by adjusting the third threshold value based on the receiving state information by the second specification unit 620, the specification that the user is on the pedestrian overpass 800 can be properly executed.

<Eighth Modification>

Figure 30:
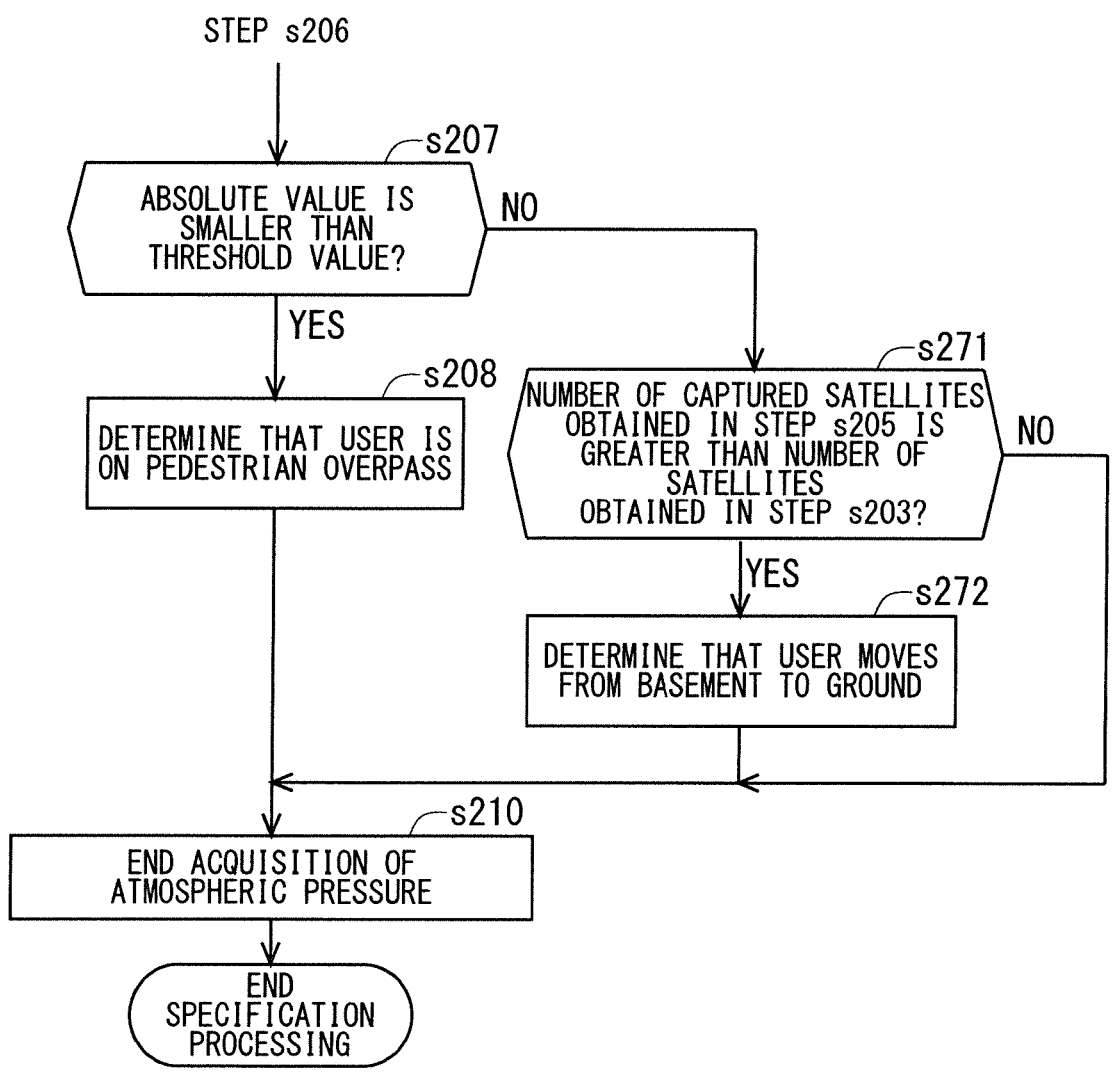
FIG. 30 illustrates a flowchart showing an example of an operation of the electronic device.

In the specification processing, the second specification unit 620 may perform the state specification in which the movement of the user 209 from the basement to the ground is specified based on the receiving state information and the information changing according to the height of the position of the electronic device 210. FIG. 30 illustrates a flowchart showing an example of the specification processing in this case. Thereafter, the state specification for specifying that the user 209 is on the pedestrian overpass may be referred to as "specification of movement to the ground".

As illustrated in FIG. 30, if it is determined that the satellite number difference absolute value is equal to or greater than the third threshold value in above step s207, the second specification unit 620 determines whether the second number of captured satellites recorded in step s205 is greater than the first number of captured satellites recorded in step s203 in step s271. If the second specification unit 620 determines that the second number of captured satellites is greater than the first number of captured satellites, the unit determines that the user 209 moves from the basement to the ground in step s272. That the second specification unit 620 determines that the second number of captured satellites is greater than the first number of captured satellites can also be said that the second specification unit 620 determines that the receiving state of the receiver 340 improves. Therefore, if the second specification unit 620 determines that the atmospheric pressure decreases (YES in step s202) and the receiving state of the receiver 340 improves (YES in step s271), it can be said that the unit determines that the user 209 moves from the basement to the ground. In other words, if the second specification unit 620 determines that the receiving state of the receiver 340 improves when the user 209 ascends the stairs, it can be said that the unit determines that the user 209 moves from the basement to the ground. If the user 209 moves from the basement to the ground, it is highly likely that the atmospheric pressure decreases and the receiving state receiver 340 improves. Therefore, If the receiving state of the receiver 340 improves, it can be determined that the user 209 moves from the basement to the ground.

If the second specification unit 620 determines that the user 209 moves from the basement to the ground, the unit executes step s210 and ends the specification processing.

Meanwhile, if the second specification unit 620 determines that the second number of captured satellites is equal to or smaller than the first number of captured satellites in step s271, in other words, if the unit determines that the receiving state of the receiver 340 does not improve, the unit determines nothing, executes step s210, and ends the specification processing.

Accordingly, the second specification unit 620 specifies that the user 209 moves from the basement to the ground based on the receiving state information and the information changing according to the height of the position of the electronic device 210, therefore the movement of the user 209 from the basement to the ground can be appropriately specified.

It should be noted that, the second specification unit 620 may perform the specification of movement to the ground in the specification processing without performing pedestrian overpass specification. In this case, for example, if it is determined that the satellite number difference absolute value is smaller than the third threshold value, step s210 is executed and the specification processing is ended without executing step s208.

And, similarly to the first modification, the second specification unit 620 may perform the specification of movement to the ground, if the unit determines that the electronic device 210 is positioned in the predetermined area. In this case, for example, the second specification unit 620 may perform specification processing if it is determined that the electronic device 210 is positioned in the predetermined area as illustrated in FIG. 24.

In addition, when the receiving state of the receiver 340 is unstable, even when the user 209 moves from the basement to the ground, there is a probability that it is determined that the satellite number difference absolute value is smaller than the third threshold value in step s207, or it is determined that the second number of captured satellites is equal to or smaller than the first number of captured satellites in step s271. Therefore, similarly to the second modification, the second specification unit 620 may determine whether to execute the specification of movement to the ground based on the receiving state information. In this case, for example, as illustrated in FIG. 25, the second specification unit 620 may determine whether to perform the specification of movement to the ground based on the receiving state information before the specification processing is started. Also, as illustrated in FIG. 26, the second specification unit 620 may determine whether to perform the specification of movement to the ground based on the receiving state information during the specification processing.

Therefore, similarly to the third modification, the second specification unit 620 may determine the credibility of the specification of movement to the ground based on the receiving state information. The second specification unit 620 can determine the credibility of the specification of movement to the ground similarly to the case of determining the credibility of the pedestrian overpass specification.

<Ninth Modification>

Figure 31:
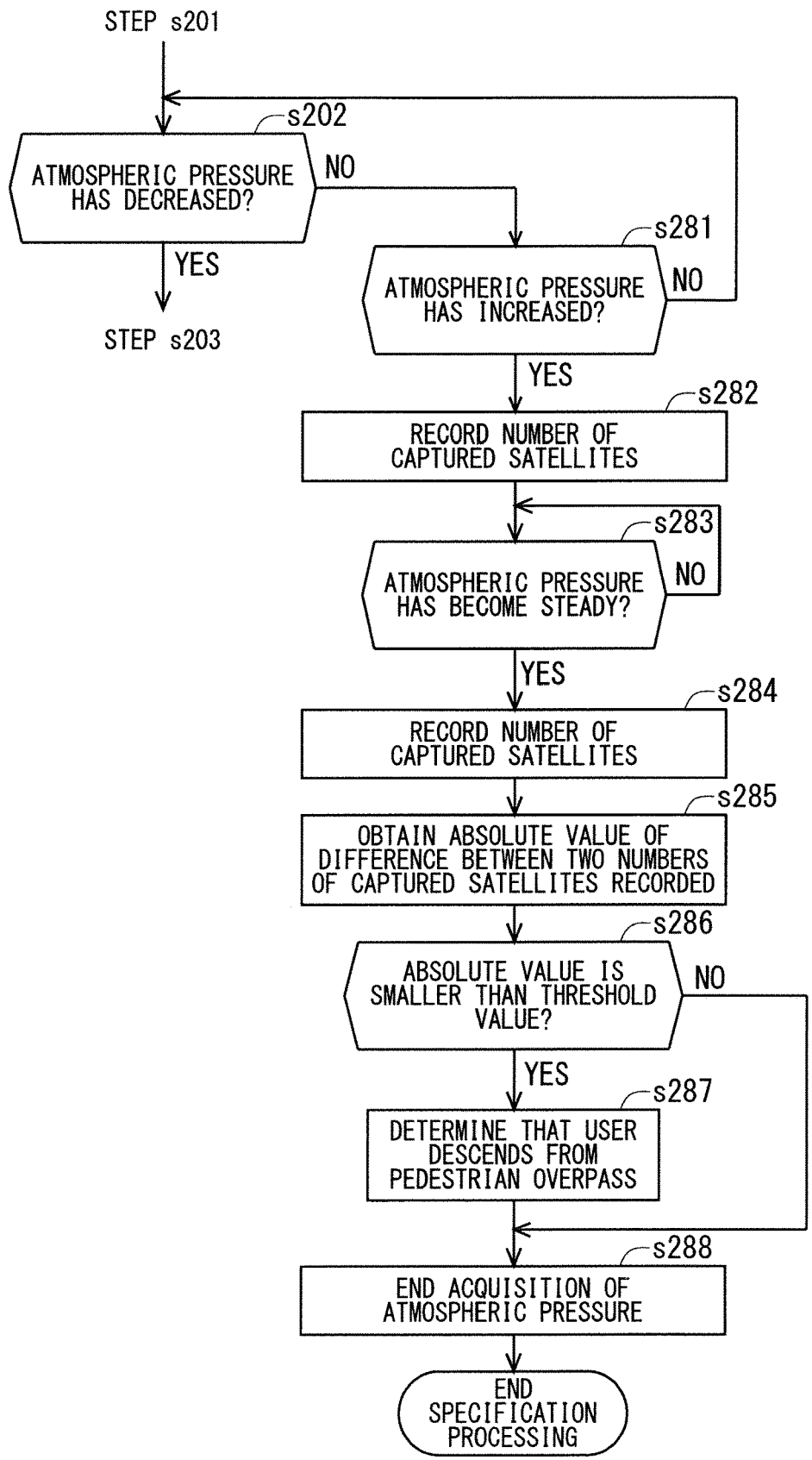
FIG. 31 illustrates a flowchart showing an example of an operation of the electronic device.

In the specification processing, the second specification unit 620 may perform the state specification in which the user 209 descends the pedestrian overpass 800 based on the receiving state information and the information changing according to the height of the position of the electronic device 210. FIG. 31 illustrates a flowchart showing an example of the specification processing in this case. Thereafter, the state specification for specifying that the user 209 descends the pedestrian overpass 800 may be referred to as "descending state specification"

As illustrated in FIG. 31, step s202 is executed after step s201. In step s202, if the second specification unit 620 determines whether the atmospheric pressure has decreased, the unit executes step s203 and operates in a similar manner.

Meanwhile, if the second specification unit 280 determines that the atmospheric pressure has not decreased, the unit determines whether the atmospheric pressure has increased in step s281. The atmospheric pressure increases as the height of the position of the electronic device 210 decreases, therefore, it can be said that the second specification unit 620 determines whether the height of the position of the electronic device 210 has decreased or not.

In step s281, if the atmospheric pressure change amount obtained in step s202 shows a positive value and an absolute value of the atmospheric pressure change amount is equal to or greater than a fifteenth threshold value, the second specification unit 620 determines that the atmospheric pressure has increased. Meanwhile, the second specification unit 620 determines that the atmospheric pressure does not increase if the atmospheric pressure change amount obtained in step s202 does not show a positive value. Meanwhile, the second specification unit 620 determines that the atmospheric pressure does not increase if the absolute value of the atmospheric pressure change amount obtained in step s202 is smaller than the fifteenth threshold value. For example, the fifteenth threshold value is set to a value slightly smaller than the general atmospheric pressure increase amount while the user 209 is descending the stairs of the pedestrian overpass 800 by N steps. The fifteenth threshold value is set to the same as that of the first threshold value, for example.

In step s281, if the second specification unit 620 determines that the atmospheric pressure has not increased, the unit executes step s202 again and operates in a similar manner.

Meanwhile, if the second specification unit 620 determines that the atmospheric pressure has increased in step s281, in other words, if the unit determines that the user 209 has started to descend the stairs, the unit records the latest number of captured satellites output from the receiver 340 into the storage 303. Similarly to step s203, the second specification unit 620 first releases the intermittent operation of the receiver 340 and continues to operate the receiver 340 in the positioning mode in step s282. Then, the second specification unit 620 records the latest number of captured satellites output from the receiver 340 in the storage 303.

After step s282, the second specification unit 620 determines whether the atmospheric pressure has become steady in step s283 similarly to step s204. After the user 209 has gone up the stairs, the atmospheric pressure becomes steady, therefore, in step s283, it can be said that the second specification unit 620 determines whether the user 209 has gone down the stairs or not.

If the atmospheric pressure is determined to have become steady in step s283, the second specification unit 620 records the latest number of captured satellites output from the receiver 340 in the storage 303 in step s284. In other words if it is determined that the user 209 has gone down the stairs in step s283, the second specification unit 620 records the latest number of captured satellites output from the receiver 340 in the storage 303 in step s284.

Next, in step s285, the second specification unit 620 obtains an absolute value of the difference between the number of captured satellites recorded in step s282 and the number of captured satellites recorded in step s284. And in step s286, the second specification unit 620 determines whether the absolute value obtained in step s285 is smaller than a sixteenth threshold value. The sixteenth threshold value is an integer of one or more, and is set to two, for example.

Thereafter, the absolute value obtained in step s285 may be referred to as "second satellite number difference absolute value" in some cases. Further, of the two numbers of captured satellites used to obtain the second satellite number difference absolute value, the number of captured satellites acquired earlier may be referred to as "third number of captured satellites" while the number of captured satellites acquired later may be referred to as "fourth number of captured satellites". It can be said that, in step s282, the third number of captured satellites is recorded, and in step s284, the fourth number of captured satellites is recorded.

When the second specification unit 620 determines that second the satellite number difference absolute value is smaller than the sixteenth threshold value in step s286, the second specification unit 620 determines that the user 209 descends the pedestrian overpass 800 in step s287. In other words, the second specification unit 620 determines that the user 209 descends the pedestrian overpass 800 if there is almost no difference between the number of captured satellites at the timing when the atmospheric pressure becomes larger and the number of captured satellites at the timing when the atmospheric pressure has become steady thereafter. In other words, the second specification unit 620 determines that the user 209 descends the pedestrian overpass 800 if there is almost no difference between the number of captured satellites at the timing when the user 209 has started to descend the stairs and the number of captured satellites at the timing when after the user 209 has gone down the stairs. In other words, the second specification unit 620 determines that the user 209 descends the pedestrian overpass 800 if there is almost no difference between the number of captured satellites at the timing when the height of the position of the electronic device 210, which is specified based on the atmospheric pressure is decreased and the number of captured satellites at the timing when the height of the position of the electronic device 210, which is specified based on the atmospheric pressure becomes stable.

Here, the determination in step s281 that the atmospheric pressure has increased can be viewed that the height of the position of the electronic device 210 has decreased. Also, the second satellite number difference absolute value being smaller than the fifteenth threshold value indicates that the receiving state of the receiver 340 is stable. Therefore, if it is determined that the height of the position of the electronic device 210 decreases and the receiving state of the receiver 340 is stable based on the atmospheric pressure and the number of captured satellites, it can be said that the second specification unit 620 determines that the user 209 descends the pedestrian overpass 800.

Meanwhile, if the second specification unit 620 determines that the second satellite number difference absolute value is equal to or greater than the sixteenth threshold value in step s286, the unit determines nothing and executes step s288. In step s288, similarly to step s210, the second specification unit 620 ends acquisition of the atmospheric pressure detected by the atmospheric pressure sensor 410 and causes the receiver 340 to perform intermittent operation. If step s288 is executed, the specification processing is ended.

If the specification processing illustrated in FIG. 31 is executed in the second specification unit 620, the notification determination unit 700 determines whether the electronic device 210 notifies outside the electronic device 210 based on the result of the specification processing. For example, if the user 209 is determined to descend the pedestrian overpass, the notification determination unit 700 determines that the electronic device 210 makes notification outside the electronic device 210 that the probability that the user 209 goes into the road way 207 is high. In this case, the wireless communication unit 310 notifies, for example, the roadside unit 205 that the probability that the user 209 goes into the roadway is high. Note that the operation of the notification determination unit 700 is not limited to the example.

Also, in the above example, the number of captured satellites at the timing after the user 209 has gone down the stairs as the fourth captured number of satellites is adopted, however the number of captured satellites while the user 209 is descending the stairs may be adopted. In this case, for example, the second specification unit 620 records the latest number of captured satellites when the number of counted steps increases by the predetermined number from the execution of step s282 as the fourth number of captured satellites in step s284 without executing step s283. It is a rare case that the user 209 would reach to the bottom of the stairs with descending the stairs by a mare several steps after the user starts to descend the stairs, therefore, in step s284, the number of captured satellites while the user 209 is descending the stairs is recorded. Therefore, in step s285, the absolute value of the difference between the two numbers of captured satellites acquired at different timings while the user 209 is descending the stairs is obtained. Thereafter, the second specification unit 620 operates in a similar manner.

As described above, in the ninth modification, the second specification unit 620 specifies that the user 209 descends the pedestrian overpass based on the information changing according to the height of the position of the electronic device 210 and the receiving state information. In other words, the second specification unit 620 specifies that the user 209 descends the pedestrian overpass based on the information changing according to the height of the position of the electronic device 210 and the receiving state information.

When the user 209 descends the stairs of the pedestrian overpass 800, the height of the position of the electronic device 210 decreases. Therefore, the electronic device 210 can specify that the user 209 descends from the pedestrian overpass with a certain degree of accuracy by using information that varies according to the height of the position of the electronic device 210, such as atmospheric pressure.

However, not only when the user 209 descends the stairs of the pedestrian overpass 800 but also when the user 209 moves from the ground to the basement such as a stairway 900 connecting the basement and the ground, the height of the position of the electronic device 210 decreases. Therefore, in the case where the electronic device 210 specifies that the user 209 descends from the pedestrian overpass using the information changing according to the height of the position of the electronic device 210, the electronic device 210 could erroneously specify the user 209 descending the stairway 900 connecting the basement and the ground as the user 209 descending from the pedestrian overpass. Therefore, merely using information that varies depending on the height of the electronic device 210 may not be able to correctly specify that the user 209 descends the pedestrian overpass 800. Similarly, even in the case where the user 209 descends a slope connecting the basement and the ground, the height of the position of the electronic device 210 decreases as well, therefore, merely using information that varies according to the height of the electronic device 210 may not be able to correctly specify that the user 209 is on the pedestrian overpass 800.

Meanwhile, it is highly conceivable that the receiving condition of the receiver 904 improves as the user 209 descends the stairway 900 or the slope connecting the basement and the ground. Therefore, it is highly conceivable that the absolute value obtained in step s285 increases, when the user 209 descends the stairway 900 or the slope connecting the basement and the ground. On the other hand, if the user 209 descends the stairs of the pedestrian overpass 800, it is likely that the receiving state of the receiver 340 does not change. That is, if the user 209 descends the stairs of the pedestrian overpass 800, it is likely that the receiving state of the receiver 340 is steady. Therefore, it is highly conceivable that the absolute value obtained in step s285 decreases, when the user 209 descends the stairs of the pedestrian overpass 800.

In this manner, the receiving state of the receiver 340 is different between the case where the user 209 descends the stairs of the pedestrian overpass 800 and the case where the user 209 descends the stairway 900 or the slope connecting the underground and the ground. Therefore, as in the ninth modification, the second specification unit 620 can accurately specify that the user 209 descends from the pedestrian overpass by specifying that the user 209 descends from the pedestrian overpass based on, not only information that varies depending on the height of the position of the electronic device 210, but also the receiving state information indicating the receiving state of the receiver 340.

It should be noted that, the second specification unit 620 may perform the descending state specification in the specification processing without performing pedestrian overpass specification. In this case, for example, step s202 is executed after step s281 without step s281 is executed. Then, the step s281 is repeated until an increase in atmospheric pressure is determined. Also, the second specification unit 620 may perform the descending state specification in the specification processing without performing pedestrian overpass specification.

And, similarly to the first modification, the second specification unit 620 may perform the descending state specification, if the unit determines that the electronic device 210 is positioned in the predetermined area. In this case, for example, the second specification unit 620 may perform specification processing if it is determined that the electronic device 210 is positioned in the predetermined area as illustrated in FIG. 24.

In addition, when the receiving state of the receiver 340 is unstable, even when the user 209 descends from the pedestrian bridge 800, the absolute value obtained in step s285 possibly becomes equal to or greater than the sixteenth threshold value. Therefore, similarly to the second modification, the second specification unit 620 may determine whether to execute the descending state specification based on the receiving state information.

In the case where whether to perform the descending state specification is determined based on the receiving state information, the second specification unit 620 may determine, for example, as illustrated in FIG. 25 described above, whether to perform the descending state specification before the specification processing is started.

Further, the second specification unit 620 may determine whether to execute the descending state specification based on the receiving state information in the specification processing. In this case, if the second specification unit 620 determines that the atmospheric pressure has increased in step s281, similarly to step s251 in FIG. 26, the second specification unit 620 determines that the latest number of captured satellites acquired by the receiver 340 is equal to or smaller than the sixth threshold value. That is, when the user 209 starts to descend the stairs, the second specification unit 620 determines whether the latest number of captured satellites acquired by the receiver 340 is equal to or smaller than the sixth threshold value. If the number of captured satellites is equal to or smaller than the sixth threshold value, that is, the receiving state of the receiver 340 is poor, the second specification unit 620 determines not to execute the descending state specification, executes step s288, and ends the specification processing. Accordingly, when the number of captured satellites when the atmospheric pressure increases, in other words, when the number of captured satellites when the user 209 starts to descend the stairs is equal to or smaller than the sixth threshold value, the second specification unit 620 specifies the descending state specification. Meanwhile, if the number of captured satellites is greater than the sixth threshold value, that is, if the receiving state of the receiver 340 is good, the second specification unit 620 determines to execute the descending state specification. Then, the second specification unit 620 executes step s282 and operates in a similar manner thereafter.

Therefore, similarly to the third modification, the second specification unit 620 may determine the credibility of the descending state specification based on the receiving state information. In this case, the second specification unit 620 may determine the credibility of the descending state specification based on the receiving state information obtained when the atmospheric pressure is determined to have increased in step s281. For example, when the second specification unit 620 determines that the atmospheric pressure has become steady in step s281, if the latest number of captured satellites acquired by the receiver 340 is equal to or greater than a tenth threshold value, the unit may determine that the credibility is high, while, if the number is smaller than the tenth threshold value, the unit may determine that the credibility is low. Alternatively, the second specification unit 620 may determine that the credibility is high, if the number of captured satellites when the atmospheric pressure is determined to have increased is greater than an eleventh threshold value, that the credibility is medium, if the number of captured satellites is greater than the twelfth threshold value and smaller than the eleventh threshold value, and that the credibility is low if the number of captured satellites is smaller than the twelfth threshold value.

Figure 32:
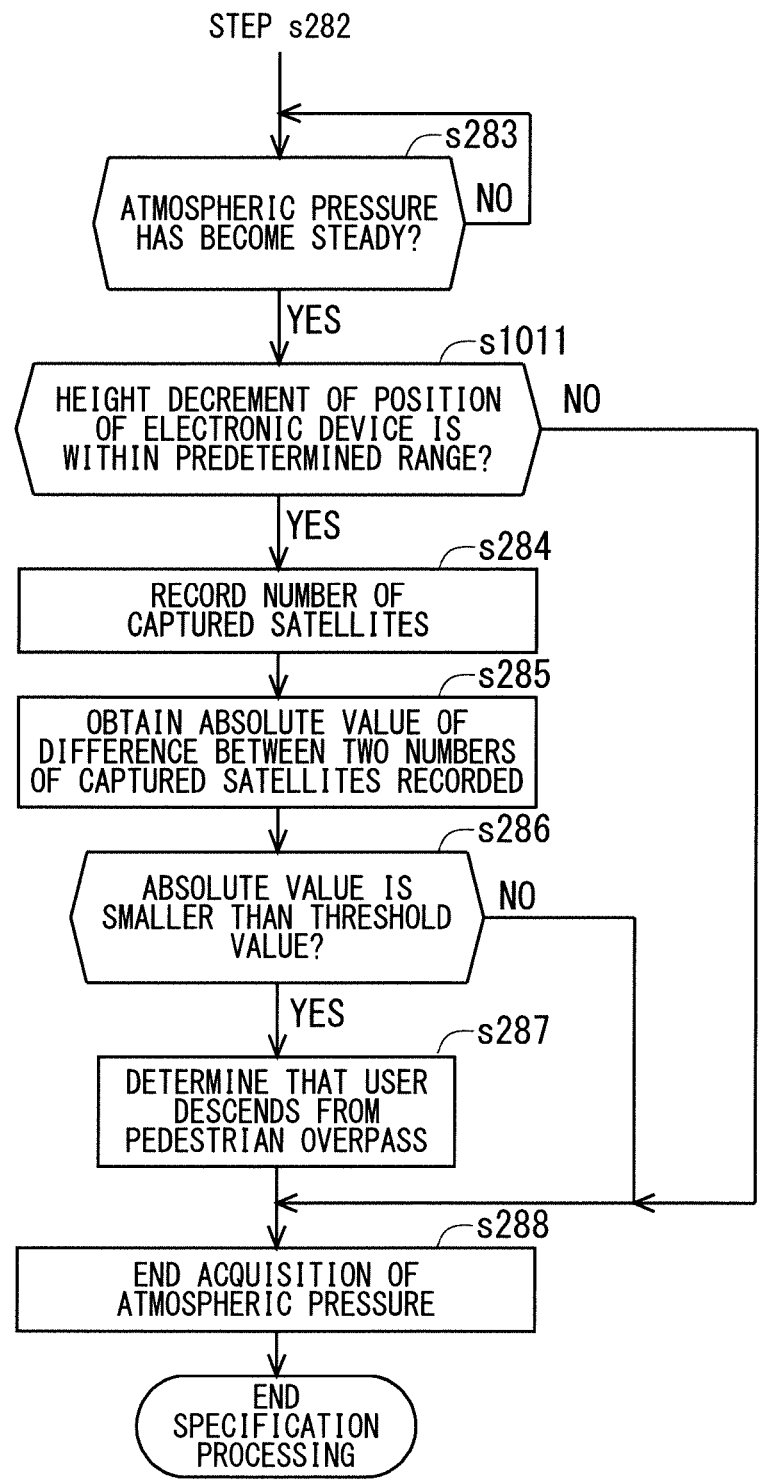
FIG. 32 illustrates a flowchart showing an example of an operation of the electronic device.

Further, as illustrated in FIG. 32, after the second specification unit 620 determines that the atmospheric pressure has become steady in step s283, the unit may execute step s1011. In step s1011, the second specification unit 620 determines whether height increment of the position of the electronic device 210 from the point at which the atmospheric pressure is determined to have increased in step s283 to the point at which the atmospheric pressure is determined to be steady is within the predetermined area. The predetermined area indicates a range of the height of a general pedestrian overpass. Therefore, in step s1011, it can be said that the second specification unit 620 determines whether the height decrement of the position of the electronic device 210 from the point at which the atmospheric pressure is determined to have increased to the point at which the atmospheric pressure is determined to be steady corresponds to the height of the pedestrian overpass. In other words, the second specification unit 620 determines whether the height decrement of the position of the electronic device 210 from the point at which the user 209 starts to descend the stairs to the point at which the user has gone down the stairs corresponds to the height of the pedestrian overpass. The predetermined area is set to a range of five to ten meters, for example.

In the example in FIG. 32, in step s282, the second specification unit 620 obtains the height of the position of the electronic device 210 based on the atmospheric pressure detected by the atmospheric pressure sensor 410 as well as records the number of captured satellites. The height is referred to as "third height". Also in step s1011, the second specification unit 620 obtains the height of the position of the electronic device 210 based on the atmospheric pressure detected by the atmospheric pressure sensor 410. The height is referred to as "fourth height". In step s1011, the second specification unit 620 determines whether a value obtained by subtracting the third height from the fourth height is within a predetermined area. It can be said that the value obtained by subtracting the third height from the fourth height is the height decrement of the position of the electronic device 210 from the point at which the atmospheric pressure is determined to have increased to the point at which the atmospheric pressure is determined to have become steady.

In step s1011, if the second specification unit 620 determines that the obtained decrement is within the predetermined area, the unit executes step s284 and operates in a similar manner thereafter. Meanwhile, in step s1011, if the second specification unit 620 determines that the decrement is not within the predetermined range, the unit executes step s288 and ends the specification processing. Note that, step s1011 may be executed at any timing between step s283 and step s287.

In the example in FIG. 32, if the height decrement of the position of the electronic device 210 from the point at which the atmospheric pressure is determined to have increased to the point at which the atmospheric pressure is determined to have become steady is not within the predetermined area, the second specification unit 620 does not determine that the user 209 descends from the pedestrian overpass 800. In other words, if the height decrement of the position of the electronic device 210 from the point at which the user 209 starts to descend the stairs to the point at which the user has gone down the stairs is not within the predetermined area, the second specification unit 620 does not determine that the user 209 descends from the pedestrian overpass 800. Accordingly, if the height the user 209 descends does not coincide with the height of the pedestrian overpass apparently, the probability that the user 209 descends from the pedestrian overpass 800 can be lowered. Therefore, the probability that the user 209 is erroneously determined to descend from the pedestrian overpass can be lowered.

Figure 33:
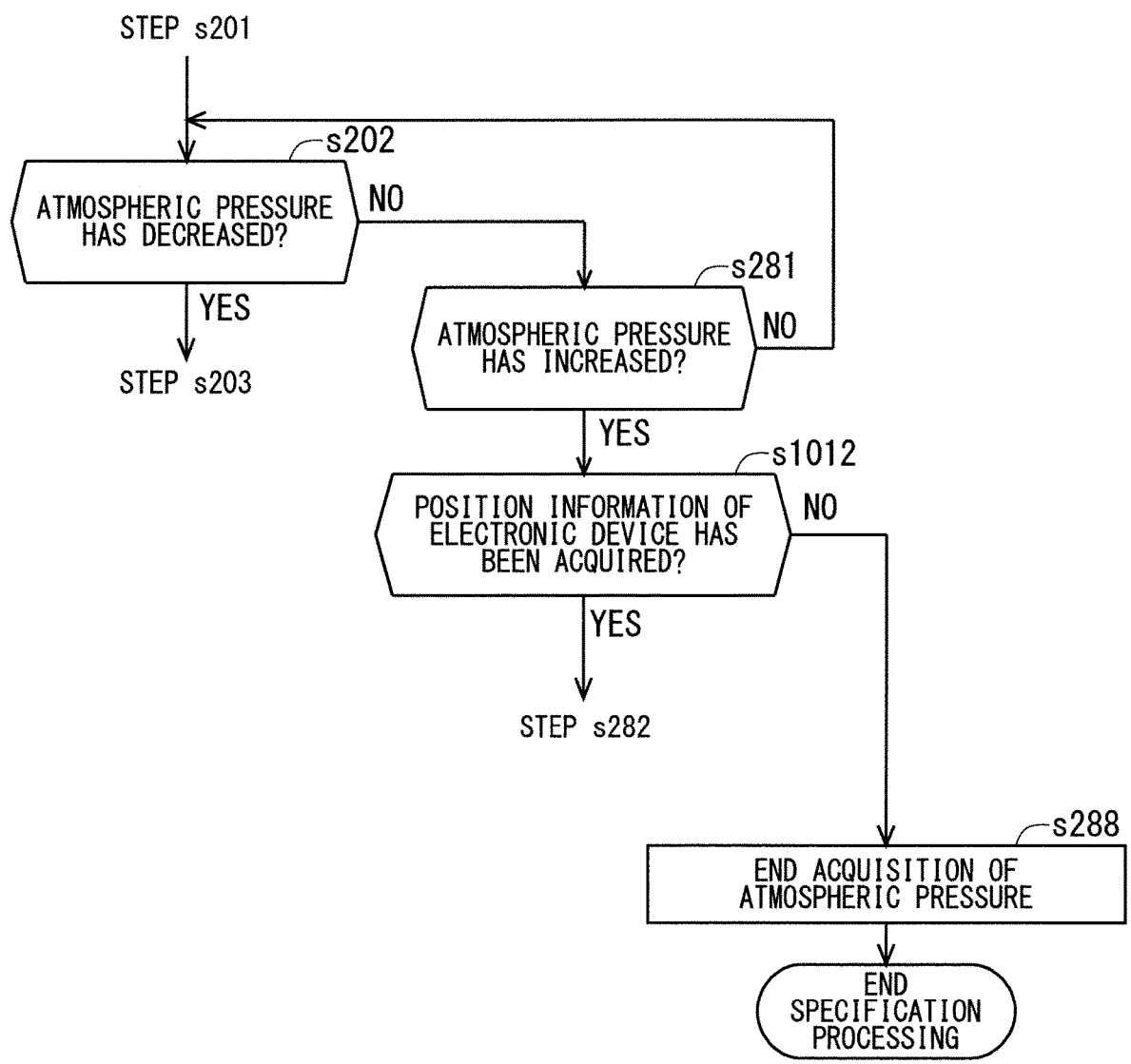
FIG. 33 illustrates a flowchart showing an example of an operation of the electronic device.

Further, as illustrated in FIG. 33, after the second specification unit 620 determines that the atmospheric pressure has increased in step s281, the unit may execute step s1012. In step s1012, the second specification unit 620 determines whether the receiver 340 can acquire the position information of the electronic device 210. It can be said that in step s1012, the second specification unit 620 determines whether the receiver 340 can acquire the position information of the electronic device 210 when the atmospheric pressure has increased. It can be said that in step s802, the second specification unit 620 determines whether the receiver 340 can acquire the position information of the electronic device 210 when the user 209 starts to descend the stairs.

In step s1012, if the second specification unit 620 determines that the receiver 340 can acquire the position information of the electronic device 210, the unit executes step s282 and operates in a similar manner thereafter. Meanwhile, in step s1012, if the second specification unit 620 determines that the receiver 340 cannot acquire the position information of the electronic device 210, the unit executes step s288 and ends the specification processing.

As described above, it can be said that when the receiver 340 cannot acquire the position information, the receiving state is poor. Therefore, it can be said that when the receiver 340 cannot acquire the position information, the receiving state of the receiver 340 when the user 209 starts to descend the stairs is poor. In this case, it is conceivable that it is not accurately determined that the user 209 descends the pedestrian overpass. As in the example of FIG. 33, it is not determined that the user 209 descends from the pedestrian overpass 800 when the receiver 340 cannot acquire the position information of the electronic device 210, therefore, the probability that the user 209 is erroneously determined to descend from the pedestrian overpass when the atmospheric pressure has increased can be lowered.

Further, similarly to the seventh modification, the second specification unit 620 may adjust the sixteenth threshold value used in the descending state specification based on the receiving state information. For example, if the number of captured satellites to be recorded in step s282 is equal to or greater than a seventeenth threshold value, that is the receiving state of the receiver 340 is good, the second specification unit 620 sets the sixteenth threshold value to "three". Meanwhile, if the number of captured satellites to be recorded in step s282 is smaller than the seventeenth threshold value, that is the receiving state of the receiver 340 is poor, the second specification unit 620 sets the sixteenth threshold value to "two". The seventeenth threshold value is set to four to six, for example.

Accordingly, by adjusting the sixteenth threshold value based on the receiving state information when the atmospheric pressure has increased, the second specification unit 620 can properly specify that the user 209 descends from the pedestrian overpass 800.

<Tenth Modification>

Figure 34:
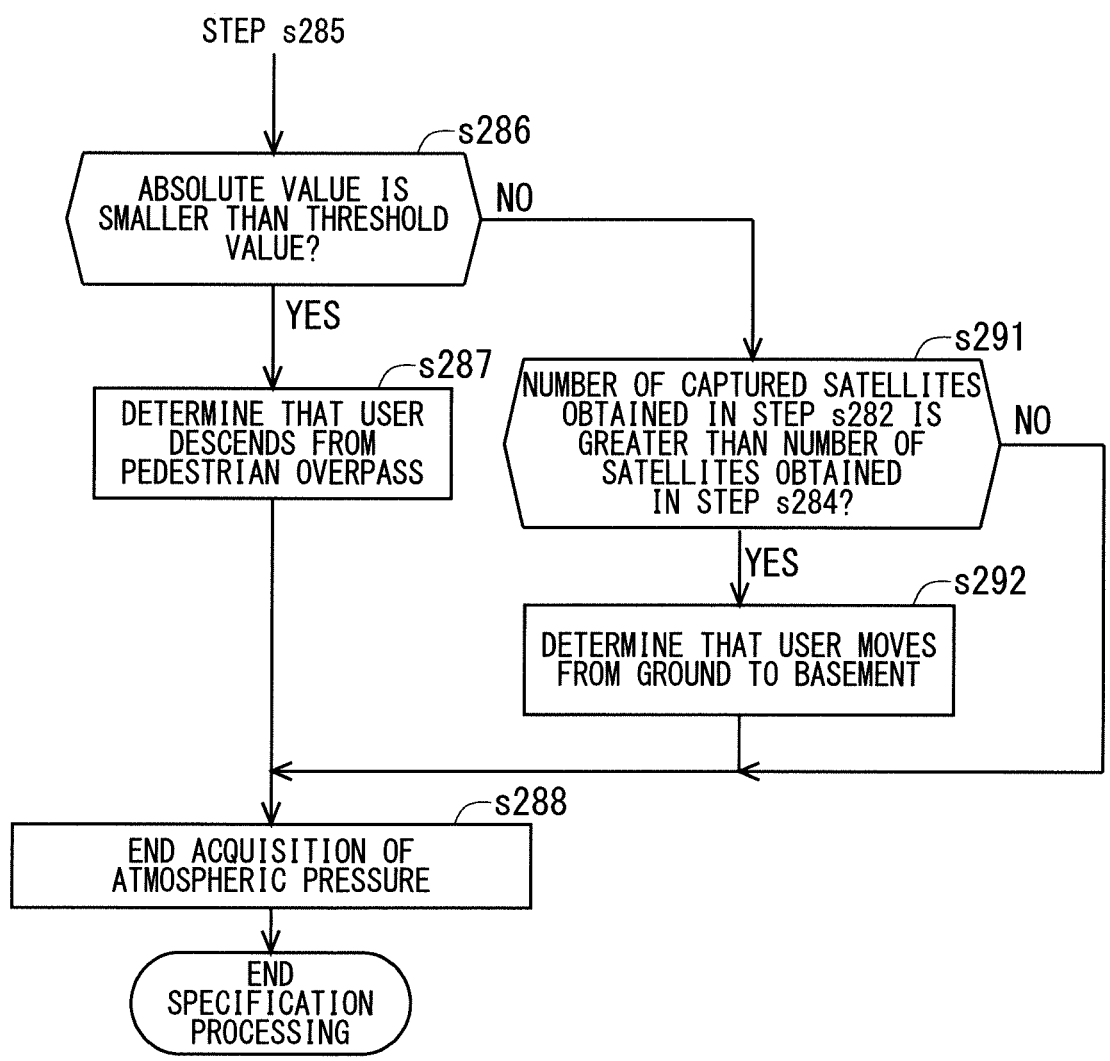
FIG. 34 illustrates a flowchart showing an example of an operation of the electronic device.

In the specification processing according to the above ninth modification, the second specification unit 620 may perform the state specification in which the movement of the user 209 from the basement to the ground based on the receiving state information and the information changing according to the height of the position of the electronic device 210. FIG. 34 illustrates a flowchart showing an example of the specification processing in this case. Thereafter, the state specification for specifying that the user 209 moves from the ground to the basement may be referred to as "specification of movement to the basement".

As illustrated in FIG. 34, if the second satellite number difference absolute value is determined to be equal to or greater than the fifteenth threshold value in step s286, the second specification unit 620 determines whether the third number of captured satellites stored in step s282 is greater than the fourth number of captured satellites stored in step s284 in step s291. If the second specification unit 620 determines that the third number of captured satellites acquired earlier is greater than the fourth number of captured satellites acquired later, the unit determines that the user 209 moves from the basement to the ground in step s292. That the second specification unit 620 determines that the third number of captured satellites is greater than the fourth number of captured satellites can also be said that the second specification unit 620 determines that the receiving state of the receiver 340 deteriorates. Therefore, if the second specification unit 620 determines that the atmospheric pressure increases (YES in step s281) and the receiving state of the receiver 340 deteriorates (YES in step s291), it can be said that the unit determines that the user 209 moves from the ground to the basement. In other words, if the second specification unit 620 determines that the receiving state of the receiver 340 deteriorates when the user 209 descends the stairs, it can be said that the unit determines that the user 209 moves from the ground to the basement. If the user 209 moves from the ground to the basement, it is highly likely that the atmospheric pressure increases and the receiving state receiver 340 deteriorates. Therefore, in the case where the atmospheric pressure increases and the receiving state of the receiver 340 deteriorates, it can be determined that the user 209 moves from the ground to the basement.

If the second specification unit 620 determines that the user 209 moves from the ground to the basement, the unit executes step s288 and ends the specification processing.

Meanwhile, if the second specification unit 620 determines that the third number of captured satellites is equal to or smaller than the fourth number of captured satellites in step s291, in other words, if the unit determines that the receiving state of the receiver 340 does not deteriorates, the unit determines nothing, executes step s288, and ends the specification processing.

Accordingly, the second specification unit 620 specifies that the user 209 moves from the ground to the basement based on the receiving state information and the information changing according to the height of the position of the electronic device 210, therefore the movement of the user 209 from the ground to the basement can be appropriately specified.

It should be noted that, the second specification unit 620 may perform the specification of movement to the basement in the specification processing without performing the pedestrian overpass specification. It also should be noted that, the second specification unit 620 may perform the specification of movement to the basement in the specification processing without performing the descending state specification. In this case, for example, if it is determined that the second satellite number difference absolute value is smaller than the sixteenth threshold value, step s288 is executed and the specification processing is ended without performing step s287. Also, the second specification unit 620 may perform the specification of movement to the ground and the descending state specification in the specification processing.

Also, the second specification unit 620 may perform at least one of the pedestrian overpass specification, the specification of movement to the ground, and the descending state specification, in the specification processing.

And, similarly to the first modification, the second specification unit 620 may perform the specification of movement to the basement, if the unit determines that the electronic device 210 is positioned in the predetermined area. In this case, for example, the second specification unit 620 may perform specification processing if it is determined that the electronic device 210 is positioned in the predetermined area.

In addition, when the receiving state of the receiver 340 is unstable, even when the user 209 moves from the ground to the basement, there is a probability that it is determined that the second satellite number difference absolute value is smaller than the sixteenth threshold value in step s207, or it is determined that the third number of captured satellites is equal to or lower than the fourth number of captured satellites in step s291. Therefore, similarly to the second modification, the second specification unit 620 may determine whether to execute the specification of movement to the basement based on the receiving state information. Further, the second specification unit 620 may determine whether to execute the descending state specification based on the receiving state information before the specification processing is started. Further, similarly to the ninth modification, the second specification unit 620 may determine whether the specification of movement to the basement is performed during the specification processing based on the number of captured satellites when the atmospheric pressure has increased.

Therefore, similarly to the third modification, the second specification unit 620 may determine the credibility of the specification of movement to the basement based on the receiving state information. In this case, the second specification unit 620 may determine the credibility of the specification of movement to the basement based on the receiving state information when the atmospheric pressure is determined to have increased in step s281.

In the above example, the electronic device 210 is represented by a cellular phone such as a smartphone, however, the electronic device 210 may be represented by other types of electronic device. The electronic device 210 may be represented by, for example, a tablet terminal, a personal computer, a wearable device, and so forth. The wearable device adopted as the electronic device 210 may be a wrist wearable type such as a wristband type or a wristwatch type, a head-wearable type such as a headband type or an eyeglass type, a type that is worn on body like clothes, or the like.

As described above, while the system comprising an electronic device and a roadside unit has been described in detail, the forgoing description in all aspects illustrative and not restrictive. The respective modifications described above are appropriately applicable in combination as long as they are inconsistent each other. It is understood that numerous other modifications and variations that are not exemplified can be devised without departing from the scope of the invention.

The invention claimed is:

1. An electronic device, comprising:
    a receiver configured to receive a satellite signal transmitted by a positioning satellite and generate first information indicating a receiving state of the satellite signal;
    a sensor configured to generate second information that changes according to a height of a position of the electronic device; and
    at least one processor configured to execute a specification process in which state specification, for specifying that a user of the electronic device is on a pedestrian overpass, is performed based on the first information and the second information.

2. The electronic device according to claim 1, wherein, in the specification process, the at least one processor unit is configured to specify a movement of the user from a basement to a ground based on the first information and the second information.

3. The electronic device according to claim 2, wherein, when the height has increased and the receiving state is improved based on the first information and the second information, the at least one processor is configured to determine that the user moves from the basement to the ground.

4. The electronic device according to claim 2, wherein the first information includes a first value which becomes greater as the receiving state improves, and
    when an absolute value of a difference between the first value obtained at a first timing, and the first value obtained at a second timing later than the first timing is greater than a first threshold value, the first timing corresponding to an increase in the height as indicated by the second information, and the first value obtained at the second timing is greater than the first value obtained at the first timing, the at least one processor is configured to determine that the user moves from the basement to the ground.

5. The electronic device according to claim 1, wherein, in the specification process, the at least one processor unit is configured to specify that the user descends from the pedestrian overpass based on the first information and the second information.

6. The electronic device according to claim 5, wherein, when the height has decreased and the receiving state is stable based on the first information and the second information, the at least one processor is configured to determine that the user descends the pedestrian overpass.

7. The electronic device according to claim 5, wherein the first information includes a first value which becomes greater as the receiving state improves, and
    when an absolute value of a difference between the first value obtained at a first timing, and the first value obtained at a second timing later than the first timing is smaller than a first threshold value, the first timing corresponding to a decrease in the height as indicated by the second information, the at least one processor is configured to determine that the user descends from the pedestrian overpass.

8. The electronic device according to claim 1, wherein, in the specification process, the at least one processor is configured to specify a movement of the user from a ground to a basement based on the first information and the second information.

9. The electronic device according to claim 8, wherein, when the height has decreased and the receiving state is deteriorated based on the first information and the second information, the at least one processor is configured to determine that the user moves from the ground to the basement.

10. The electronic device according to claim 8, wherein the first information includes a first value which becomes greater as the receiving state improves, and
    when an absolute value of a difference between the first value obtained at a first timing, and the first value obtained at a second timing later than the first timing is greater than a first threshold value, the first timing corresponding to a decrease in the height as indicated by the second information, and the first value obtained at the second timing is smaller than the first value obtained at the first timing, the at least one processor is configured to determine that the user descends from the ground to the basement.

11. The electronic device according to claim 1, wherein, when the height has increased and the receiving state is stable based on the first information and the second information, the at least one processor is configured to determine that the user is on the pedestrian overpass.

12. The electronic device according to claim 1, wherein the first information includes a first value which becomes greater as the receiving state improves, and
    when an absolute value of a difference between the first value obtained at a first timing, and the first value obtained at a second timing later than the first timing is smaller than a first threshold value, the first timing corresponding to an increase in the height as indicated by the second information, the at least one processor is configured to determine that the user is on the pedestrian overpass.

13. The electronic device according to claim 12, wherein the second timing corresponds to a stabilization of the height as indicated by the second information.

14. The electronic device according to claim 12, wherein the second timing corresponds to a stabilization of the height as indicated by the second information, and when the user takes a plurality of steps.

15. The electronic device according to claim 12, wherein the second timing corresponds to a stabilization of the height, and
when an increment of the height from the first timing to the second timing is not within a predetermined area, the at least one processor is configured not to determine that the user is on the pedestrian overpass.

16. The electronic device according to claim 1, wherein specifying that the user in on the pedestrian overpass comprises specifying that the user is ascending the pedestrian overpass, descending the pedestrian overpass, or crossing the pedestrian overpass.

17. The electronic device according to claim 1, wherein the at least one processor is configured to determine whether the state specification is performed based on the first information.

18. The electronic device according to claim 1, wherein the at least one processor is configured to determine credibility of the state specification based on the first information.

19. An electronic device, comprising:
a receiver configured to receive a satellite signal transmitted by a positioning satellite and generate first information indicating a receiving state of the satellite signal;
a sensor configured to generate second information that changes according to a height of a position of the electronic device; and
at least one processor configured to execute a specification process in which state specification, for specifying a movement of a user of the electronic device from a basement to a ground or from the ground to the basement, is performed based on the first information and the second information.

20. An electronic device, comprising:
a receiver configured to receive a satellite signal transmitted by a positioning satellite and generate first information indicating a receiving state of the satellite signal;
a sensor configured to generate second information that changes according to a height of a position of the electronic device; and
at least one processor configured to execute a specification process in which state specification, for specifying a movement of a user of the electronic device from a ground to a basement, is performed based on the first information and the second information.

* * * * *